US009474217B2

(12) United States Patent
Anderson et al.

(10) Patent No.: US 9,474,217 B2
(45) Date of Patent: **\*Oct. 25, 2016**

(54) CONTROLLED ENVIRONMENT AND METHOD

(71) Applicant: Living Greens Farm, Inc., Prior Lake, MN (US)

(72) Inventors: Dana Anderson, Prior Lake, MN (US); Allen James, Cottage Grove, MN (US)

(73) Assignee: LIVING GREENS FARM IP, LLC, Faribault, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/321,248

(22) Filed: Jul. 1, 2014

(65) Prior Publication Data

US 2014/0311029 A1 Oct. 23, 2014

Related U.S. Application Data

(63) Continuation of application No. 13/914,243, filed on Jun. 10, 2013.

(60) Provisional application No. 61/794,599, filed on Mar. 15, 2013, provisional application No. 61/657,203, filed on Jun. 8, 2012.

(51) Int. Cl.
*A01G 25/09* (2006.01)
*A01G 31/00* (2006.01)
(Continued)

(52) U.S. Cl.
CPC ............... *A01G 31/00* (2013.01); *A01G 1/001* (2013.01); *A01G 7/045* (2013.01); *A01G 9/247* (2013.01); *A01G 29/00* (2013.01); *A01G 31/02* (2013.01)

(58) Field of Classification Search
CPC .... A01G 9/023; A01G 25/09; A01G 25/092; A01G 25/097; A01G 31/04; A01G 31/045; A01G 31/042

USPC ........ 47/59 R, 60, 62 R, 62 A, 62 N, 17, 65, 47/66.1, 66.6, 70, 79, 39, 83, 29.5
See application file for complete search history.

(56) References Cited

U.S. PATENT DOCUMENTS 3,181,273 A 5/1965 West et al.
3,708,009 A 1/1973 Viol et al.
(Continued)

FOREIGN PATENT DOCUMENTS

JP 05146231 6/1993
JP 07034696 B2 4/1995
(Continued)

OTHER PUBLICATIONS

Translation of JP 409154417.*
(Continued)

*Primary Examiner* — Thien Thanh Pham
(74) *Attorney, Agent, or Firm* — Hamilton IP Law, PC; Jay R. Hamilton; Charles A. Damschen

(57) ABSTRACT

An illustrative embodiment of an irrigation system may include a carriage that may move along a predetermined path in a reciprocal manner. The carriage may support one or more exit ports that may be fed nutrient supply by a pressurized delivery arrangement. One or more plant stands may be configured and arranged to straddle the carriage as it moves along the predetermined path. The one or more plant stands may form a chamber into which plant roots may extend, and into which the one or more exit ports may discharge their nutrient supply. The one or more plant stands may include side panels and a cap to reduce infiltration of light and contaminants and to enhance the plant root/nutrient supply interface and absorption rates. The carriage and/or the plant stand(s) may include friction reducing elements that facilitate transverse movement. The carriage and/or the plant stand(s) may be supported by framework.

8 Claims, 62 Drawing Sheets

(51) Int. Cl.
*A01G 31/02* (2006.01)
*A01G 9/24* (2006.01)
*A01G 7/04* (2006.01)
*A01G 29/00* (2006.01)
*A01G 1/00* (2006.01)

(56) References Cited

U.S. PATENT DOCUMENTS

| | | | |
|---|---|---|---|
| 3,729,016 A | 4/1973 | Von Linsowe | |
| 3,729,141 A | 4/1973 | Cornelius | |
| 3,749,319 A | 7/1973 | Fischer | |
| 3,874,721 A | 4/1975 | Tuggle | |
| 3,888,041 A | 6/1975 | Bundy et al. | |
| 4,006,559 A | 2/1977 | Carlyon, Jr. | |
| 4,035,950 A | 7/1977 | Anselm | |
| 4,047,327 A | 9/1977 | Tesch | |
| 4,052,196 A | 10/1977 | Namy et al. | |
| 4,059,922 A | 11/1977 | DiGiacinto | |
| 4,099,669 A | 7/1978 | Cortopassi | |
| 4,244,145 A | 1/1981 | Polacsek | |
| 4,295,607 A | 10/1981 | Noble | |
| 4,309,844 A | 1/1982 | King et al. | |
| 4,332,105 A | 6/1982 | Nir | |
| 4,352,460 A | 10/1982 | Purtell | |
| 4,419,843 A | 12/1983 | Johnson, Sr. | |
| 4,505,068 A | 3/1985 | Kaneko | |
| 4,569,150 A | 2/1986 | Carlson et al. | |
| 4,584,791 A | 4/1986 | Wolf | |
| 4,603,077 A | 7/1986 | Fujimoto et al. | |
| 4,658,878 A | 4/1987 | Williams | |
| 4,713,909 A | 12/1987 | Roper et al. | |
| 4,813,176 A | 3/1989 | Takayasu | |
| 4,844,109 A | 7/1989 | Navarro | |
| 4,869,019 A | 9/1989 | Ehrlich | |
| 4,924,623 A | 5/1990 | van Rens | |
| 4,965,962 A | 10/1990 | Akagi | |
| 4,982,526 A | 1/1991 | Miyachi | |
| 5,040,329 A | 8/1991 | Michaloski | |
| 5,042,196 A | 8/1991 | Lukawski | |
| 5,076,008 A | 12/1991 | Arroyo | |
| 5,077,935 A | 1/1992 | Stoever et al. | |
| 5,226,255 A | 7/1993 | Robertson | |
| 5,317,834 A | 6/1994 | Anderson | |
| 5,397,056 A | 3/1995 | Sakatani et al. | |
| 5,417,010 A | 5/1995 | Ecer | |
| 5,435,098 A | 7/1995 | Koide et al. | |
| 5,438,794 A * | 8/1995 | Wi | A01G 9/143 47/17 |
| 5,560,415 A | 10/1996 | Geissler | |
| 5,724,768 A | 3/1998 | Ammann | |
| 5,862,628 A | 1/1999 | Takashima | |
| 5,918,416 A | 7/1999 | Ammann | |
| 5,937,575 A | 8/1999 | Zobel et al. | |
| 6,006,471 A | 12/1999 | Sun | |
| 6,021,602 A * | 2/2000 | Orsi | A01G 31/02 47/62 A |
| 6,061,957 A | 5/2000 | Takashima | |
| 6,070,358 A | 6/2000 | Meikle et al. | |
| 6,082,044 A | 7/2000 | Sherfield | |
| 6,105,309 A | 8/2000 | Takayanagi | |
| 6,127,027 A | 10/2000 | Nogami et al. | |
| 6,131,832 A | 10/2000 | Murphy | |
| 6,219,965 B1 | 4/2001 | Ishikawa et al. | |
| 6,237,282 B1 | 5/2001 | Pitts | |
| 6,312,139 B1 | 11/2001 | Baker et al. | |
| 6,360,482 B1 | 3/2002 | Boyes | |
| 6,360,483 B1 | 3/2002 | Sherfield | |
| 6,446,386 B1 | 9/2002 | Holloway | |
| 6,508,033 B2 | 1/2003 | Hessel et al. | |
| 6,578,319 B1 | 6/2003 | Cole et al. | |
| 6,615,542 B2 | 9/2003 | Ware | |
| 6,698,668 B2 | 3/2004 | Stehling | |
| 6,729,807 B1 | 5/2004 | Spittle | |
| 6,793,438 B2 | 9/2004 | Anderson | |
| 6,807,770 B2 | 10/2004 | Wainwright et al. | |
| 6,811,653 B2 | 11/2004 | Huang | |
| 7,426,802 B2 | 9/2008 | Umbaugh | |
| 8,181,391 B1 | 5/2012 | Giacomantonio | |
| 8,533,992 B2 | 9/2013 | Harwood | |
| 2003/0006323 A1 | 1/2003 | Reid | |
| 2003/0089037 A1 | 5/2003 | Ware | |
| 2003/0121362 A1 | 7/2003 | Goellner | |
| 2003/0150160 A1 | 8/2003 | Anderson | |
| 2003/0188477 A1 | 10/2003 | Pasternak et al. | |
| 2006/0032128 A1 | 2/2006 | Bryan | |
| 2006/0053691 A1 | 3/2006 | Harwood et al. | |
| 2008/0295400 A1 | 12/2008 | Harwood et al. | |
| 2011/0146146 A1 | 6/2011 | Harwood | |
| 2011/0258925 A1 | 10/2011 | Baker | |
| 2012/0005957 A1 | 1/2012 | Downs | |
| 2012/0085026 A1 | 4/2012 | Morris | |

FOREIGN PATENT DOCUMENTS

| | | |
|---|---|---|
| JP | 07327520 A | 12/1995 |
| JP | 409154417 * | 6/1997 |

OTHER PUBLICATIONS

LGF-P1002-PCT Search Report Written Opinion for PCT/US2013/045003, dated Oct. 28, 2013.
Search Report and Written Opinion for PCT/US2013/032492, dated May 30, 2013.

* cited by examiner

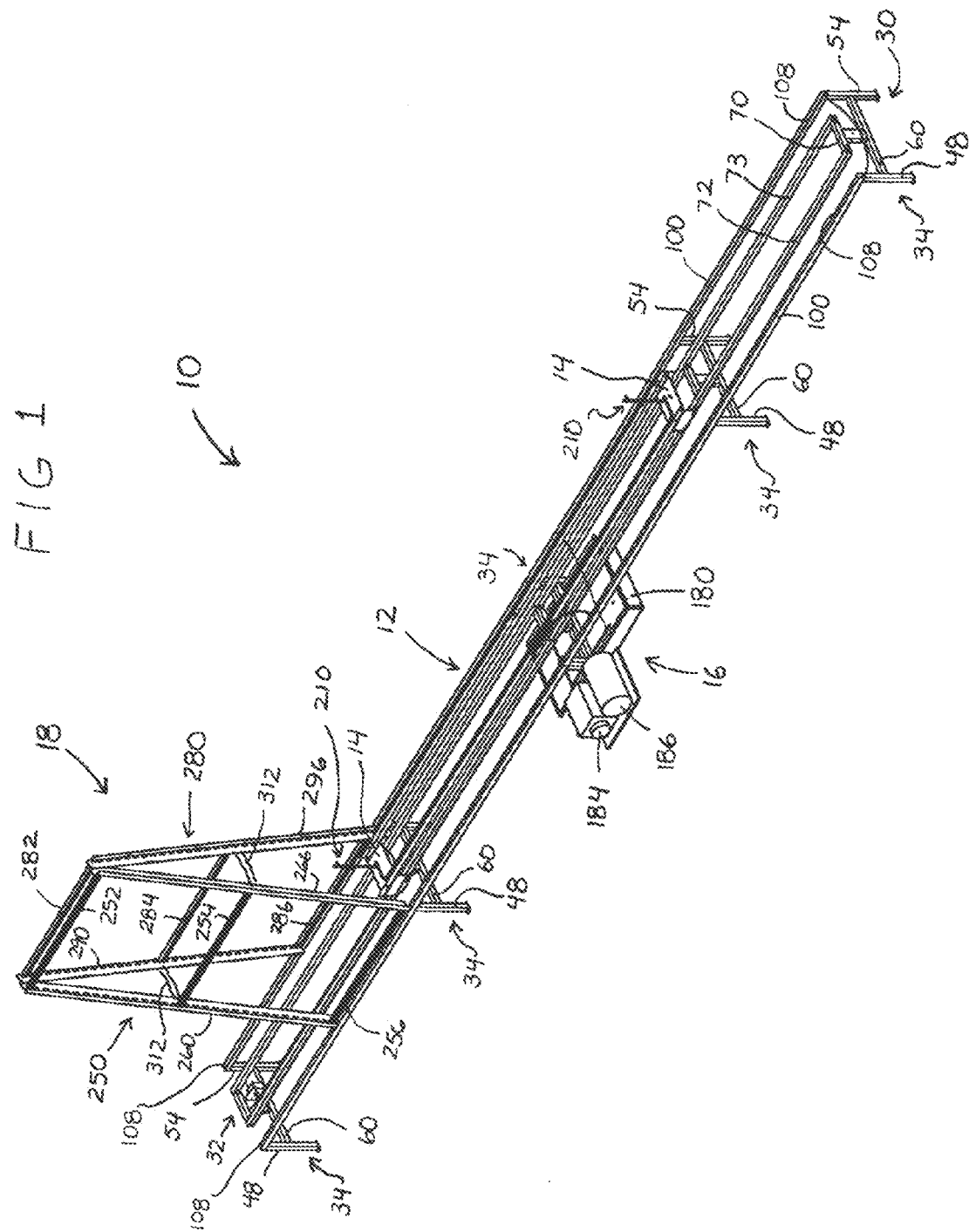

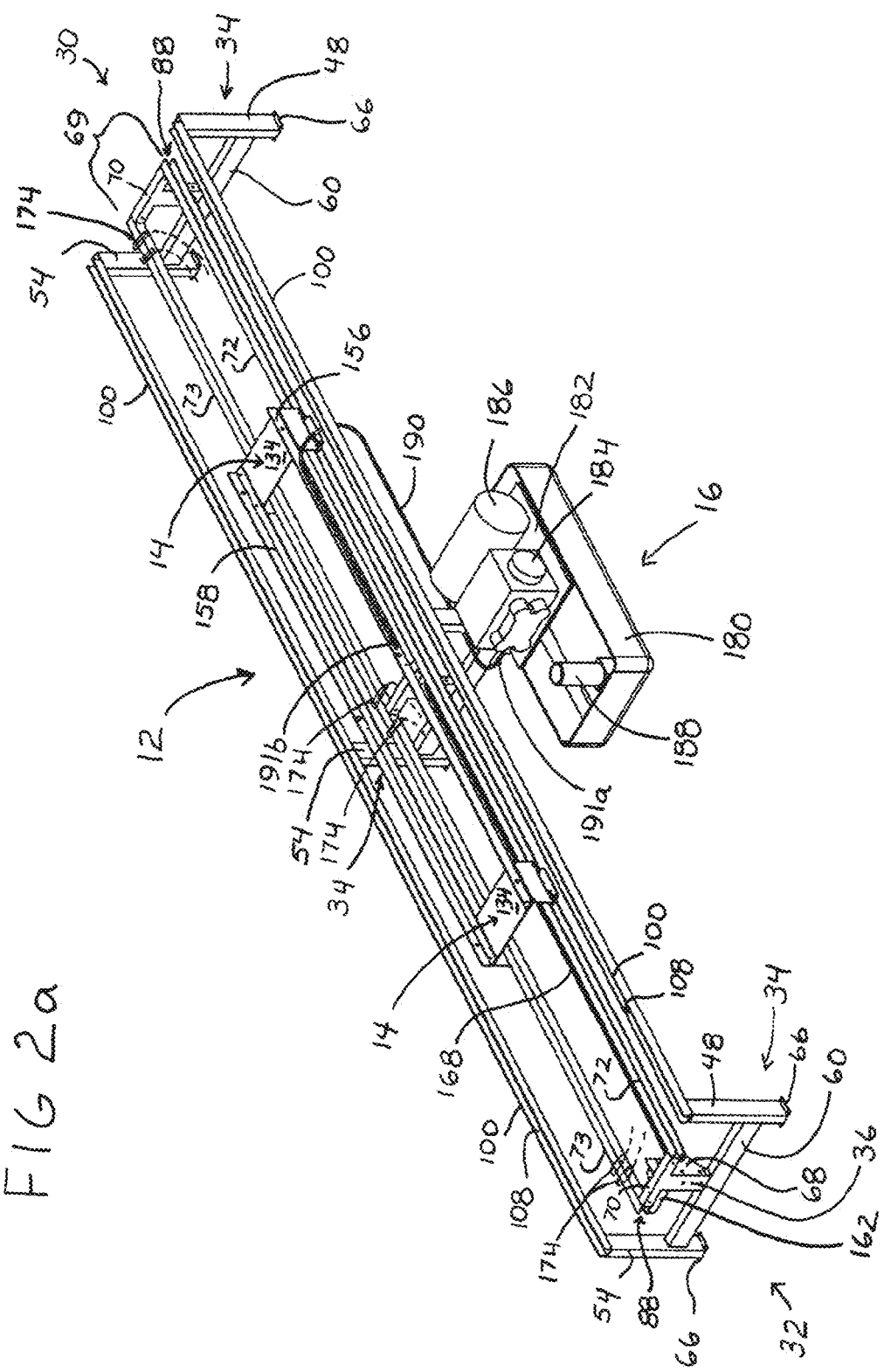

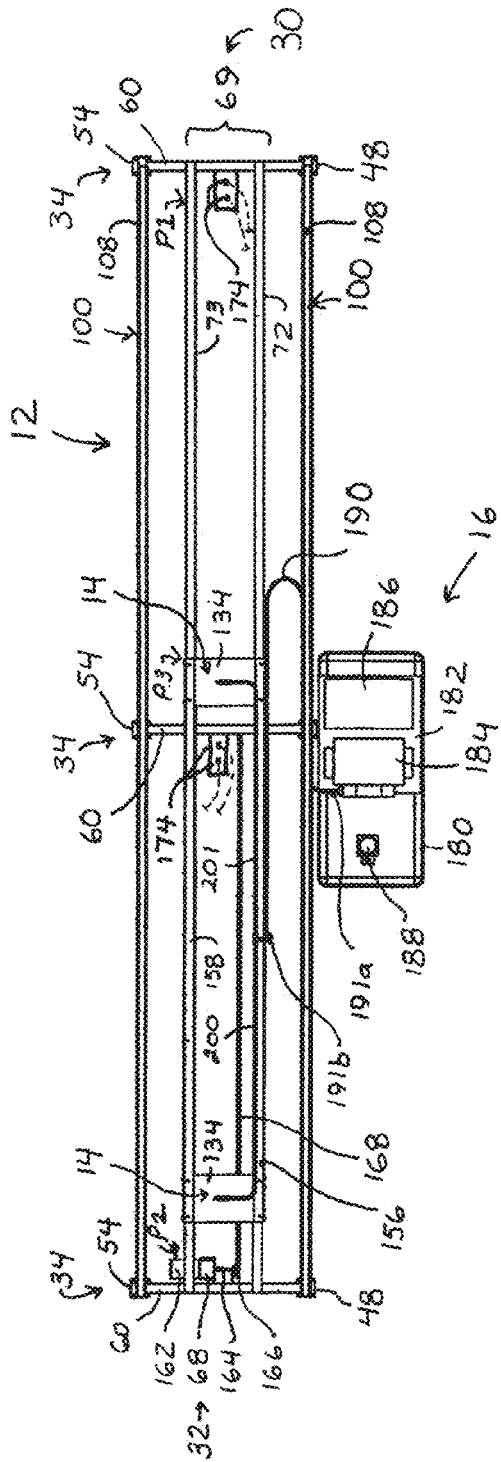
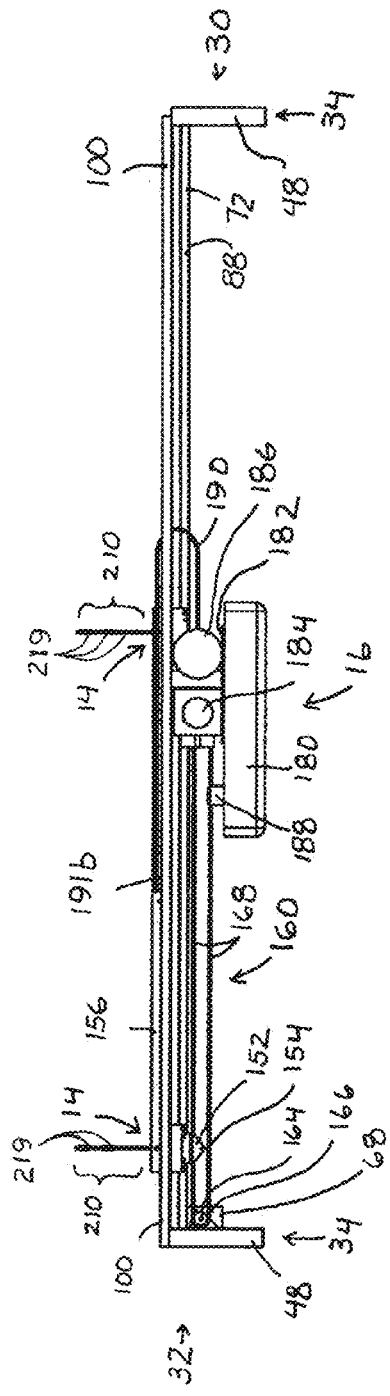
FIG. 3
FIG. 4

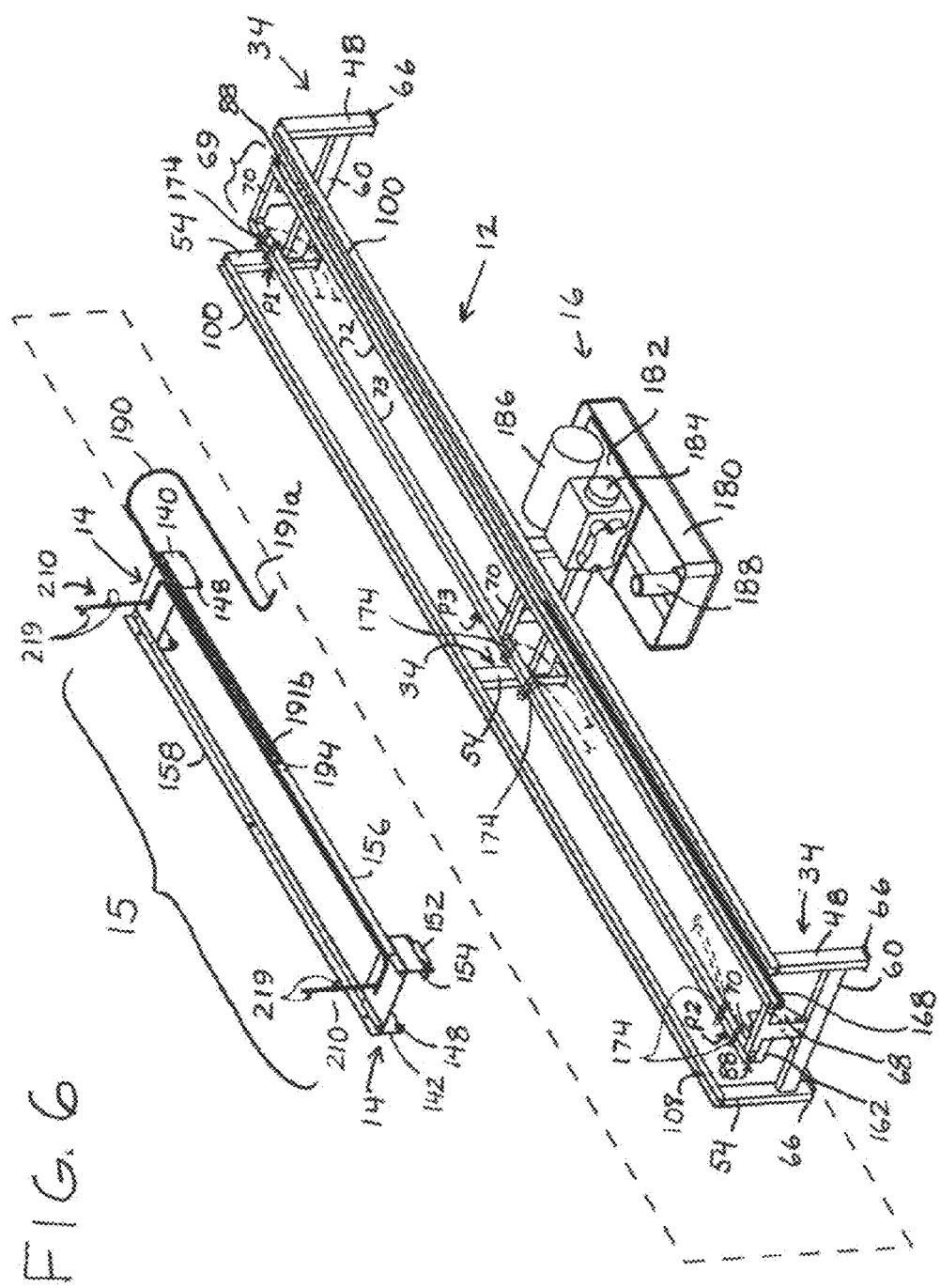

FIG. 7b

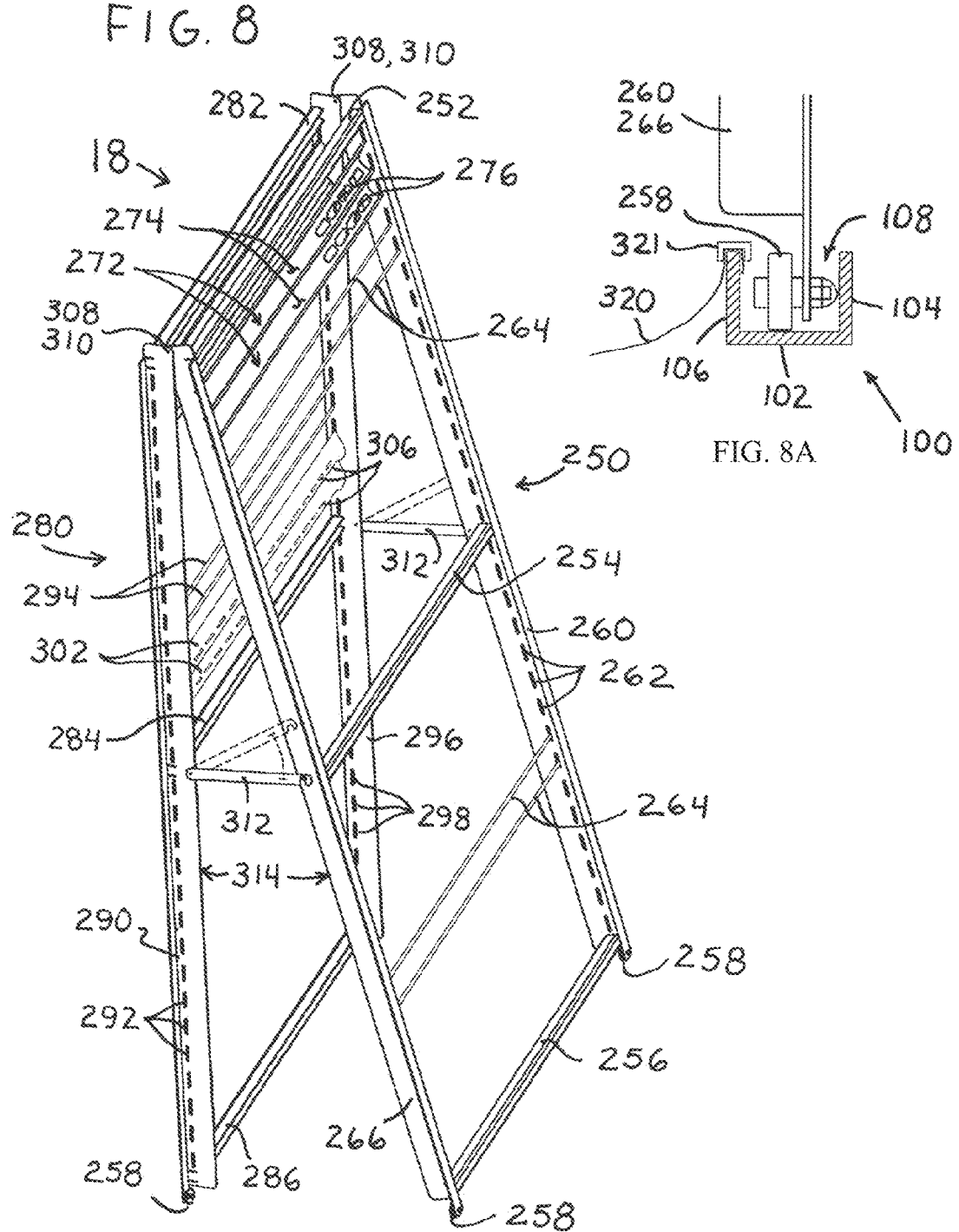

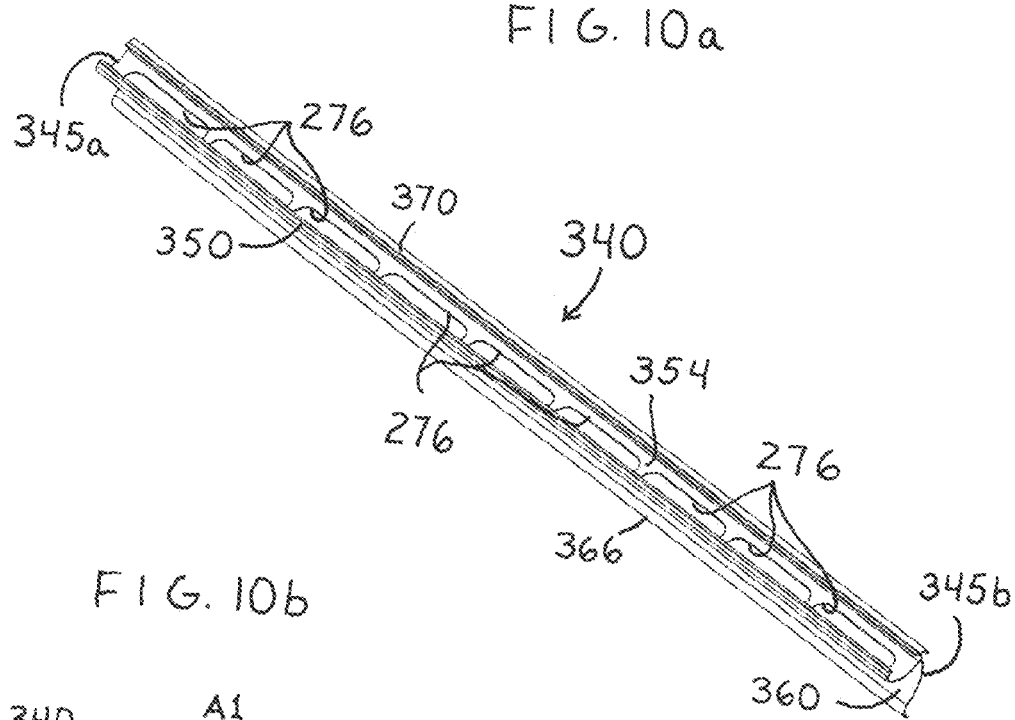
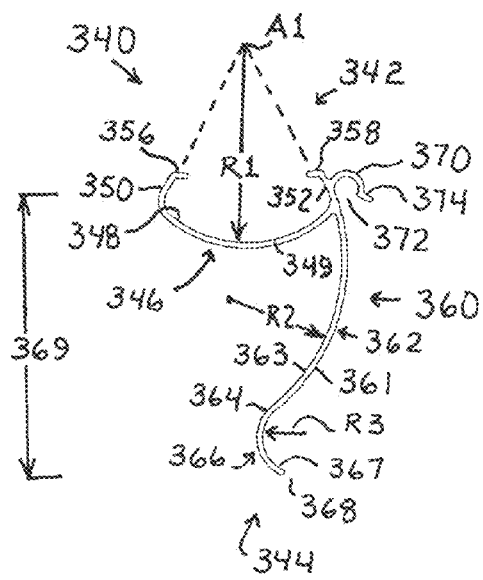
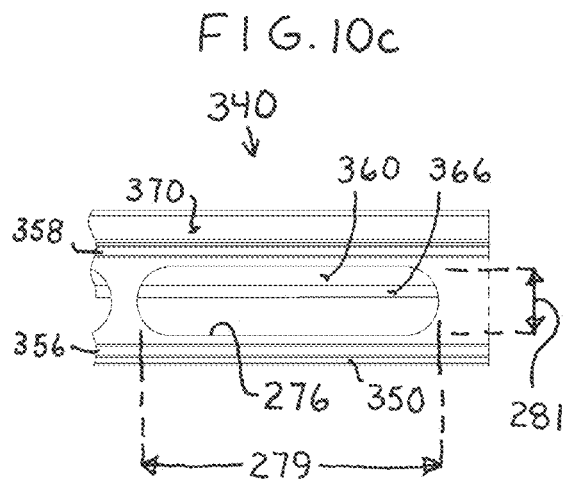

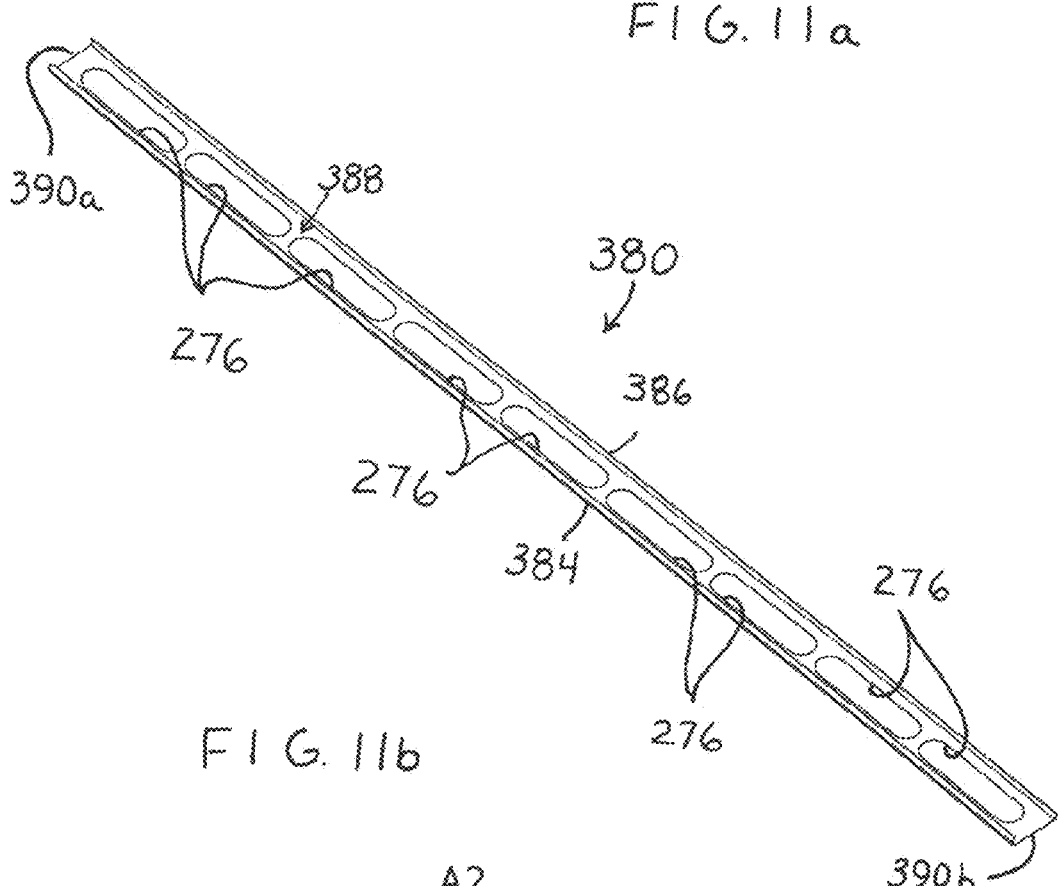
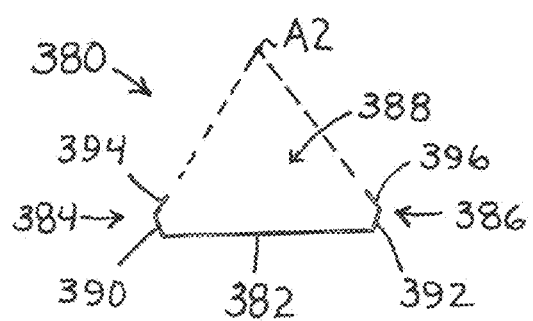

CONTROLLED ENVIRONMENT AND METHOD

CROSS REFERENCE TO RELATED APPLICATIONS

Applicant states that this non-provisional utility patent application is a continuation of U.S. patent application Ser. No. 13/914,243 filed on Jun. 10, 2013 which claimed priority from International Patent Application PCT/US2013/032492 filed on Mar. 15, 2013, which claimed priority from provisional U.S. Pat. App. 61/657,203 filed on Jun. 8, 2012, and U.S. patent application Ser. No. 13/914,243 also claimed priority from provisional U.S. Pat. App. 61/794,599 filed on Mar. 15, 2013 and provisional U.S. Pat. App. 61/657,203 filed on Jun. 8, 2012, all of which applications are incorporated by reference herein in their entireties.

STATEMENT REGARDING FEDERALLY SPONSORED RESEARCH OR DEVELOPMENT

No federal funds were used to develop or create the disclosed invention.

FIELD OF INVENTION

The present invention relates generally to plant cultivation and, more specifically, to apparatuses and methods for use in aeroponic plant growing.

DESCRIPTION OF THE PRIOR ART

Improved methods of administering water and/or other nutrients to enhance plant growth have been explored since the beginning of modern agriculture. Various means of water and/or nutrient delivery have been devised from applicators transported by large tractors, to stationary overhead sprinkler systems, to center pivot irrigation systems, to the more recent ubiquitous employment of drip hydroponic methods in green houses.

For field crops, an irrigation system that delivers solution to the root zone via percolation benefits the plants in the following beneficial ways. Primarily, it allows nutrients to be delivered in smaller amounts and at lower concentrations, which reduce the chances of root burn, and which the plants are better able to tolerate. In addition, because smaller amounts of nutrients are delivered to the plants, the rates of evaporation and runoff are reduced. The environment benefits because the chances of a field being flooded with excess, highly concentrated chemicals, water and/or nutrients are substantially reduced and/or avoided. Additionally, the roots will receive the nutrients in more frequent and regular intervals, which is beneficial to overall growth rates.

A common method of applying fertilizers to field crops is through the use of applicators that are transported by large tractors that travel between crop rows. A drawback with such a method is that the tractor usually only makes one application pass along each crop row, which may result in the deposit of high concentrations of fertilizers such as potash and nitrogen onto shoots of the crops and the field, which may later be washed away by precipitation and/or by supporting irrigation systems. A further drawback is that with existing supporting irrigation systems, water and/or nutrients are usually delivered to the shoots of the crops from which they can then evaporate, but which can often pool and eventually percolate down to an aquifer, which leads to ground water contamination or runoff and combine with existing streams and/or rivers, thus polluting them.

More recently, other methods of irrigation have been developed. They include hydroponics and aeroponics. With hydroponics, plant roots do not grow in a soil medium (often referred to as "geoponics"). Instead, plants are held in frames and roots are submerged in a fluid medium with nutrients, wherein the fluid solvent and/or carrier is often water. The fluid medium is circulated past the roots and in doing so the fluid imparts nutrients and other essential material to the plant. A drawback with such as system is that when plant roots are submerged, they are less able to effectively interact with the atmosphere as they would normally do when they are in a soil growth medium. Another drawback with such systems is that they are expensive to set up, operate, and maintain. Another drawback with such systems is that they are generally horizontally oriented, and have a relatively large footprint.

With aeroponics, plant roots do not grow in either a soil medium or a fluid medium. Instead, nutrients and/or other essential material may be supplied to plant roots in the form of a mist and/or aerosolized medium, wherein water may be used as the carrier and/or solvent to create a nutrient supply. Current prior art aeroponic systems are static and, in their most basic form, usually include a hose that is provided with a plurality of nozzles at spaced intervals along the hose—usually every 12 inches or so, or one nozzle per plant. Often, a plurality of such hoses are engaged with a manifold or plenum from which a nutrient supply is dispensed as shown in U.S. Pat. No. 4,332,105, which is incorporated by reference herein in its entirety. In large operations, there may be dozens of hoses and hundreds of nozzles. In such a prior art operation, roots of each plant are exposed to the aerosolized nutrient medium via a nozzle, which is pulsed on and off at specific intervals. To achieve the highest beneficial growth rates in such a system, timers are used to pulse or interval the nutrient supply delivery. A typical on/off pulse ratio may be 1 second on and 1 minute off, but such ratios may have on/off rations as high as 2 minutes on and 20 minutes off, and the optimal ratios are dependent on multiple factors.

A significant drawback of current aeroponic systems, such as those disclosed in U.S. Pat. Nos. 4,514,930; 6,807,770; 8,225,549; all of which are incorporated by reference herein in their entireties, is that continued cycling of nozzles allows material dissolved or suspended in the nutrient supply to be deposited on the surfaces of the nozzles and in the nozzle orifices, where those materials may solidify when the system is cycled off. This is a significant problem because nozzle orifices may be quite small. It will be appreciated then, that a thin layer of surface deposition or an un-dissolved particle that is unable to flow through the orifice may alter the operational characteristics and spray pattern produced by the orifice and/or nozzle. Over time, the ability of the nozzles to operate as intended may be diminished until the nozzles become completely clogged. This can lead to dry spots, incomplete nutrient supply delivery, stunted growth, and/or ultimately crop failure.

While it is possible to monitor the nozzles to ensure that they are operating correctly, this may be a labor intensive procedure because it may require visual inspection of each nozzle. Moreover, if nozzles need to be replaced and/or cleaned, additional labor and cost are required. That is, one or more workers needs to periodically walk the rows and inspect the plant roots to make sure that the system is operating as designed. If there is a problem with one or more nozzles, the system typically must be shut down, depressurized, and the problem(s) rectified. This could be in the nature of removing and cleaning a nozzle or it could be replacement of a nozzle. Moreover, this must be done with some degree of efficiency and rapidity, because while the system is shut down the plants are not receiving any nutrients.

After the problem(s) have been rectified, the system has to be re-pressurized and tested. If the worker has not correctly identified and rectified all nozzle malfunctions, the system will need to be shut down again and the problem(s) rectified before re-pressurization and testing. In current aeroponic systems, which can include hundreds of nozzles spaced at regular intervals along a supply hose, this can be a daunting, expensive, and time consuming task that must be repeated on a regular basis.

Another drawback with current aeroponic systems is that the nozzles, which may be formed from material such as stainless steel or brass, are difficult to fabricate and this increases manufacturing costs. As will be appreciated, when the number of nozzles used in a system can easily exceed 100 and can go much higher, the initial outlay and subsequent replacement costs for nozzles alone may be quite expensive.

Another drawback with current aeroponic systems is that they are intended to be permanent structures. Once they are set up, they cannot be easily moved. In addition, their sizes cannot be easily changed. That is, they cannot be enlarged or reduced without significant and costly efforts.

Another drawback with current aeroponic systems is that they lack a tracking system that allows plants and their associated plant trays to be selectively positioned so that they may be exposed to different growth environments that are tailored to the requirements and developmental stages of the plants.

An additional drawback with current aeroponic systems is that most are horizontally oriented and planar, which limits the degree of plant density and ultimately the crop yield that can be achieved per unit measure (e.g., per square foot). Such a horizontally oriented system also creates a relatively large footprint. Accordingly, there is a need in the art for aeroponic system that overcomes these and other drawbacks.

SUMMARY

According to the present disclosure, the forgoing drawbacks may be overcome by a controlled environment and method, which in certain embodiments may include an irrigation system. One illustrative embodiment of an irrigation system may include a carriage comprising a body with a platform with the carriage movable between a first position and a second position in a reciprocal manner. One embodiment of the irrigation system may also include a nutrient supply delivery arrangement that has an intake portion and a discharge portion. The discharge portion may be operatively engaged with the carriage so that it is able to move therewith as the carriage is moved between the first and second positions. The irrigation system may also include a plant stand. The plant stand may be configured and arranged so that it is able to retain a plant so that a plant root is able to extend downwardly in a conventional manner. The plant stand may be positionable so that the plant root is able to receive nutrient supply from the discharge portion of the delivery arrangement.

In accordance with an aspect of the controlled environment and method, one illustrative embodiment of the plant stand may comprise a first frame having a top member, opposing side members, one or more crossbars and a bottom member. The first illustrative embodiment of a plant stand may also include a second frame having a top member, opposing side members, one or more crossbars and a bottom member. The first and second frames may be engaged with each other adjacent their respective top members so as to form an A-frame configuration, which may be beneficial when using the interstitial space between the first and second frames.

The A-frame configuration may be maintained by one or more straps that may be engaged with the side members of the first and second frames. The illustrative embodiment of the plant stand may comprise one or more horizontally oriented, longitudinal holders that may be operatively engaged with the crossbars of either one, or both of the first and second frames of the A-frame plant stand. The holders may be configured to allow plants to be arranged and cultivated in tiers or steps. Advantageously, at least one of the frames may be provided with one or more friction reducing element that allows the plant stand to be moved transversely while it maintains contact with a support surface. In one embodiment, each frame of the plant stand may be provided with one or more wheels that rollingly support the plant stand.

In accordance with another aspect of the controlled environment and method, the illustrative embodiment of the irrigation system may include a modular framework. An illustrative embodiment of the framework may comprise a first sub-frame having a center post and a second sub-frame having a center post, with the second sub-frame spaced from and generally parallel to the first sub-frame. A guide assembly may be engaged with the center posts of the first and second sub-frames. The guide assembly may be configured to constrainingly engage a carriage while it moves between first and second positions. The framework in the illustrative embodiment may also include a third sub-frame. The framework may include a drive assembly configured and arranged to engage the carriage and move it between first and second positions. The framework may include one or more rails that may support a plant stand. In the illustrative embodiment, it is contemplated that it may be preferable to have the guide assembly and the rail(s) substantially parallel to each other and, the guide assembly may be oriented horizontally and supported in an elevated position.

In accordance with another aspect of the controlled environment and method, the illustrative embodiment of the irrigation system may include a movable support in the form of a carriage. The illustrative embodiment of a carriage may comprise a body having a platform with first and second surfaces. The carriage may also comprise a plurality of struts in the form of a first side wall and a second side wall, wherein the first and second side walls may be substantially parallel with each other. The first and second side walls may be oriented so that they are generally orthogonal or perpendicular to a plane defined by the second surface of the platform. Each of the first and second side walls may include at least one friction reducing element in the form of a rotatably mounted wheel that is capable of supporting the carriage as it is moved from a first position to a second position. In the illustrative embodiment, it is contemplated that one of the side walls of the carriage may be provided with an extension and a connecting element with which to engage the carriage with the drive assembly, and two carriages may be engaged with each other by a link to form a carriage assembly.

In accordance with another aspect of the controlled environment and method, the illustrative embodiment of the irrigation system may include a delivery arrangement configured to provide a nutrient supply. The illustrative embodiment of a delivery arrangement may comprise an intake portion that may be stationary and a discharge portion that may be movably engaged with a carriage or carriage assembly. The intake portion of the delivery arrangement may comprise a reservoir that is in fluidic communication with a pump that may be operatively engaged by a motive source. Output from the pump may be engaged with and in communication with a first end of a supply line. The second end of the supply line may be supported by a carriage or carriage assembly (as the case may be) and may form part of the discharge portion of the delivery arrangement. The second end of the supply line may be engaged with a trunk that leads to a branch that may include one or more exit ports. Alternatively, the supply line may be engaged with two trunks, each of which may lead to a branch that may include one or more exit ports. The branch or branches may be attached or engaged with a carriage or carriages (or carriage assembly), such that when the carriage or carriages (or carriage assembly) are moved, the exit ports move with the carriages (or carriage assembly) and the exit ports are able to deliver nutrient supply to a plant, preferably at its roots. The reservoir may be operatively engaged with a recycling arrangement and/or periodically replenished by a main tank.

In accordance with another aspect of the controlled environment and method, the illustrative embodiment of the irrigation system may include a recycling arrangement. The recycling arrangement may comprise a flexible collector that may be configured and arranged to receive nutrient supply not absorbed by plant roots. An illustrative embodiment of a collector may have a width that is greater than a width defined by rails of a framework, and a length that is substantially equal to a length defined by first and second ends of the framework. In use, a collector may be engaged with the rails of the framework. The greater width of the collector may allow a portion of the collector to be positioned below a carriage or carriage assembly. If the framework rails are horizontal, one end of the collector may be positioned so that it is at a different elevation than the other end of the collector. This may enable nutrient supply or other material received by the collector to flow toward the lower-positioned end where it may be directed to the reservoir by a conduit or tubing. With framework illustrative embodiments that include upwardly opening U-shaped rails, the rails may serve as gutters that also function in a similar manner as the collector. Like the collector, the gutters may be engaged with a conduit or tubing that directs nutrient supply to the reservoir.

Some advantages of the controlled environment and method may include but are not limited to: (1) an irrigation system that may be able to apply nutrient supply directly to plant roots in an efficient and cost effective manner; (2) provide a plant arrangement that may maximize the number of plants per square foot that may be cultivated in a given area; (3) provide nutrient supply to a higher number of plants with a reduced number of nozzles; (4) provide a system in which the plants may be initially positioned and then repositioned during various stages of their growth cycle; (5) groups of plants may be grown and processed on a continuous basis; (6) the nozzles operate on a continuous basis and may be less prone to clog up; (7) plants/crops may be subjected to different growth environments, which growth environments may be tailored to the life cycle requirements of the plants/crops; and, (8) groups of plants may be easily handled and transported during their life cycle.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limited of its scope, the invention will be described and explained with additional specificity and detail through the use of the accompanying drawings.

FIG. 1 is a perspective view of a portion of an illustrative embodiment of an irrigation system.

FIG. 2A is a partial perspective view of an illustrative embodiment of a framework, a carriage assembly, and a portion of an illustrative embodiment of a delivery arrangement in an irrigation system.

FIG. 3 is a top plane view of the embodiment of FIG. 2, along with additional portions of the delivery arrangement engaged with an illustrative embodiment of a carriage assembly.

FIG. 4 is a side elevational view of the embodiment of FIG. 3.

FIG. 6 is a partially exploded perspective view of the embodiment of FIG. 3.

FIG. 7B is a partially exploded perspective view of the embodiment of a carriage assembly of FIG. 6.

FIG. 8 is a partial, perspective view of an illustrative embodiment of a plant stand that may be used with the illustrative embodiment of the irrigation system.

FIG. 10A is a perspective view of another embodiment of a holder.

FIG. 10B is a side view of the embodiment of a holder shown in FIG. 10A.

FIG. 10C is a partial, top plane view of a portion of the holder shown in FIGS. 10A & 10B.

FIG. 11A is a perspective view of an embodiment of an insert that may be used with the embodiment of a holder shown in FIG. 10A.

FIG. 11B is a side view of the embodiment of an insert shown in FIG. 11A.

DETAILED DESCRIPTION

Figure 2B:
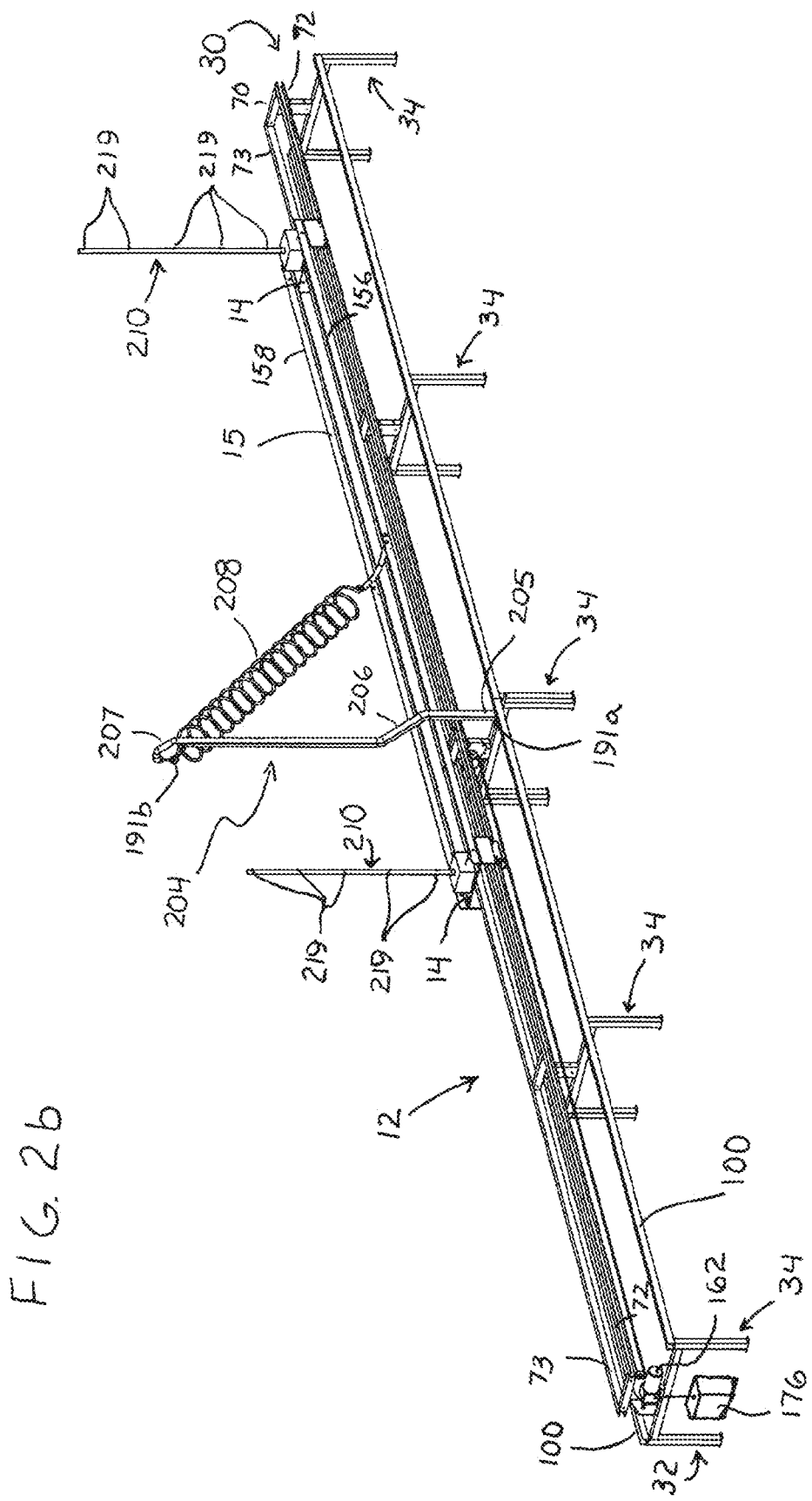
FIG. 2B is a partial perspective view of another illustrative embodiment of a framework, a carriage assembly, and a portion of a delivery arrangement of an irrigation system.

| ELEMENT DESCRIPTION | ELEMENT # |
|---|---|
| Irrigation system | 10 |
| Framework | 12 |
| Carriage | 14 |
| Carriage assembly | 15 |
| Delivery arrangement | 16 |
| Plant stand | 18 |
| Plant | 22 |
| Shoot | 24 |
| Root | 26 |
| First end | 30 |
| Second end | 32 |
| Sub-frame | 34 |
| Center post | 36 |
| (Center post) upper end | 38 |
| (Center post) lower end | 40 |
| Outer post | 48, 54 |
| (Outer post) upper end | 50, 56 |
| (Outer post) lower end | 52, 58 |
| Cross bar | 60 |
| Opposing ends | 62, 64 |
| Flange | 66 |
| Bracket | 68 |
| Guide assembly | 69 |
| Crossbeam | 70 |
| First end | 71a |
| Second end | 71b |
| Guide member | 72, 73 |
| Base | 74 |
| Side wall | 76, 82 |
| Channel | 88 |
| Rail | 100 |
| Base | 102 |
| Side wall | 104, 106 |
| Slot | 108 |
| Angle | 110 |
| Platform | 134 |
| Strut | 140, 142 |
| First end | 144 |
| Second end | 146 |
| Attachment bar | 147 |
| Friction reducing element | 148 |
| Extension | 152 |
| Connecting element | 154 |
| Link | 156, 158 |
| Drive assembly | 160 |
| Motive source | 162 |
| Drive shaft | 164 |
| Drive member | 166 |
| Belt | 168 |
| Idler roller | 170 |
| Spindle | 172 |
| Sensor | 174 |
| Programmable controller | 176 |
| Reservoir | 180 |
| Platform | 182 |
| Pump | 184 |
| Motive source | 186 |
| Booster pump | 188 |
| Supply line | 190 |
| End | 191a, 191b |
| Fixture | 194 |
| Rotary connector | 195 |

-continued

| ELEMENT DESCRIPTION | ELEMENT # |
|---|---|
| T-connector | 196 |
| Compressor | 197 |
| Conduit | 198 |
| First end | 199a |
| Trunk | 200, 201 |
| Connector | 202, 203 |
| Mast | 204 |
| Bottom end | 205 |
| Transition | 206 |
| Top end | 207 |
| Intermediate conduit | 208 |
| Branch | 210 |
| Side | 275a, 275b |
| Tubing | 216 |
| Connector | 218 |
| Exit port | 219 |
| Nozzle | 220 |
| Plug | 222 |
| Frame | 250, 280 |
| Top member | 252, 282 |
| Plate | 253, 283 |
| Middle member | 254, 284 |
| Bottom member | 256, 286 |
| Wheel | 258 |
| Side member | 260, 266, 290, 296 |
| Aperture | 262, 268, 292, 298 |
| Crossbar | 264, 294 |
| Flange | 265 |
| Stop pin | 267 |
| Holder | 272, 302 |
| Holder section | 272, 272', 272" |
| Upper end | 273a, 273a', 273a''' |
| Lower end | 273b, 273b', 273b''' |
| Trough | 274 |
| Fastening element | 277 |
| Aperture | 276, 306 |
| Bedding material | 278 |
| Pivot connection | 308, 310 |
| Strap | 312 |
| Angle | 314 |
| Cap | 318 |
| Collector | 320 |
| Resilient clip | 321 |
| Holder (holder body) | 340, 340', 340", 340''' |
| Upper end | 342 |
| End | 345a, 345b |
| Tray | 346 |
| Bottom | 348 |
| Bowed portion | 349 |
| Side | 350, 351, 352 |
| Channel | 354 |
| Ledge | 356, 358 |
| Leg | 360 |
| Front surface | 361 |
| Arc | 362 |
| Rear surface | 363 |
| Transition point | 364 |
| Foot | 366 |
| Circular section | 370 |
| Slot | 372 |
| Flange | 374 |
| Insert | 380 |
| Base | 382 |
| Side wall | 384, 386 |
| Channel | 388 |
| End | 390a, 390b |
| Outwardly extending portion | 390, 392 |
| Inwardly extending portion | 394, 396 |
| Lighting fixture | 400 |
| Roof line | 401a |
| Floor surface | 401b |
| Power source | 402 |
| Light path | 404 |
| Light source | 406 |
| HVAC | 408 |
| Case | 410 |
| End panel | 411 |

-continued

| ELEMENT DESCRIPTION | ELEMENT # |
|---|---|
| Case top | 412 |
| Case bottom | 414 |
| Case post | 416 |
| Support | 417 |
| Receiver | 417a |
| Case reflective surface | 418 |
| Bottom reflector | 420 |
| Bottom reflector base | 422 |
| Bottom reflector peak | 424 |
| Bottom reflector surface | 426 |
| Top reflector | 430 |
| Top reflector base | 432 |
| Top reflector peak | 434 |
| Top reflector first surface | 436a |
| Top reflector second surface | 436b |
| Center reflector | 440 |
| Center lower intersection | 442 |
| Center reflector peak | 444 |
| Center reflector first surface | 446a |
| Center reflector second surface | 446b |
| Lateral support | 450 |
| Pulley support | 452 |
| Fixture connector | 454 |
| Winch support | 456 |
| Main pulley | 460 |
| Ancillary pulley | 462 |
| Main cable | 464 |
| Ancillary cable | 466 |
| Winch | 468 |
| Row | 470 |
| Support frame | 500 |
| Structure floor | 502 |
| First raised surface | 504a |
| Second raised surface | 504b |
| Ledge | 505 |
| Trough | 506 |
| Base member | 510 |
| Base upright | 512 |
| Base crossbeam | 514 |
| Rail | 520 |
| Rail apex | 522 |
| Pan | 530 |
| Edge | 532 |
| First surface | 533 |
| Second surface | 534 |
| Center surface | 535 |
| Secondary frame | 540 |
| Crossbar | 542 |
| Mount | 542a |
| Connector | 544 |
| Wheel | 546 |
| Air system | 550 |
| Duct | 552 |
| Aperture | 553 |

Before the various embodiments of the present invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description of the present invention, and do not alone indicate or imply that the device or element referred to must have a particular orientation. In addition, terms such as "first", "second", and "third" are used herein and in the appended claims for purposes of description and are not intended to indicate or imply relative importance or significance. Reference will now be made in detail to exemplary and illustrative embodiments of the irrigation system which are illustrated in the accompanying drawings. Wherever possible, the same reference numbers will be used throughout the drawings to refer to the same or like parts. The scope of the present disclosure is not limited by the specific plants 22 and/or crops used therewith, but is meant to extend to any type of organism that may be grown using one or more features in accordance with the present disclosure. As used herein, the term "bedding material" extends to any type of medium that may grow, sustain, and/or otherwise support an organism.

An illustrative embodiment of an irrigation system 10 may be configured and arranged so that it is able to provide nutrient supply to one or more plants, preferably at the roots and/or rootlets and/or root balls of one or more plants. As used herein, the term "nutrient supply" is meant to comprise at least water and other essential plant growth materials, which plant growth materials may or may not be soluble in water, and which may or may not include carbon dioxide, nitrogen, and/or sugars depending on the specific application. In an illustrative embodiment as shown in FIG. 1, an irrigation system 10 may include elements such as a framework 12, a carriage 14 or carriage assembly 15, a delivery arrangement 16, and a plant stand 18. In some embodiments, the framework 12 may be generally longitudinal and have first and second ends 30, 32 that define the length thereof. In some embodiments a framework 12 may have a length that is approximately equal to the width of one plant stand 18. In other embodiments, a framework 12 may have a length that is greater than the width of a single plant stand 18. In yet other embodiments, a framework 12 may have a length that is equal to many plant stand 18 widths. Accordingly, the length of the framework 12 and/or the width of a plant stand 18 in no way limit the scope of the irrigation system 10. For purposes of clarity, in the figures included herewith only one plant stand 18 has been depicted in conjunction with a framework 12. However, it will be understood that differently configured and/or additional plant stands 18 may be included without limitation. When multiple plant stands 18 are used, it may be desirable to position them so that their side members 260, 266, 290, 296 may abut one another. In either case, a plant stand 18 or plant stands 18, when combined with one or more holders 302 (as described in detail below), may be configured to form a chamber "C" into which plant roots may protrude.

In some embodiments, a plant stand 18 or plant stands 18 may be operatively engaged by one or more rails 100 that may form part of the framework 12. In some embodiments, the rails 100 of a framework 12 may be elevated with respect to a supporting surface (e.g., the ground, a floor, etc.). In other embodiments, the rails 100 of a framework 12 may be situated at ground level (not shown) or higher. The rails 100, which may be substantially parallel to each other and the longitudinal axis of the framework 12, may serve to engage a plant stand 18 or plant stands 18 in a constrained manner as the plant stand 18 is be moved between first and second positions of the framework 12.

In some embodiments, a framework 12 may include an element such as a guide assembly 69. The guide assembly 69 may include a carriage engagement portion that operatively engages a carriage assembly 15 (or a carriage 14) so that the carriage assembly 15 can be moved between the ends 30, 32 of the framework 12 in a constrained manner (e.g., in a single dimension). In the illustrative embodiment of a guide assembly 69, the carriage engagement portion may be formed as a channel along the length of the guide assembly 69, such that a portion of the carriage 14 and/or carriage assembly 15 engages the channel in such a manner as to allow the carriage 14 and/or carriage assembly 15 to move with respect to the guide assembly 69 only along the length thereof, which is described in detail below. Other structures and/or methods of ensuring the carriage 14 and/or carriage assembly 15 is capable of moving in only one dimension with respect to a guide assembly 69 may be used without limitation. The guide assembly 69 may be situated between two rails 100 of a framework 12. In some embodiments, the guide assembly 69 may be elevated. In the illustrative embodiment, the guide assembly 69 may be substantially parallel to the rails 100 and the longitudinal axis of the framework 12.

The illustrative embodiment of the framework 12 shown in FIG. 1 may include one or more sub-frames 34. An illustrative embodiment of a sub-frame 34 may include elements such as a generally vertically oriented center (or inner) post 36 (see, for example, FIGS. 2 and 5), one or more generally vertically oriented outer posts 48, 54, and a crossbar 60, which may be configured to engage the center and outer posts 36, 48, 54, respectively, to each other. As discussed in detail below, the outer posts 48, 54 of each sub-frame 34 may be engaged with a rail 100, while the center post 36 of each sub-frame 34 may be engaged with the guide assembly 69 and/or a rail 100. In the illustrative embodiment, the sub-frames 34 may be spaced apart from each other and may be oriented so that they are transverse to the longitudinal axis of the framework 12. However, other orientations and/or configurations may be used without limitation.

As mentioned above and as best shown in FIG. 5, an illustrative embodiment of a sub-frame 34 may include elements such as a generally vertically oriented center (or inner) post 36, a plurality of generally vertically oriented outer posts 48, 54, and a crossbar 60 that may engage both the center and outer posts 36, 48, 54, respectively. In an illustrative embodiment, a center post 36 may include an upper end 38 and a lower end 40, wherein the upper end 38 may be engaged with a crossbeam 70 of a guide assembly 69, and wherein the lower end 40 may be engaged with a crossbar 60. The crossbar 60 may include opposing ends 62, 64, each of which may be engaged with an outer post 48, 54. Each outer post 48, 54 may include an upper end 50, 56 to which a portion of a rail 100 may be engaged, and a lower end 52, 58 that may rest upon the ground. In some embodiments, the lower end 52, 58 of one or both of the outer posts 48, 54 may be provided with one or more flanges 66. The flange(s) 66 may include one or more aperture(s) (not shown) that can be used in conjunction with fastening elements (not shown) so that the sub-frame 34 may be removably engaged with a support, such as the structure floor 502 and/or a support base engaged with such a floor. As mentioned above, the lower end 40 of the center post 36 may be engaged with a crossbar 60 that engages the center post 36 with one or more outer posts 48, 54. In some embodiments, however, the center post 36 may be independent of the sub-frame 34. To that end, the lower end 40 of a center post 36 may be provided with one or more apertured flanges (see, for example, flanges 66 of the outer posts 48, 54) that may be used in conjunction with fastening elements (not shown), so that the center post 36 may be engaged with a suitable support, such as the structure floor 502 and/or a support base engaged with such a floor. In some embodiments, the flanges 66 may be laterally oriented. Similarly, each outer post 48, 54 may be independent of the sub-frame 34. That is, the lower end of each outer post 48, 54 may be provided with one or more apertured flanges 66 that may be used in conjunction with fastening elements (not shown), so that the outer posts 48, 54 may be engaged with a suitable support, such as the structure floor 502 and/or a support base engaged with such a floor. In some embodiments, both the guide assembly 69 and at least one rail 100 may extend the length of the framework 12 and a substantially parallel manner. In some embodiments, the guide assembly 69 and at least one rail 100 may be elevated above a suitable support surface (not shown), such as the structure floor 502 and/or a support base engaged with such a floor. The sub-frames 34 and/or framework 12 may be assembled on site or they may be assembled or partially assembled at a remote location and moved to a desired site.

As mentioned above, the upper end 38 of the center post (or inner post) 36 may be configured and arranged to be engaged with a guide assembly 69. The guide assembly 69 may constrainingly engage a carriage assembly 15 and/or carriage 14 that the carriage assembly 15 may traverse between first and second ends 30, 32 of a framework 12. The guide assembly 69, which may be engaged with the upper end 38 of the center (or inner) post 36, may include a horizontally oriented crossbeam 70 that may include first and second opposing ends 71a, 71b. Each end of the crossbeam may be configured and arranged so as to be able to provide support for a guide member 72, 73, each of which may include a carriage engagement portion as described in detail above.

In an illustrative embodiment, the carriage engagement portion of each guide member 72, 73 may be generally c-shaped may include a base and two side walls, with the two side walls defining a slot or channel. One guide member 72 may be engaged with first ends 71b of one or more crossbeams of a plurality of sub-frames 34, while another guide member 73 may be engaged with second ends 71a of one or more crossbeams 70 of the plurality of sub-frames 34 (see, for example, FIGS. 5 and 6). Since both guide members 72, 73 may be configured to be essentially the same, only one guide member 72, 73 need be discussed in detail when describing the illustrative embodiment.

Guide member 72 may include a base 74 and two side walls 76 and 82, with the two side walls 76, 82 defining a slot or channel 88. In an illustrative embodiment, the guide member 72 may be oriented so that the channel 88 defined by its side walls 76, 82 is generally horizontally oriented. Such an arrangement positions the channel 88 of each guide member 72, 73 so that they face in opposite directions. The channel 88 of guide member 72 may be configured to receive one or more friction reducing elements 148 (see, for example, FIGS. 5, 7A, 7B, wherein the friction reducing elements are configured as wheels) from one side of at least one carriage 14 or one or more friction reducing elements 148 from one side of a carriage assembly 15. As depicted, the friction reducing elements 148 of a carriage 14 or carriage assembly 15 may be supported by an upper surface of lower side wall 84 of guide member 72. The upper side wall 76 of guide member 72 may serve to protect the friction reducing elements 148 and to prevent the carriage 14 or carriage assembly 15 from being accidently lifted off of the guide assembly 69. The upper side wall 76 of guide member 72 may also serve to provide stability and strength to the guide member 72. Alternatively, in some embodiments, a guide member 72, 73 may have a generally L-shaped profile comprising a base and one side wall, and a carriage 14 and/or carriage assembly 15 may include upper and lower friction reducing elements 148 that are spaced apart from each other so that the side wall can be located therebetween. In other embodiments of the L-shaped guide member and carriage assembly 15, the upper wheel may remain the same but the lower support wheel may be replaced with a finger that is positioned below the upper wheel and underneath the L-shaped guide member. In yet other embodiments, a guide member may include a generally horizontal support bed with a vertical wall, with the wall engagably straddled by one or more grooved wheels of a carriage. Alternatively, the guide member 72, 73 may be configured to engage the carriage 14 and/or carriage assembly 15 in a slideable fashion. Accordingly, the specific structure and/or method used to engage a carriage 14 and/or carriage assembly 15 with a guide assembly and/or framework 12 in no way limits the scope of the present disclosure.

In illustrative embodiments, the upper end 50, 56 of some or all of the outer posts 48, 54 may be used to provide support for a rail 100. As mentioned above, one or more rails may be used engage a plant stand 18 or plant stands 18 in a constrained manner as the plant stand 18 or plant stands 18 are moved between the ends of the framework 12. In an illustrative embodiment best shown in FIGS. 5 and 6, a rail 100 may be generally u-shaped and may include a base 102 and parallel side walls 104, 106. The rail 100 may be engaged with one or more outer or outlying posts 48 or 54 of one or more sub-frames 34. In an illustrative embodiment, a rail 100 may be generally parallel with the guide assembly 69. A rail 100 may be oriented so that a slot 108 defined by the base 102 and side walls 104 and 106 is generally vertically oriented and so that the slot 108 opens primarily upwardly. In some embodiments, two rails 100 may be canted or angled with respect to the vertical so that their respective slots 108 define planes that converge towards each other at a point located above the framework 12 (see, for example, in the manner in which top members 252, 282 of the frames 250, 280 converge toward one another in FIG. 1). To that end, one or both of the rails 100 may be angled 110 with respect to the vertical from a range of approximately 0 degrees to approximately 60 degrees. A preferred range from the vertical is from a range of approximately 5 degrees to approximately 45 degrees. As will be discussed later, the rails 100 may form a portion of a recycling arrangement. That is, the rails 100 may be able to serve as gutters to collect nutrient supply that may collect, condense, or otherwise be deposited on one or more plant stands 18, and which may flow downwardly therealong. In such a situation, rails 100 may be provided with tubing (not shown) that is able to direct the nutrient supply to a reservoir for recycling. Filters (not shown) may be used in conjunction with the tubing, if desired, as may other treatments, including but not limited to UV exposure.

Figure 7A:
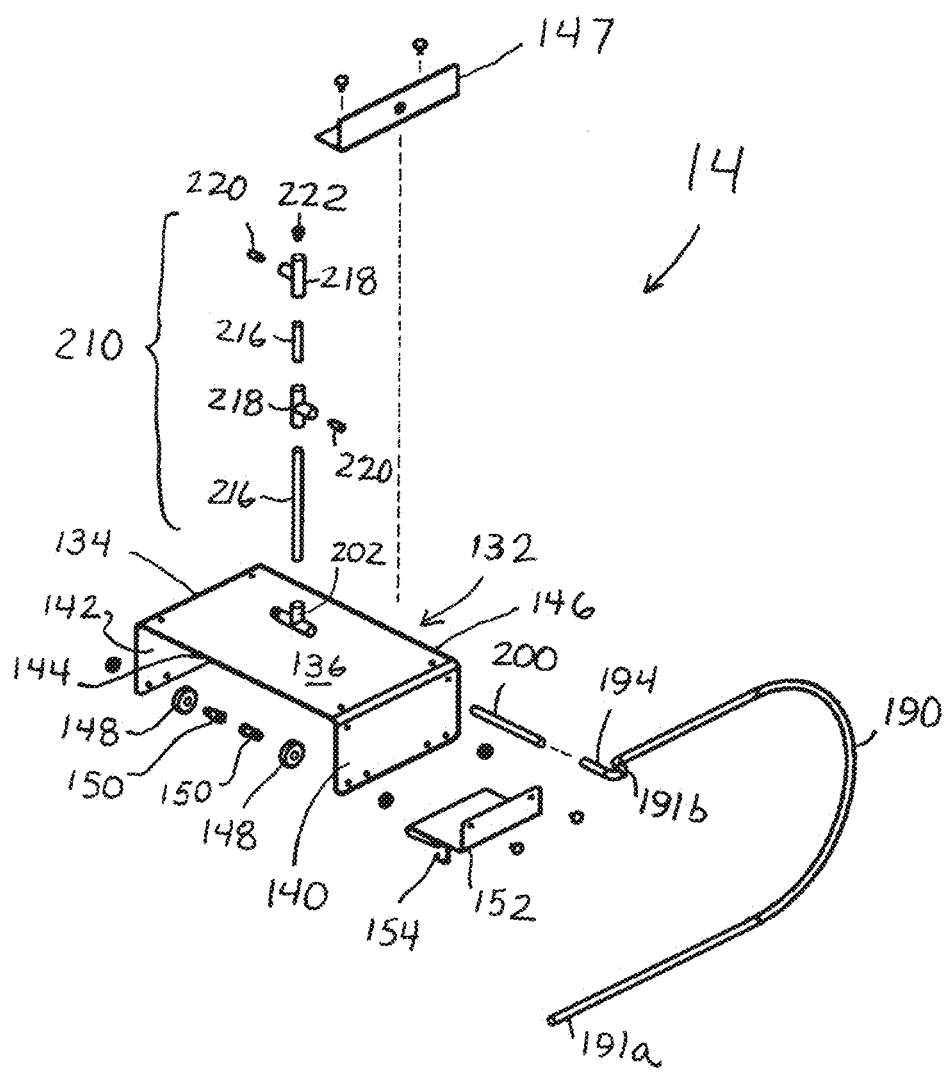
FIG. 7A is a partially exploded perspective view of an illustrative embodiment of a single carriage suitable for use with the illustrative embodiment of the irrigation system.

An illustrative embodiment of a carriage 14 that may be utilized with the illustrative embodiment of an irrigation system is depicted in FIG. 7A. The carriage 14 may be used to support a segment of the discharge portion of the delivery arrangement 16. In the illustrative embodiment, the carriage 14 is configured and arranged to be engaged by the guide assembly 69. In some embodiments, the carriage 14 may move between first and second positions along the guide assembly 69. In other embodiments, the carriage 14 may be stationary.

A carriage 14 may include elements such as a body having a platform 134 with first and second ends 144, 146, an attachment bar 147, a plurality of struts 140, 142 and a plurality of friction reducing elements 148 (such as a wheel as depicted in the illustrative embodiment). In an illustrative embodiment, the platform 134 is generally planar and may have a first surface 136 and a second surface 138 that may be substantially parallel to each other. The first surface 136 of the platform 134 may provide support for a segment of the discharge portion of the delivery arrangement 16. In the illustrative embodiment, the first surface 136 may provide support for a branch 210 of the delivery arrangement 16. In some embodiments, the carriage 14 may include an attachment bar 147 that may be engaged with the platform 134, and which may serve as an engagement point for a fixture or fitting 194 of the discharge portion of the delivery arrangement 16. The struts 140, 142 of the carriage 14 may be substantially parallel to each other and may be oriented so that they are substantially orthogonal or perpendicular to a plane defined by the second surface 138 of the platform 134. In the illustrative embodiment, the struts 140, 142 may depend downwardly from the platform 134. Each strut 140, 142 may be provided with one or more friction reducing elements (not shown). The friction reducing elements may be, for example, strips of material having a low coefficient of friction, roller bearings, wheels, or the like. In some embodiments, each strut has an inwardly facing surface to which an inwardly facing, rotatably mounted wheel 148 is mounted. The wheels 148 may be mounted on transversely oriented axles or spindles 150 in a conventional manner. In some embodiments, each strut of 140, 142 a carriage 14 may include a plurality of rotatably mounted wheels. In an illustrative embodiment there are two struts 140, 142, and each strut 140, 142 is in the form of a planar side wall that extends between the first 144 and second 146 ends of the platform 134. Each side wall may include a plurality if rotatably mounted wheels 148. As will be described in detail below, one side wall of a carriage 14 may include an extension 152 and a connecting element 154, wherein the connecting element 154 may be engaged with a portion of a drive assembly 160.

Figure 7B:
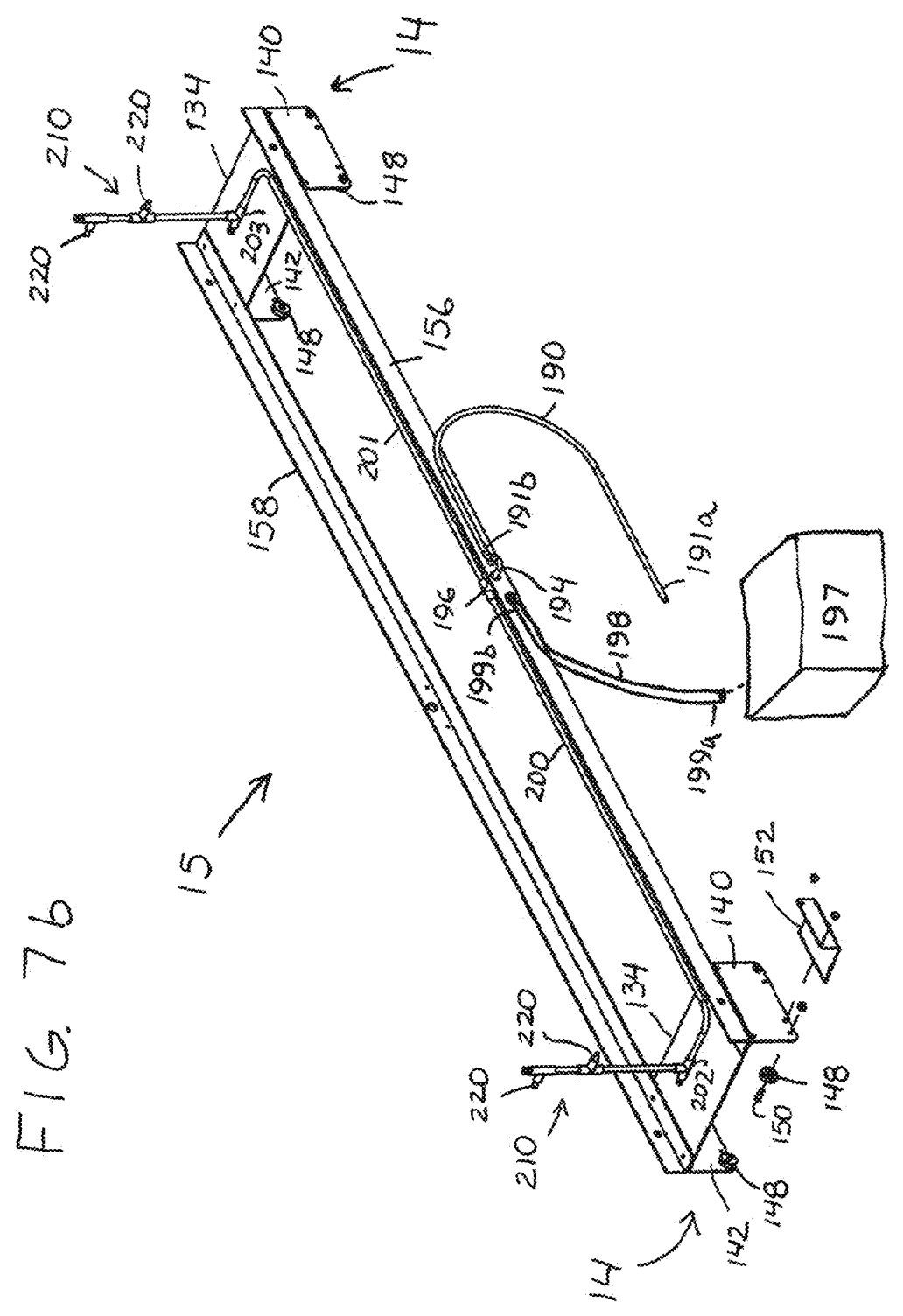

A plurality of carriages 14 may be engaged with one another by one or more links 156, 158 so as to form a carriage assembly 15 as best shown in FIG. 7B. The links 156, 158 may be configured allow the carriages 14 to move between first and second positions in a concurrent manner, which may be along a path defined by the guide assembly 69. In an illustrative embodiment, a link 156, 158 may be rigid and in the form of a beam. In other embodiments, a link 156, 158 may be a hollow tube. In other embodiments a link 156, 158 may be a portion of a delivery arrangement 16. In yet other embodiments, the link 156, 158 may be flexible (for example a flexible link could be in the nature of a cable or a chain). In the illustrative embodiment, there are two carriages 14 that are operatively engaged with each other by two links 156, 158 in the form of beams having L-shaped cross-sections. However, any structure and/or method suitable to engage one carriage 14 with another may be used without limitation.

Operation of a carriage assembly 15 comprising two carriages 14 and a link will now be discussed in further detail. In operation, the carriage assembly 15, which may be configured to support the discharge portion of the delivery arrangement 16, may be moved by the drive assembly 160 in a back-and-forth or reciprocal motion. The carriage assembly 15 may have a length of approximately one-half of length of the guide assembly 69. As will be understood, the link 156, 158 may have a length that permits this overall length to be achieved. Having a carriage assembly 15 that has an overall length of approximately one-half the length of a guide assembly 69 has an advantage over other carriage assembly 15 lengths because it reduces the amount of movement that is needed to attend to plants. For example, a plurality of plants may be supported by one or more plant stands 18 positioned along the length of the guide assembly

69. In such a configuration, the amount of movement needed by the carriage assembly 15 is one-half the amount of movement that would be needed by a single carriage 14. For example, a plurality of plants supported by one or more plant stands 18 positioned along the length of the guide assembly 69. If one end of the carriage assembly 15 is adjacent the first end of a guide assembly 69 and/or framework 12 and the carriage assembly 15 is moved toward the second end of the guide assembly 69 and/or framework 12, plants adjacent the first end of the guide assembly 69 and/or framework 12 and adjacent the middle of the guide assembly 69 and/or framework 12 would simultaneously receive nutrient supply. As the carriage assembly 15 is moved toward the second end of the guide assembly 69 and/or framework 12, the remaining plants would receive nutrient supply. As the carriage assembly 15 reaches the second end of the guide assembly 69 and/or framework 12, the plants adjacent the second end of the guide assembly 69 and/or framework 12 and adjacent the middle of the guide assembly and/or framework would receive nutrient supply. By careful design and/or selection and location of at least the carriage assembly 15, link 156, 158 length, and nozzles 220 of the discharge portion of the delivery arrangement 16, application of nutrient supply will not overlap in the middle as the carriage assembly 15 moves between the first and second ends. Other carriage assemblies 15 having more than two carriages 14 may be used in other embodiments without limitation.

Motive energy to a carriage 14 or carriage assembly 15 may be provided by a drive assembly 160 that is able to move a carriage 14 or carriage assembly 15 between first and second positions P1, P2 along the guide assembly 69, or, alternatively, the drive assembly 160 may be configured to move a carriage assembly 15 among the positions P2, P3 or P3, P1 along the guide assembly 69 (see, for example, P1 and P2, or P1 and P3 of FIG. 3). A drive assembly 160 may include may include elements such as a motive source 162 and a flexible belt 168 (which may be configured as a flexible endless belt, a chain, or any other suitable structure for communicating at least mechanical forces). In some embodiments, the motive source 162 and flexible belt 168 are operatively engaged with center posts 36 of a framework 12. In some embodiments, a motive source 162 is engaged with a bracket 68 that may be engaged with a center post 36. The bracket 68 may position the motive source 162 such that a drive shaft 164 of the motive source 162 is oriented so that it is transverse to the guide members 72, 73 of the guide assembly 69. In some embodiments, an idler roller 170 may be engaged with another center post 36, with the idler roller 170 mounted to a spindle 172 that is also oriented so that it is transverse to the guide members 72, 73. In the illustrative embodiment, the drive shaft 164 of the motive source 162 and the idler roller 170 may be located adjacent one end of a crossbeam 70 of a sub-frame 34 with which they may be engaged. The drive shaft 164 of the motive source 162 may be provided with a drive member 166 that engages the flexible belt 168. In an illustrative embodiment, the drive member 166 of the motive source 162 may be configured as a sprocket that engages a chain that is operatively engaged with a carriage 14 or carriage assembly 15. An example of a combination motive source 162 and speed controller that has been found to be suitable for certain embodiments of an irrigation system as disclosed herein is model no. 41K24RGN-AW2U/4GN30SA and is available from the Oriental Motor U.S.A. Corp. of Torrance, Calif. 90502. It will be understood that other drive assembly components and/or combinations thereof that are able to achieve similar carriage 14 and/or carriage assembly 15 movements may be used without departing from the spirit and scope of the present disclosure.

The drive assembly 160 may engage a carriage 14 or carriage assembly 15 by way of an operative engagement. In an illustrative embodiment, an operative engagement may include elements such as an extension 152 that may be engaged with a strut 140, 142 of a carriage 14, and a connecting element 154 that may be pivotally engaged with the extension 152 and the belt 168. The connecting element 154 may include pivot points that may be spaced apart from each other by a distance that allows the connecting element 154 to rotate about an extension 152 pivot point as the belt 168 pivot point may be located about a drive member 166 or an idler roller 170 of the drive assembly 160. In doing so, the effective engagement between the carriage 14 or carriage assembly 15 and the flexible endless belt 168 may move from a location on an upper portion of the belt 168 to a location on a lower portion of the belt 168. This configuration allows the direction of the carriage 14 or carriage assembly 15 to be reversed as the connection point between the carriage 14 or carriage assembly 15 and the belt 168 follows the motion of the belt 168. An advantage with such a configuration is that the direction of a carriage 14 or carriage assembly 15 may be reversed without having to reverse the direction of the motive source 162.

Alternatively, the connecting 154 element may be omitted and a carriage 14 or carriage assembly 15 (or an extension 152 thereof) may be directly engaged with a belt 168, in which case, reversal of motion may be desirable and may be achieved by using a reversible motive source 162. The reversible motive source 162 may be an electric motor. An example of a reversible motive source 162 that may be suitable for certain embodiments disclosed herein is model no. C6T17VC5 and is obtainable from Leeson Electric, of Grafton, Wis. 53024. It will be understood, though, that other motive sources 162 having similar capabilities may be used without departing from the spirit and scope of the present disclosure.

Control of the motive source 162 may be achieved using various implementations. For example, one implementation may include mechanical switches that may be operatively engaged with the motive source 162 and which may be positioned so that they may be actuated by the carriage 14 or carriage assembly 15 to cause the motive source 162 to reverse direction. Alternatively, another implementation may include one or more sensors 174 that are operatively engaged with the motive source 162 and which are positioned so that they can be actuated by the carriage 14 or carriage assembly 15 to cause the motive source 162 to reverse direction. Typically, such sensors 174 are in communication with a control box (not shown), which is in communication with (also not shown) the reversible motive source 162. In the illustrative embodiment, it has been found that suitable results for certain applications may be obtained using sensor(s) model no. PFM1-BN-1H obtainable from Automation Direct, of Cumming Ga. 30040. It will be understood, though, that other suitable sensors 174 may be used without departing from the spirit and scope of the present disclosure. In the illustrative embodiment, the sensors 174 may be engaged with the framework 12 so that they are in a position to be able to detect when a carriage 14 or carriage assembly 15 is at the ends of the desired movement (which may coincide with the ends of the framework 12). In the case of a single carriage 14, the sensors 174 may be located at the ends of the path of the carriage 14. In the case of a carriage assembly 15 comprising two carriages 14, at least one sensor 174 may be located at one end of the path and another sensor 174 located midway along the path. In some implementations, there may be a primary and a secondary sensor 174 at each location, with the secondary sensor 174 acting as a back-up for the primary sensor 174.

The discharge portion, which may include a branch 210 and one or more nozzles 220 (FIG. 7B), of the delivery arrangement 16 may be operatively engaged with a carriage 14 or carriage assembly 15. When the carriage assembly 15 (or carriage 14 as the case may be) is moved along a guide assembly 69, an exit port (associated therewith) may be configured to apply nutrient supply to a plant root 26 on a periodic basis. This periodic basis may range from approximately 4 seconds to approximately 20 minutes, which periodic basis will depend at least upon the plant grown. In the illustrative embodiment, it is contemplated that the periodic basis may have a range of approximately 30 seconds to approximately 3 minutes. As will be appreciated, a periodic basis is roughly equivalent to the time it takes for a carriage 14 or carriage assembly 15 to move or cycle along a guide assembly 69 from a first position to a second position and then back to the first position. As will also be appreciated, the first and second positions on a guide assembly 69 may vary. In some embodiments, a first position P1 and a second P2 position define a distance D1 on the guide assembly 69. The positions P1 and P2 may be located by the opposing ends of a guide assembly (FIGS. 3 and 6). In other embodiments, a first position P1 and a second P3 position define a distance D2 and may comprise only a partial portion of the total length of the guide assembly 69 (FIGS. 3 and 6).

In some embodiments, a partial portion or distance D2 may be centrally located. In other embodiments, the partial portion or distance D2 may be skewed toward one end or the other of the guide assembly 69. As will be appreciated, the speed at which a carriage 14 or carriage assembly 15 traverses a guide assembly 69 may depend upon several variables, including but not limited to the distance traveled, the particular plants/crop, the stage of plant growth, etc. In some illustrative embodiments, a carriage 14 or carriage assembly 15 may have a travelling speed in the range of approximately 0 inches per second (stationary) to approximately 24 inches per second. In other illustrative embodiments, a carriage 14 or carriage assembly 15 may have a travelling speed has a range of approximately 1 inch per second to approximately 6 inches per second. In some embodiments, the travelling speed of the carriage 14 or carriage assembly 15 may be substantially the same in both directions as the carriage 14 or carriage assembly 15 traverses between the ends of the framework 12. However, in other embodiments, the travelling speed may vary as desired. For example, the carriage 14 or carriage assembly 15 may travel at approximately 1 inch per second in a first direction from a starting point, and when the carriage 14 or carriage assembly 15 reaches an ending point, it may travel approximately 1 foot per second in an opposite direction back to the starting point. Moreover, the travelling speed need not be constant. Some embodiments may allow the speed of a carriage 14 or carriage assembly 15 to be faster and/or slower as it moves between the start and end points, and some embodiments may allow a carriage 14 or carriage assembly 15 to pause once or many times as it moves between start and end points. In this way, operation of an irrigation system 10 may be tailored to accommodate plants that require more nutrient supply as opposed to plants that require less nutrient supply. Other variations of carriage 14 or carriage assembly 15 travelling speeds may be employed without departing from the spirit and scope of the present disclosure. As will be understood, control of the carriage 14 or carriage assembly 15 may be automated by a programmable controller 176. An example of a programmable control system that may be suitable for several embodiments is the Micro800 and is obtainable from Allen Bradley at http://ab.rockwellautomation.com/Programmable-Controllers/Micro800.

For embodiments in which the travelling speed of the carriage 14 or carriage assembly 15 may be substantially the same in both directions as the carriage 14 or carriage assembly 15 traverses between positions along the length of the framework 12, drive assemblies 160 that employ a reversible motive source 162 may be preferred generally, particularly when nozzles 220 have the ability to apply nutrient supply in more than one direction, either simultaneously or alternatively. That is, when the carriage 14 or carriage assembly 15 moves in a first direction, the nozzles 220 apply nutrient supply to substantially only the exposed plant roots 26 of the first frame 250, and when the carriage 14 or carriage assembly 15 moves in a opposite direction, the nozzles 220 apply nutrient supply to substantially only the exposed plant roots 26 gown in the second frame 280. Thus, delivery of nutrient supply may oscillate as the carriage 14 or carriage assembly 15 moves back and forth.

This bi-directional oscillating application of nutrient supply may be accomplished in a number of ways. In one embodiment, nozzles 220 point in one direction and a vertical branch 210 is rotatably mounted about its longitudinal axis on the carriage 14. Rotation may be provided pressure of the nutrient supply as it flows through the supply line 190. This could be accomplished by providing an impeller that is geared to a larger gear, which in turn is linked to branch 210 in the manner of an oscillating sprinkler. In another embodiment, rotation of the branch 210 may be achieved by providing the branch 210 with a horizontal lever having an end that is engaged by a horizontal projection that extends from the framework 12. When the carriage 14 or carriage assembly 15 reaches the end point, the projection may engage the lever and rotate the branch 210 in one direction. When the carriage 14 or carriage assembly 15 reaches the other end point, a similar projection may engage the lever and rotate the branch 210 in the opposite direction. It will be understood that other similar mechanical mechanisms may be used without departing from the spirit and scope of the present disclosure. Alternatively, the branch 210 may be stationary and the nozzles 220 may be controlled by solenoids. It is contemplated that in an irrigation system 10 configured with nozzles 220 that may oscillate, it may be advantageous to use tubing 216, supply line 190, and/or other fluid conduit elements that are constructed of a flexible or semi-flexible material. In such a configuration it is contemplated that the nozzles 220 may be positioned from about six inches to about six feet from adjacent nozzles 220.

Other implementations that achieve the bi-directional oscillation are possible, and bi-directional oscillation may be incorporated into a system in which the carriage 14 and/or carriage assembly 15 is not mobile along the length of the framework 12 or a portion thereof. That is, certain configurations will reap advantages from a bi-directional oscillation delivery arrangement 16 wherein the only motion of any of the delivery arrangement 16 elements with respect to the roots 26 during growth is rotational motion. In one example, there may be two vertical branches 210 for each carriage 14, with each branch 210 having nozzles 220 that may be dedicated to deliver nutrient supply to a particular frame 250, 280. In such an instance, flow of nutrient supply may be controlled (by solenoids) so that one, both, or none of the vertical branches 210 is able to deliver nutrient supply to the plants. An example of solenoids that have been found to be suitable for this application are series numbers 3827 and 1500 and are obtainable from Spartan Scientific of Boardman, Ohio 44513. It will be understood, though, that other solenoids having similar capabilities may be used without departing from the spirit and scope of the present disclosure. Alternatively, each branch 210 may be provided with its own supply line 190 that may be controlled be its own solenoid.

In another embodiment of a drive assembly 160 that may be used in accordance with the present disclosure, a screw (not shown) may extend along a portion of the framework 12. In such an embodiment, the carriage 14 and/or carriage assembly 15 may be configured to engage the screw via one or more screw receivers (not shown). The motive source 162 may be engaged with either the screw or the screw receiver(s), such that rotation of either the screw or the screw receiver(s) causes the carriage 14 and/or carriage assembly 15 to move along the length of the framework 12 in either a first or second direction. In such an embodiment, the speed of rotation of either the screw or the screw receiver(s) may determine the linear speed of the carriage 14 and/or carriage assembly 15. It will be apparent from the present disclosure that an infinite number of structures and/or methods exist to move a carriage 14 and/or carriage assembly 15 along a guide assembly 69 or any other geometrically shaped structure. Accordingly, the present disclosure is not limited by the specific structure and/or method employed to move any carriage 14 and/or carriage assembly 15 with respect to a guide assembly and/or framework.

An illustrative embodiment of a support frame 500 is shown in FIGS. 20-22A. In certain embodiments of an irrigation system 10, the support frame 500 shown and described herein may be used in place of a framework 12. This embodiment of a support frame 500 is shown with side members 260, 266, 290, 296 (having a wheel 258 at the bottom of each) of a plant stand 18 engaged with the support frame 500 to provide reference, but the scope of the support frame 500 as disclosed herein is in no way limited by the elements engaged with the support frame 500 and/or supported thereby.

Figure 20:
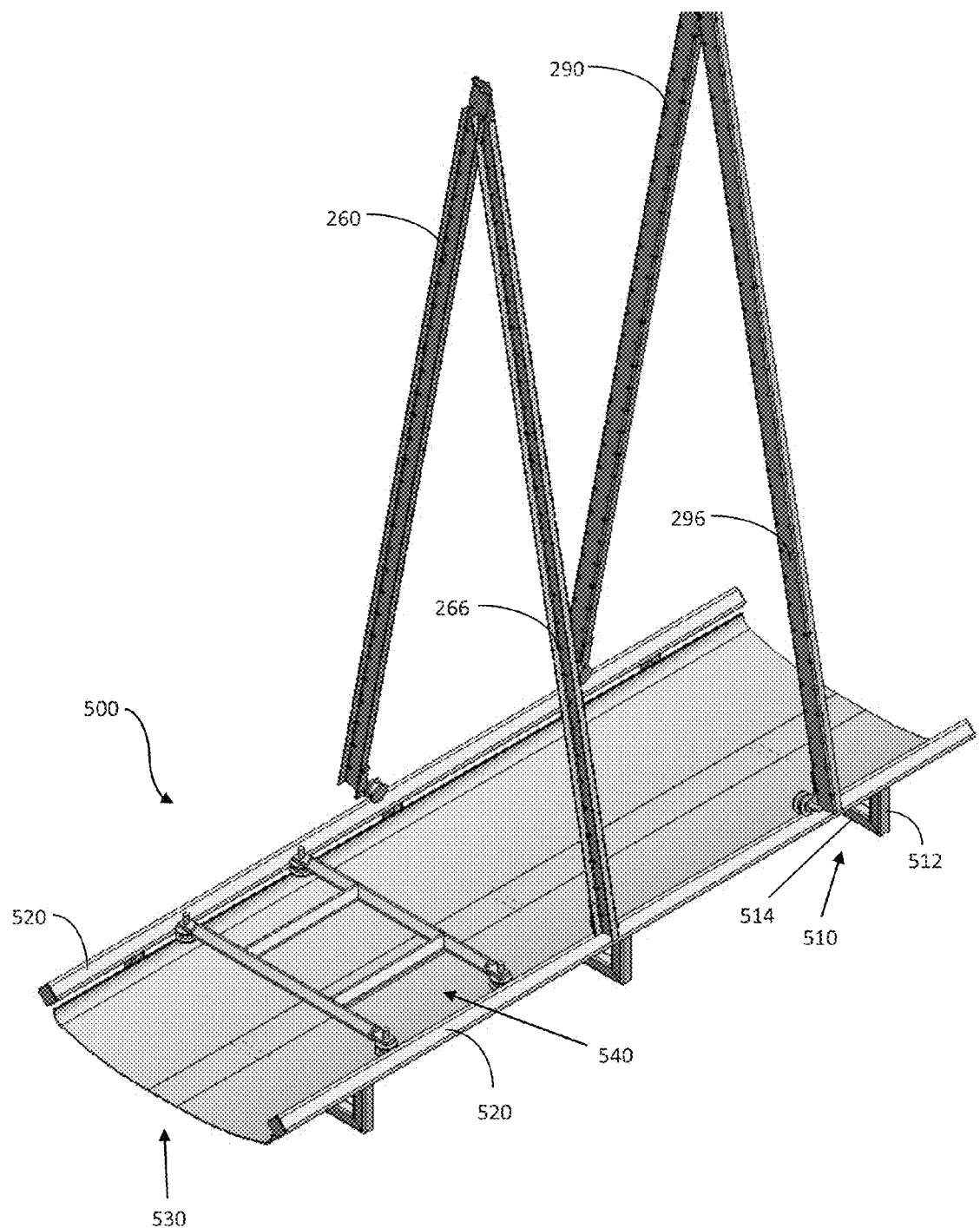
FIG. 20 is an elevated perspective view of an illustrative embodiment of a support frame that may be used with certain embodiments of an irrigation system.
Figure 22:
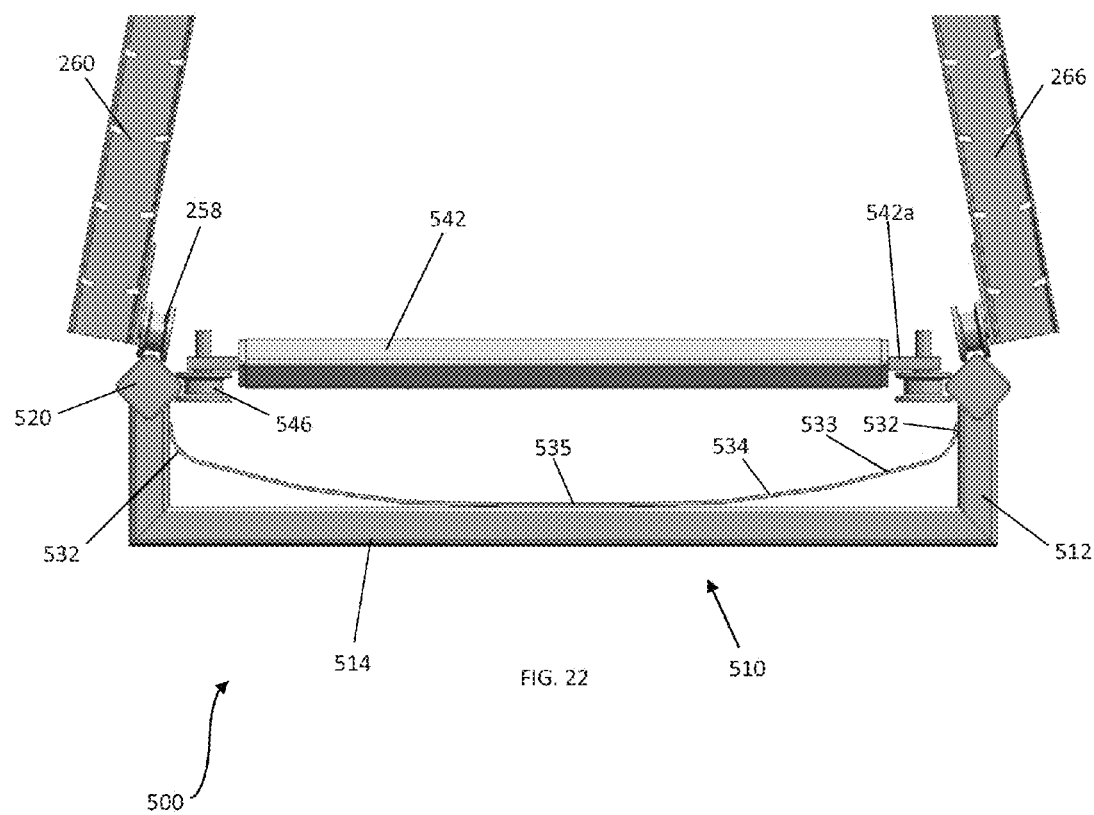
FIG. 22 is an end view of the support frame shown in FIGS. 20 & 21.
Figure 23:
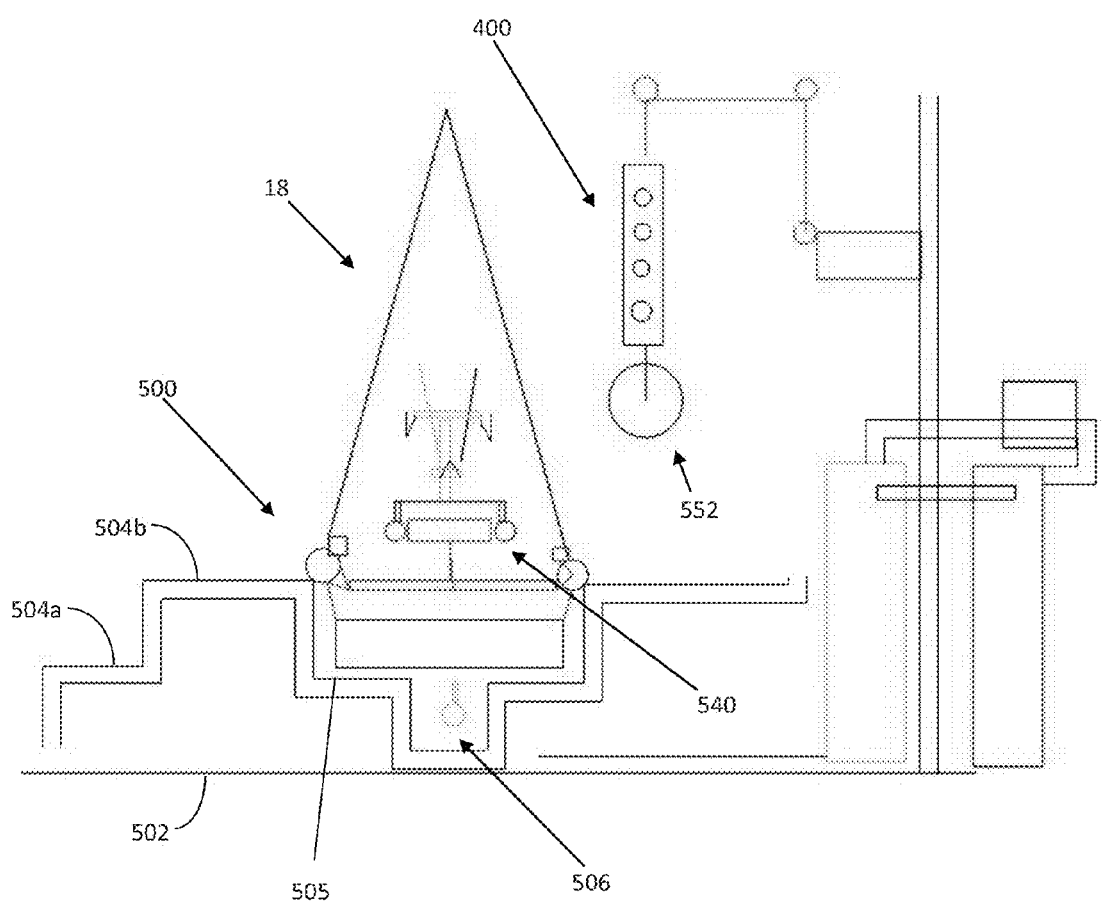
FIG. 23 is an end view of an illustrative embodiment of a configuration for a controlled environment growing system incorporating several concepts from the present disclosure.

Referring now to FIG. 20, which provides an elevated perspective view of the illustrative embodiment of the support frame 500, the support frame 500 may include one or more base members 510, which may be spaced along the length of the support frame 500. Each base member 510 may include a base crossbeam 514 engaged with a base upright 512 at either end thereof, as best shown in FIG. 22, which provides an end view of the illustrative embodiment of a support frame 500. It is contemplated that the base members 510 may be positioned on the structure floor 502 (such as a greenhouse), or they may be positioned on an additional support base. For certain applications, it may be desirable to position the base members 510 on a cement or concrete support base, which support base may be integrally formed with the structure floor 502, but elevated with respect thereto. Such a configuration is shown in FIG. 23, which is described in detail below. Alternatively, the support base may be formed of other structural members, such as beams, arms, and the like, which may be constructed of any suitable material including steel, stainless steel, polymers, cellulosic materials, and/or combinations thereof.

Figure 22A:
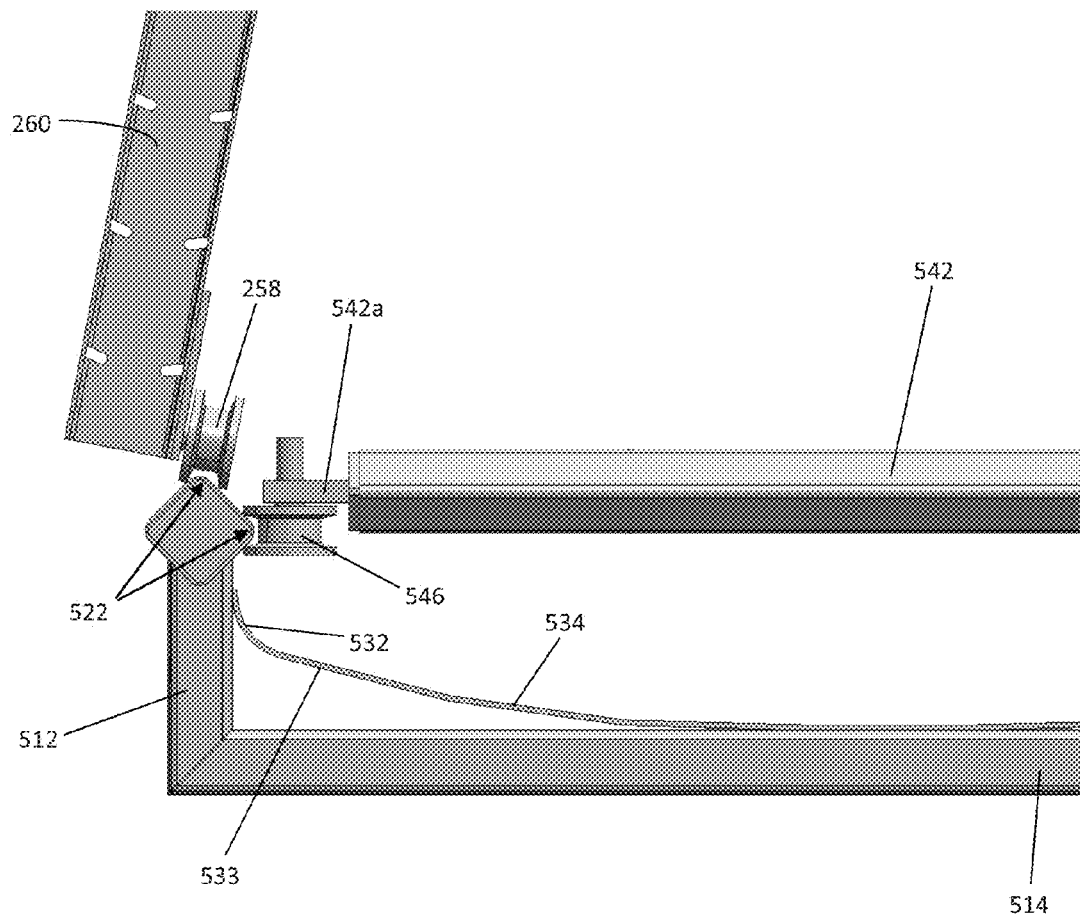
FIG. 22A is a detailed view of one end of the support frame shown in FIG. 22.

As shown, the base members 510 may be configured to engage two rails 520 (as best shown in FIGS. 22 and 22A), which rails 520 may be generally horizontally oriented. The base members 510 may also be configured to engage a pan 530. In the illustrative embodiment, the pan 530 may be configured such that it is symmetrically along its length. A center surface 535 may engage one or more base crossbeams 514. A second surface 534 may be integrally formed with but angled slightly upward with respect to the center surface 535. A first surface 533 may be integrally formed with but angled slightly upward with respect to the second surface 534. Finally, an edge 532 may be integrally formed with but curved upward to engage a respective base upright 512. Generally, the pan 530 may be configured to collect and direct nutrient supply to a drain point, which may be a central point along the length of the pan 530 in the center surface 535. Accordingly, it may be desirable to seal the interface between the edges 532 and the base uprights 512 to ensure there is no point of egress for nutrient supply and/or ingress for contaminants between the edge 532 and base upright 512. Other drain points in the pan 530 may be used without limitation, and the optimal location of the drain point may vary from one application to the next. It is contemplated that a plurality of base members 510 engaged with two rails 520 and engaged with a pan 530 simultaneously may be configured to adequately support the weight of various embodiments of plant stands 18 during various stages of plant growth.

Referring now to FIGS. 22 & 22A, the rails 520 in the illustrative embodiment of the support frame 500 may be formed with a square-shaped cross section. Accordingly, each rail 520 may comprise four rail apexes 522. In the illustrative embodiment, each rail 520 may be oriented such that two rail apexes 522 lie in a generally vertical plane and two other rail apexes 522 lie in a generally horizontal plane. The rail apex 522 oriented at the top of the rail 520 may be configured to provide an interface point for a wheel 258 associated with a plant stand 18. The rail apex 522 oriented toward the interior of the support frame 500 may be configured to provide an interface point for a wheel 546 associated with a secondary frame 540, as discussed in more detail below. In the illustrative embodiment, both the wheels 258 associated with the plant stand 18 and the wheels 546 associated with the secondary frame 540 may be configured as spools, wherein a reduced-diameter portion is axially bound by a larger-diameter end cap on each side. Such a configuration may effectively stabilize the position of the wheels 258, 546 in the axial dimension with respect to the wheel 258, 546 while simultaneously not interfering with rotational forces imparted to the wheel 258, 546. That is, the plant stands 18 and a secondary frame 540 may move along the length of the rails 520 via the interaction of the wheels 258, 546 and the respective rail apex 522. The specific configuration of rails 520, rail apexes 522, and/or wheels 258, 546 will vary from one embodiment to the next, and is therefore in no way limiting to the scope of the irrigation system 10 as disclosed and claimed herein.

Figure 20A:
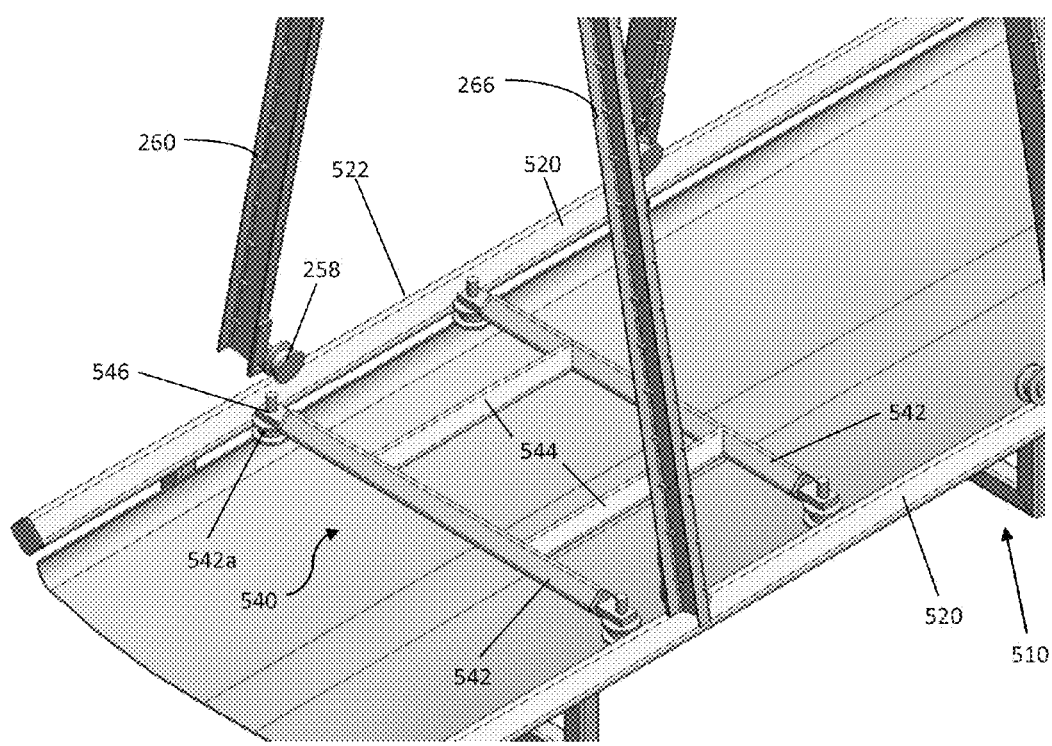
FIG. 20A is a detailed perspective view of a portion of the support frame shown in FIG. 20.
Figure 21:
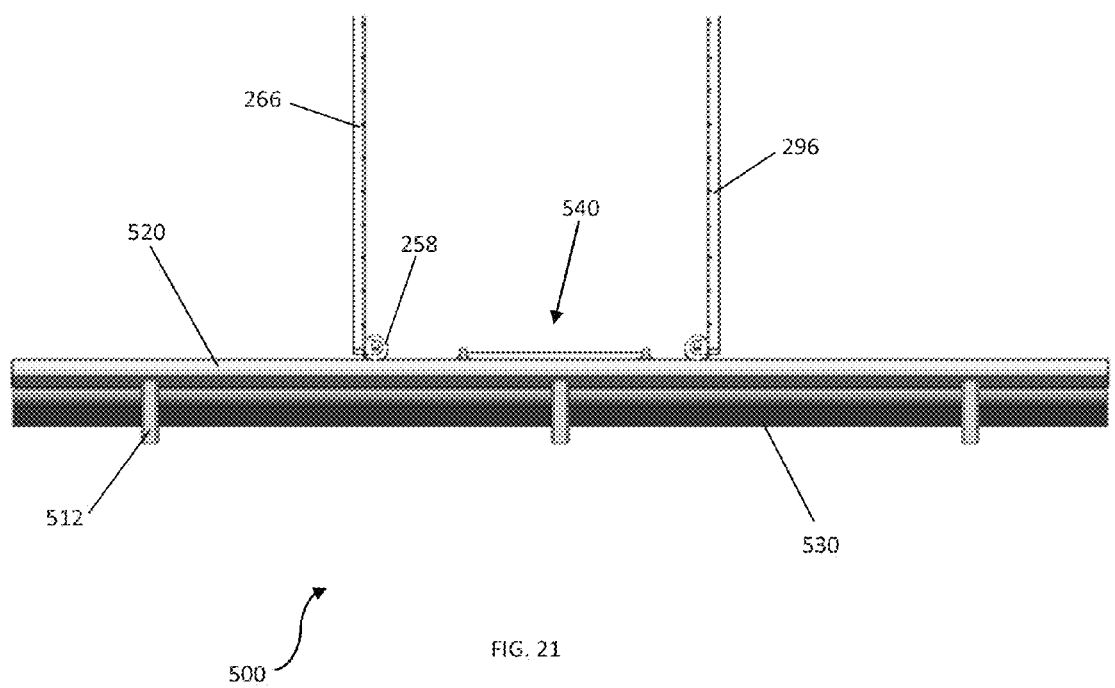
FIG. 21 is a side view of the support frame shown in FIG. 20.

Each wheel 546 may be pivotally engaged with a secondary frame 540 as best shown in FIG. 20A. In the illustrative embodiment of a secondary frame 540, two crossbars 542 may be engaged with two connectors 544 in a ladder-style arrangement. Each wheel 546 may be pivotally engaged with the secondary frame 540 at a mount 542a on the respective ends of the crossbars 542. Generally, it is contemplated that the secondary frame 540 may be configured for use as a carriage and/or carriage assembly 15 as previously described. That is, the secondary frame 540 may be configured to engage a delivery arrangement 16 for supplying nutrient supply to roots 26. The secondary frame 540 may be engaged with a drive assembly 160 as previously described for the carriage 14 and carriage assembly 15 such that the secondary frame 540 may traverse the length of the rails 540 or a portion thereof at a specific rate and interval. Furthermore, any delivery arrangement 16 and/or configuration thereof may be used with the secondary frame 540 without limitation, including but not limited to those pictured herein and/or those having an oscillation feature, all of which are described in detail below.

An end view of an illustrative embodiment of a configuration of an irrigation system 10 in within a controlled environment is shown from one end in FIG. 23. In this embodiment, the base members 510 may be mounted on a ledge 505 engaged with the structure floor 502. The ledge 505 may be integrally formed with a trough 506 and a first and second raised surface 504a, 504b in a stair-step manner. It is contemplated that the various features may be integrally formed with the structure floor 502 in certain embodiments, and that a cement or concrete mold may be used to form the various surfaces. The framework 12, carriage 14/carriage assembly 15, support frame 500, secondary frame 540, and/or any other elements of an irrigation system 10 suitable for the particular application of the irrigation system 10 may be used with a support base having a stair-step configuration similar to that shown in FIG. 23 without limitation. If a recycling arrangement is included (embodiments of which are described in further detail below), certain elements thereof may be integrated into the support base. For example, the trough 506 may be configured to act as a collector 320 for excess nutrient supply, and may be configured to direct the excess nutrient supply to a recycle pump (not shown) via associated plumbing. Accordingly, the scope of the present disclosure is not limited by the components that may be integrated into a support base, and instead contemplates that the optimal configuration will vary from one embodiment of the controlled environment to the next.

In the embodiment shown in FIG. 23, it is contemplated that an air system 550 may be positioned adjacent rows of plant stands 18. The air system 550 may include one or more lighting fixtures 400 and a duct 552, which may be configured to be either static or movable with respect to one another in a given air system 550. In the embodiment shown in FIG. 23 it is contemplated that the vertical distance between the lighting fixture 400 and the duct 552 will be fixed, but that the vertical positions thereof with respect to the plant stands 18 will be variable. Moving the air system 550 relative to the plant stands 18 may be achieved using any suitable structure and/or method, including but not limited to those disclosed in detail below employing cables and winches and schematically depicted in FIG. 23.

Figure 29:
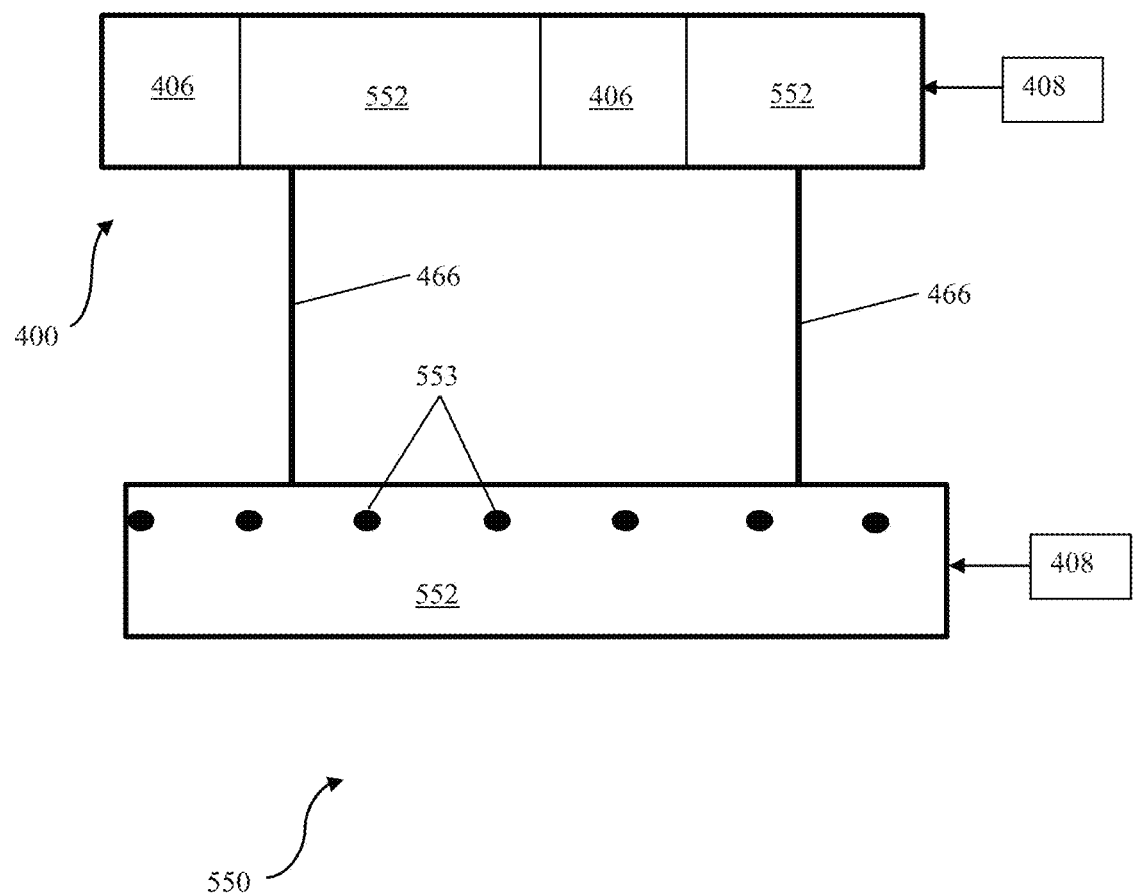
FIG. 29 provides a simplified view of one illustrative embodiment of a lighting fixture and an air system.

The duct 552 may be configured to direct airflow outward therefrom toward plant stands 18 adjacent thereto. A simplified side view of an illustrative embodiment of an air system 550 that may be used with various embodiments of a controlled environment or irrigation system 10 is shown in FIG. 29. As shown in FIG. 29, the air system 550 may be engaged with a lighting fixture 400. In the illustrative embodiment, this engagement may be accomplished via ancillary cables 466 arranged such that the air system 550 may hang from the lighting fixture 400. In this manner, the height of the lighting fixture 400 and/or air system 550 may be adjusted relative to the plant stands 18, as described in further detail below.

The duct 552 may be formed with a plurality of apertures 553 therein configured to direct air flow from within the duct 552 outward to one or more plant stands 18. The duct 552 may also include apertures 553 that are configured to direct air flow from within the duct 552 downward toward a structure floor 502, from wherein the air flow may be reflected upward to the plant stands 18. In this manner, the embodiment of an air system 550 shown in FIG. 29 may be used to direct airflow to plants 22 from below the plants 22, which may increase turbulence of the air flow and lead to more even growth. The specific flow characteristics (i.e., humidity, temperature, rate, etc.) of air from the duct 552 through the apertures 553 will vary from one application to the next. Accordingly, the spacing, shape, size, and other characteristics of the apertures 553 is not limited in any way, and apertures 553 positioned on a given duct 552 may vary with respect to other apertures 553 on that duct 552. It is contemplated that in most applications it will be desirable to construct the duct 552 of the air system 550 from a material that reflects as much light from the light source 406 as possible toward the plant stands 18. Additionally, the shape of the duct 552 may be configured to provide a desired light path 404 from the light source 406 to the plant stand 18. For example, the duct 552 may be configured with two flat surfaces on the top portion thereof terminating at an apex, wherein each flat surface is configured to direct light from the light source 406 outward to adjacent plant stands 18.

In the illustrative embodiment shown in FIG. 29, the lighting fixture 400 may also include one or more ducts 552 (in addition to the ducts 552 in the air system 550) adjacent a light source 406. It is contemplated that both the lighting fixture 400 and/or the air system 550 may be in fluid communication with an HVAC 408, and in certain instances one HVAC 408 may be in fluid communication with both the lighting fixture 400 and air system 550. For most applications it is contemplated that the HVAC 408 in fluid communication with the lighting fixture 400 will primarily act to cool the duct 552 and other components of the lighting fixture 400 so that plant stands 18 do not receive more thermal energy than optimal. However, the HVAC 408 in fluid communication with the air system 550 may condition the air to any desired state, including but not limited to heating, cooling, adding moisture, and/or combinations thereof. In some instances, it may be most efficient to direct exhaust air from the lighting fixture 400 into the air system 550 during conditions in which it is desirable to add thermal energy to the air exiting apertures 553. In still other embodiments, the duct 552 in fluid communication with the lighting fixture 400 may simply draw ambient air from outside of a controlled environment, and a separate HVAC 408 may be employed to ensure the air within the controlled environment has the desired characteristics for the specific application thereof.

Figure 24:
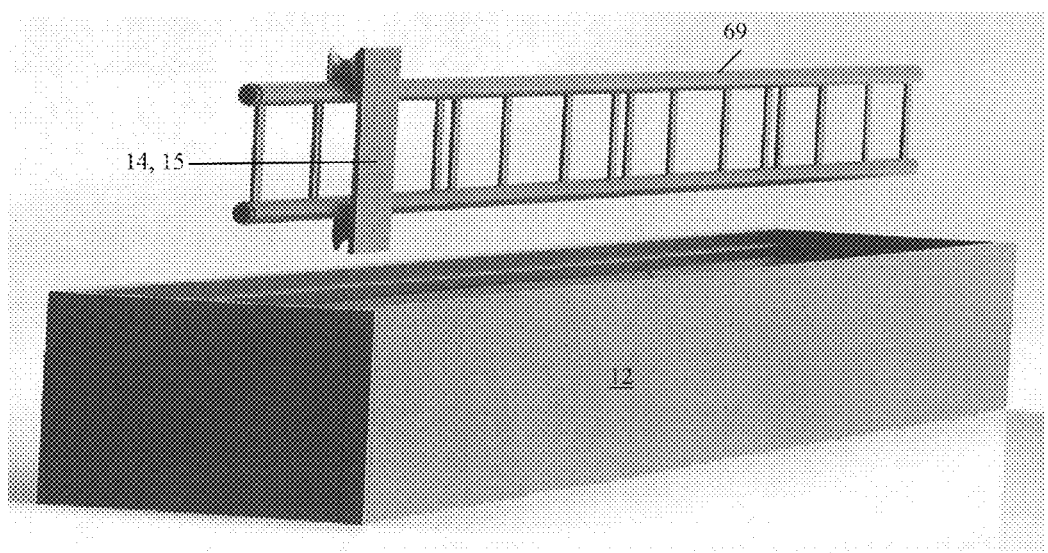
FIG. 24 provides a perspective view of another illustrative embodiment of a framework that may be used in accordance with the present disclosure, and how that framework may interact with an illustrative embodiment of a carriage and carriage support and/or guide assembly.
Figure 25:
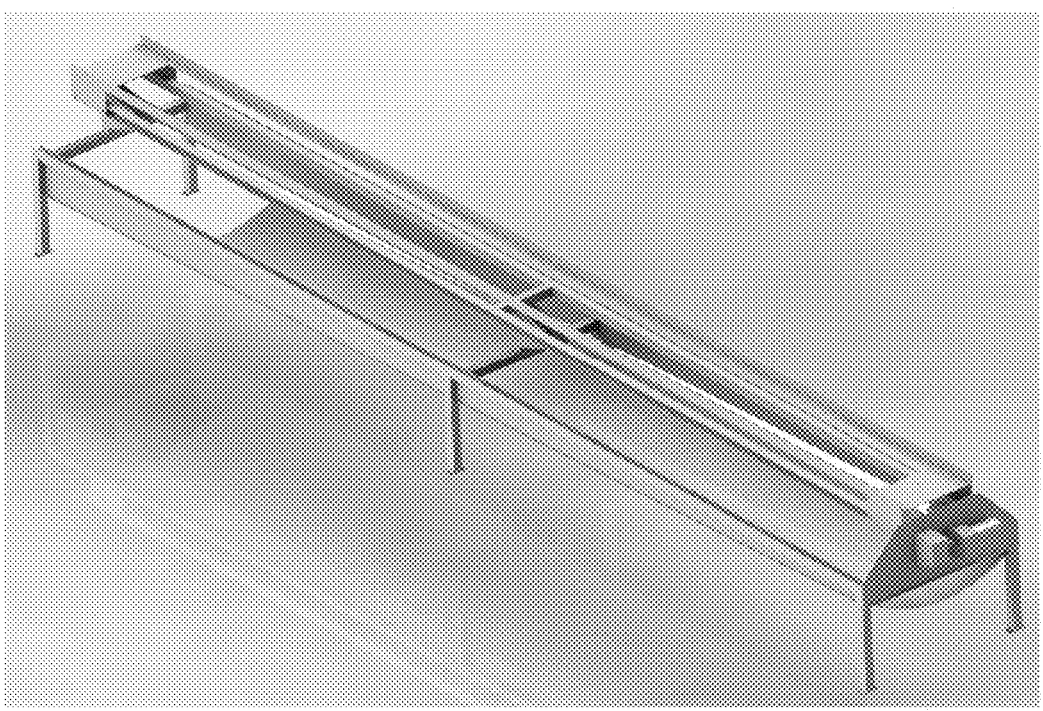
FIG. 25 provides a perspective view of another embodiment of a framework, carriage and/or carriage assembly and drive assembly that may be used in accordance with the present disclosure.
Figure 26A:
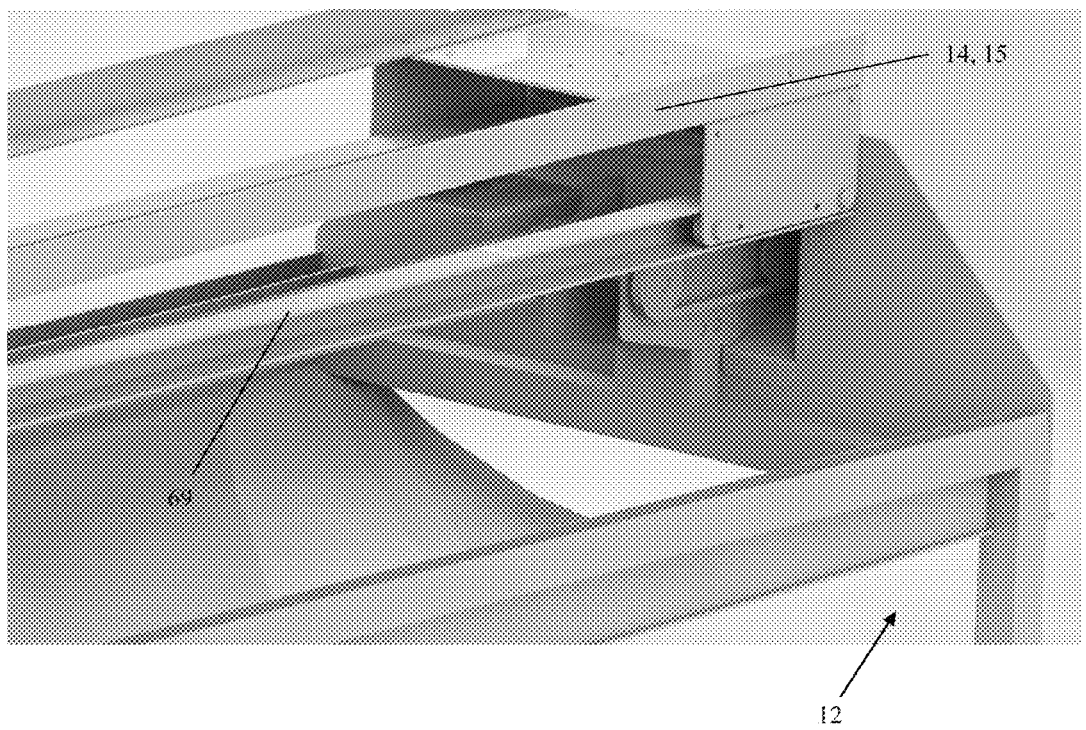
FIG. 26A provides a detailed view of a first end of the embodiment of a framework and carriage assembly shown in FIG. 25, which end is shown adjacent a drive assembly.
Figure 26B:
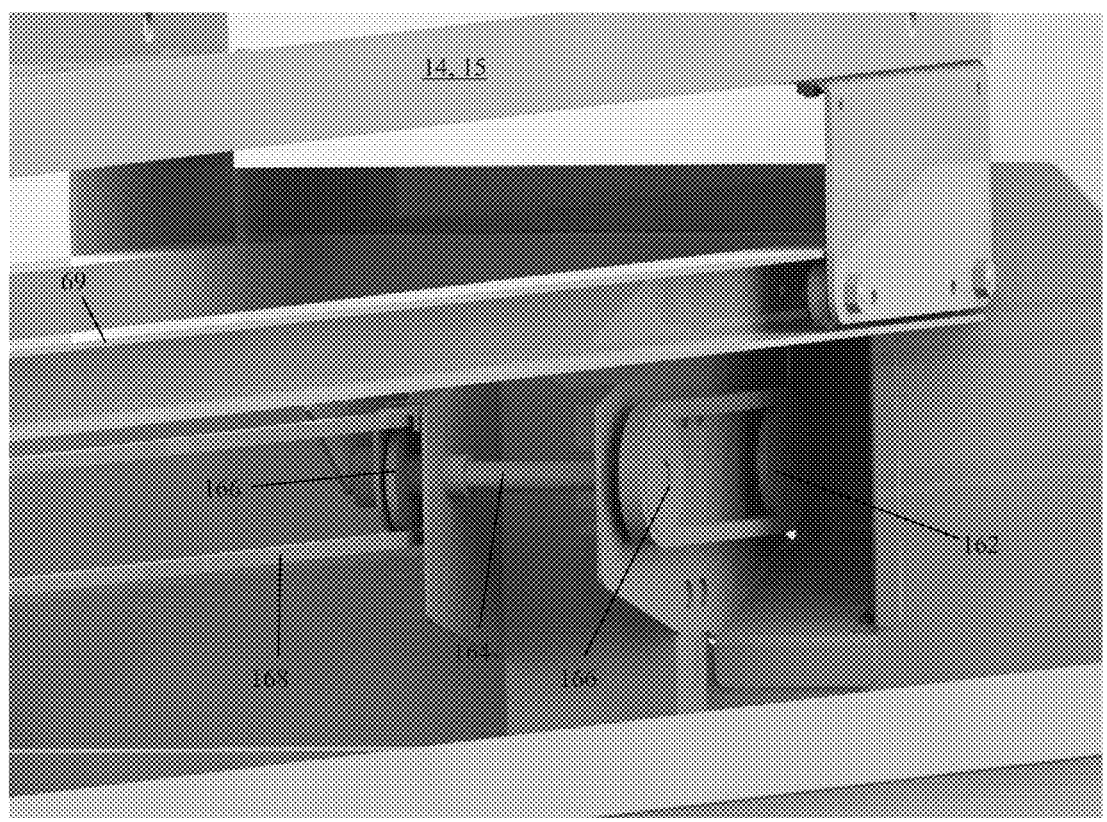
FIG. 26B provides a detailed interior view of the drive assembly, guide assembly, and carriage assembly shown in FIG. 25.
Figure 26C:
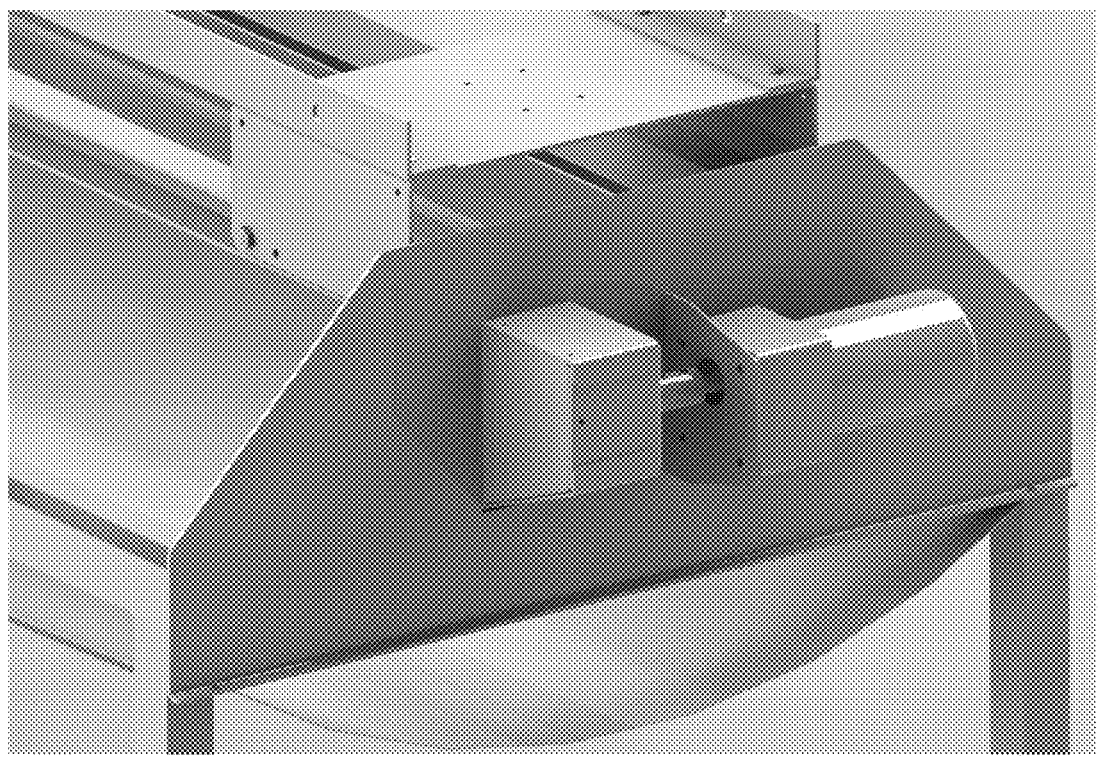
FIG. 26C provides a detailed exterior view of the drive assembly, guide assembly, and carriage assembly shown in FIG. 25.
Figure 26D:
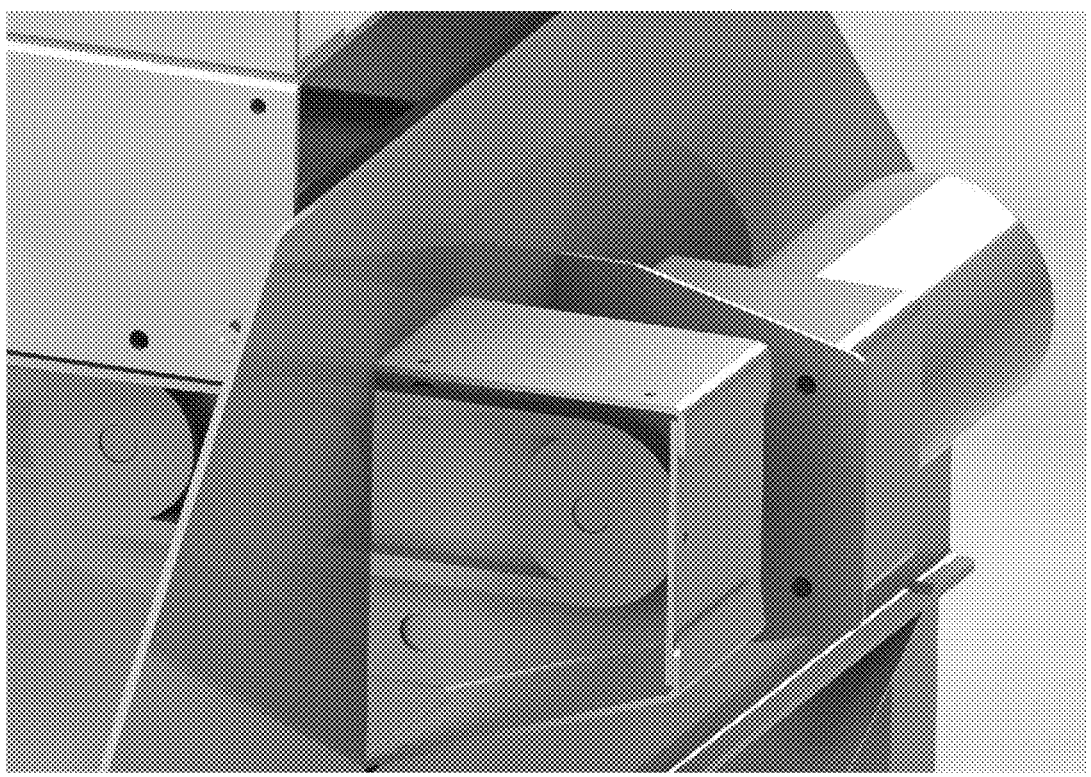
FIG. 26D provides another detailed exterior view of the drive assembly, guide assembly, and carriage assembly shown in FIG. 25.
Figure 26E:
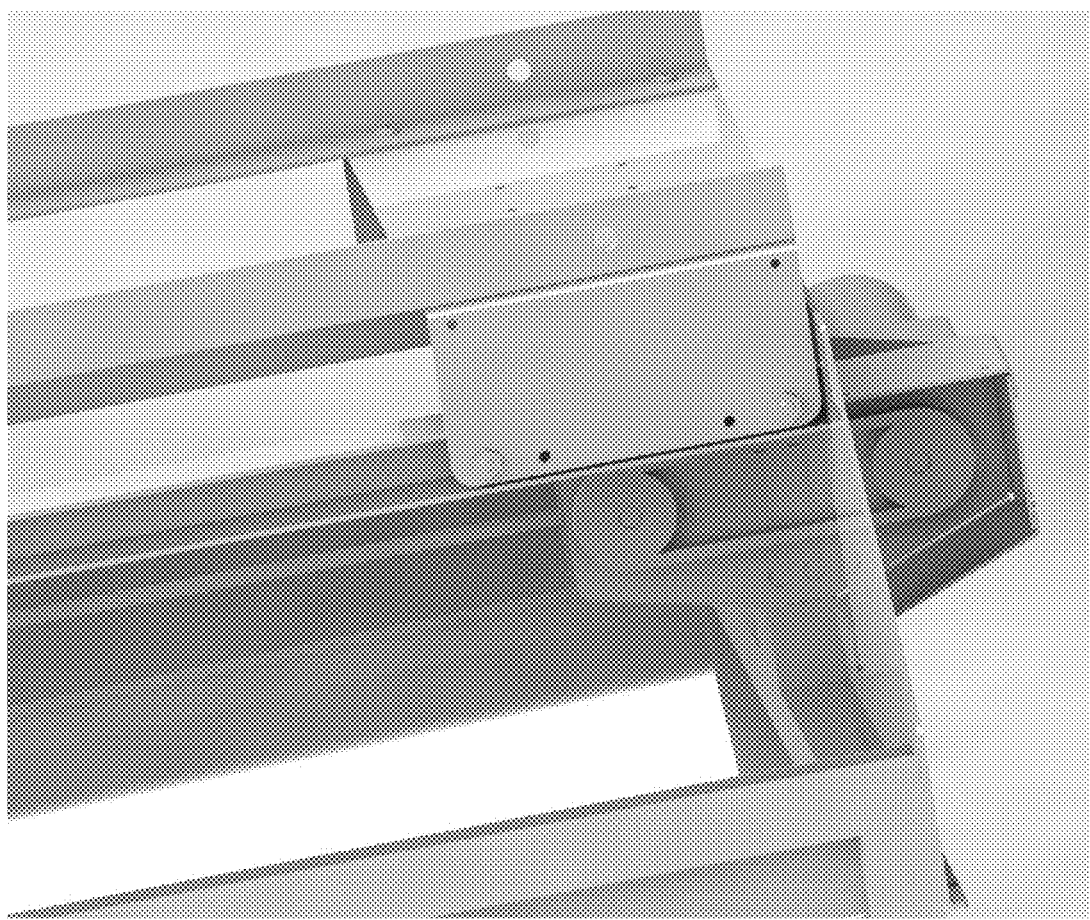
FIG. 26E provides another detailed view of the drive assembly, guide assembly, and carriage assembly shown in FIG. 25.
Figure 26F:
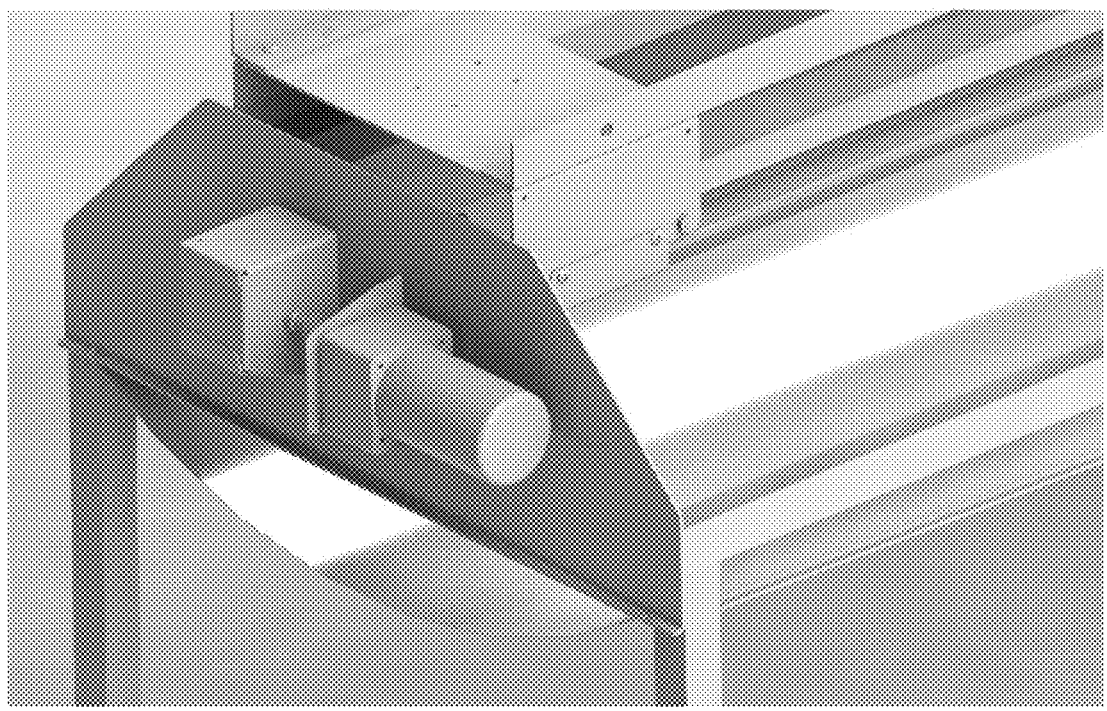
FIG. 26F provides another detailed exterior view of the drive assembly, guide assembly, and carriage assembly shown in FIG. 25.
Figure 27A:
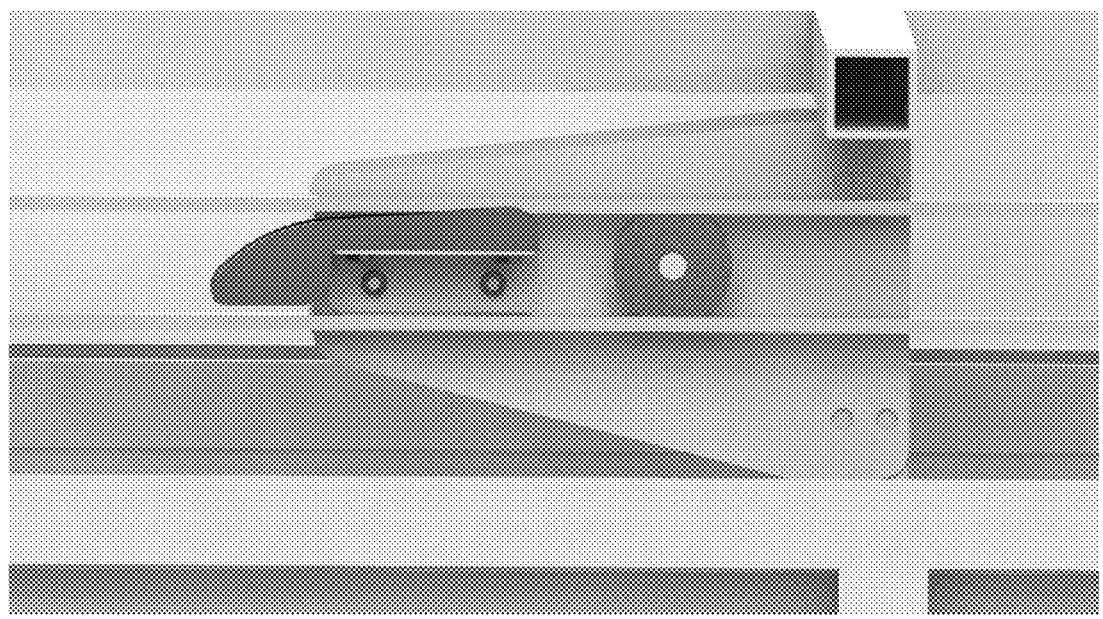
FIG. 27A provides a detailed view of one embodiment of a framework/guide assembly that may be used to facilitate longevity of the embodiment of a drive assembly shown in FIGS. 26A-26F.
Figure 27B:
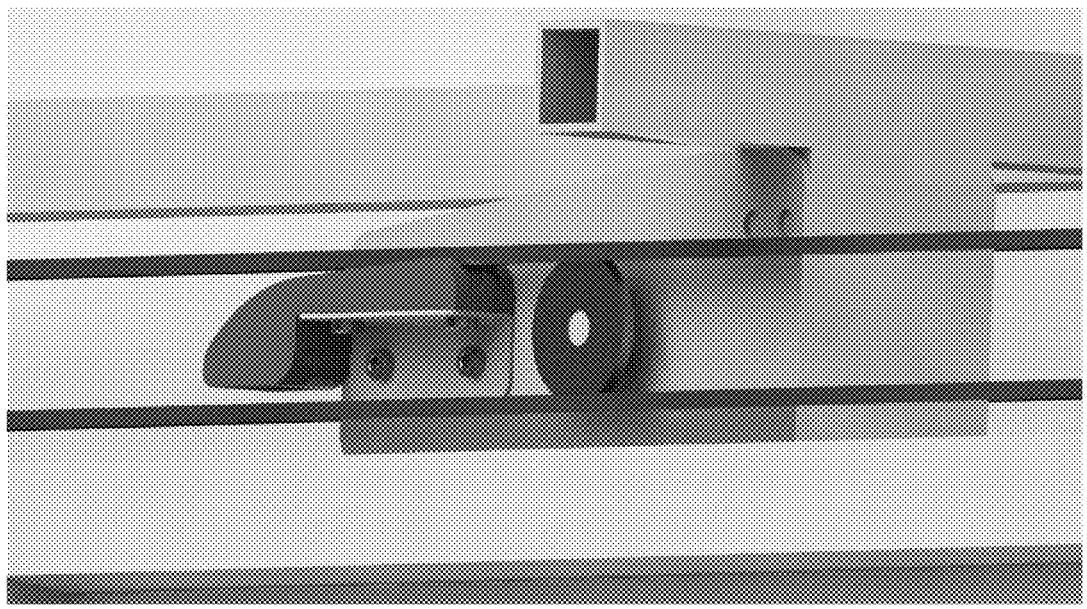
FIG. 27B provides another detailed view of one embodiment of a framework/guide assembly shown in FIG. 27A.
Figure 27C:
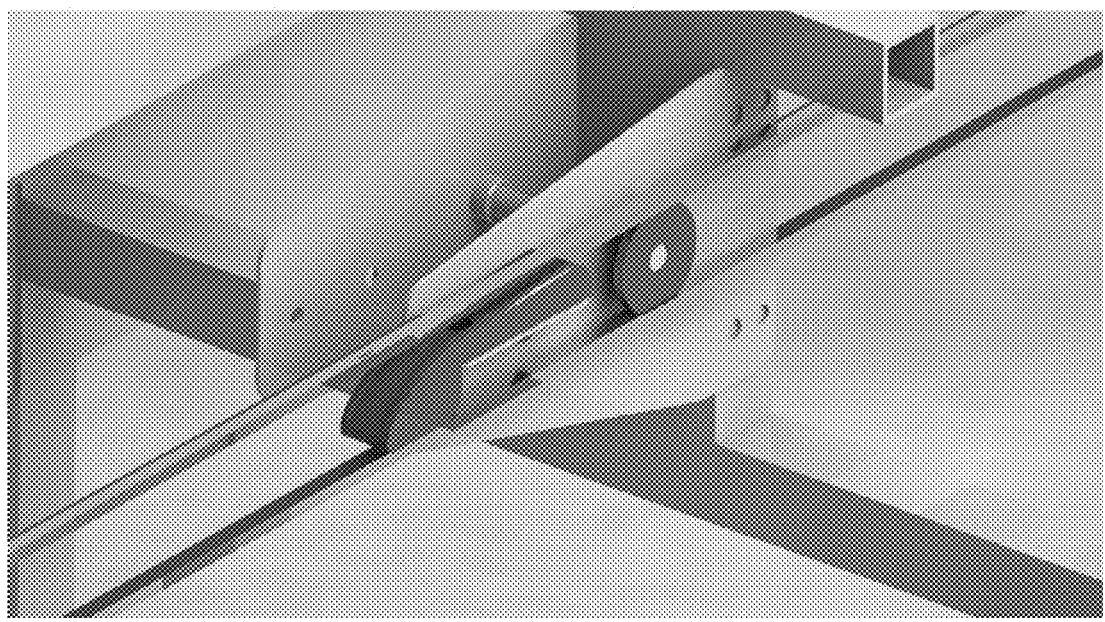
FIG. 27C provides another detailed view of one embodiment of a framework/guide assembly shown in FIG. 27A.

In another embodiment for a framework 12 shown in FIG. 24, the framework 12 may be configured as a support base. The framework 12 may be elevated from the floor surface (e.g., a structure floor 502) by one or more support feet, or a concrete structure. This embodiment may be formed with tracks on either side thereof that extend along the length of the framework 12 to provide an interface point for two frames 250, 280 of a plant stand 18. Additionally, the framework 12 may be formed with one or more troughs. The trough(s) may terminate at a drain, which drain may lead to a holding tank or other structure for use with a recycling arrangement, which is described in further detail below. The framework 12 in this embodiment may include a holding tank or collection tank for the recycling arrangement, which may be formed in the interior of the framework 12. Pumps, valves, heat exchangers, filters, and/or any other associated plumbing components and/or treatment structure may also be positioned in the interior of this embodiment of the framework 12.

Another illustrative embodiment of a guide assembly that may be used with the embodiment of a framework 12 shown in FIG. 24 is shown above the framework 12 in FIG. 24. In this embodiment, the guide assembly 69 may be configured similarly to a ladder frame, wherein each end thereof may be engaged with the framework 12 for support. Such a guide assembly 69 may be supported from above, such as via engaging the guide assembly 69 with an appropriate member of a structure via cables, chains, etc. In one example, the guide assembly 69 may hang from a ceiling truss via one or more cables. The carriage 14 and/or carriage assembly 15 may include one or more rotatable members that may be engaged with a motive source 162 to provide rotational energy to the rotatable members. In this manner, the carriage 14 and/or carriage assembly 15 may traverse the length of the guide assembly 69 in a manner predetermined by the user. Additionally or alternatively, the guide assembly 69 may be configured to rotate about its longitudinal axis via engagement with a rotational energy source, which rotational energy source may include but is not limited to an electric, pneumatic, or hydraulic motor. Such rotation would allow the guide assembly 69 to oscillate along its length, some advantages of which are described in further detail below.

Another illustrative embodiment of a framework 12, guide assembly 16, drive assembly 160, and carriage 14 and/or carriage assembly 15 in accordance with the present disclosure is shown in FIGS. 25-28B. Referring specifically to FIG. 26B, a motive source 162 may be engaged with a first drive member 166 via a transfer belt. The first drive member 166 may be engaged with a second drive member 166 via a drive shaft 164, all of which may be supported via one or more brackets engaged with a portion of the framework 12. The second drive member 166 may be engaged with a belt 168 that extends along a portion of the framework 12.

A portion of the carriage 14 and/or carriage assembly 15 may be configured to selectively secure the belt 168 at a specific location thereon. This may be done using any suitable method and/or structure for the particular application, including but not limited to selective clamps, magnetic fasteners, and/or combinations thereof. Accordingly, when the carriage 14 and/or carriage assembly 15 is secured to a specific location on the belt 168, the carriage 14 and/or carriage assembly 15 may move in a direction and at a rate equal to that of the belt 168. A motor may be engaged with the motive source 162 to provide energy thereto, as shown in FIGS. 26C-26F. As with other embodiments, the rate, speed, interval, or other characteristics of carriage 14 and/or carriage assembly 15 travel along the length of the framework 12 may be controlled by the user and/or automated.

Figure 28A:
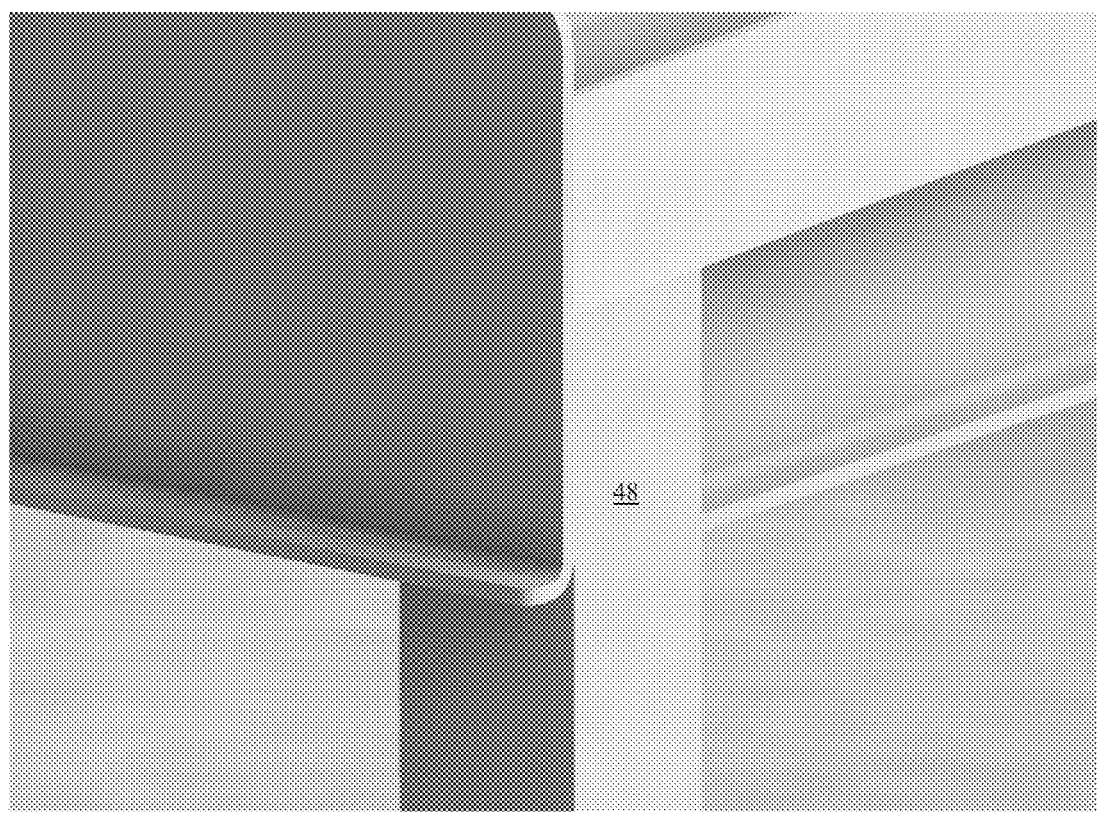
FIG. 28A provides a detailed perspective view of the embodiment of the framework shown in FIG. 25 adjacent an outer post thereof.
Figure 28B:
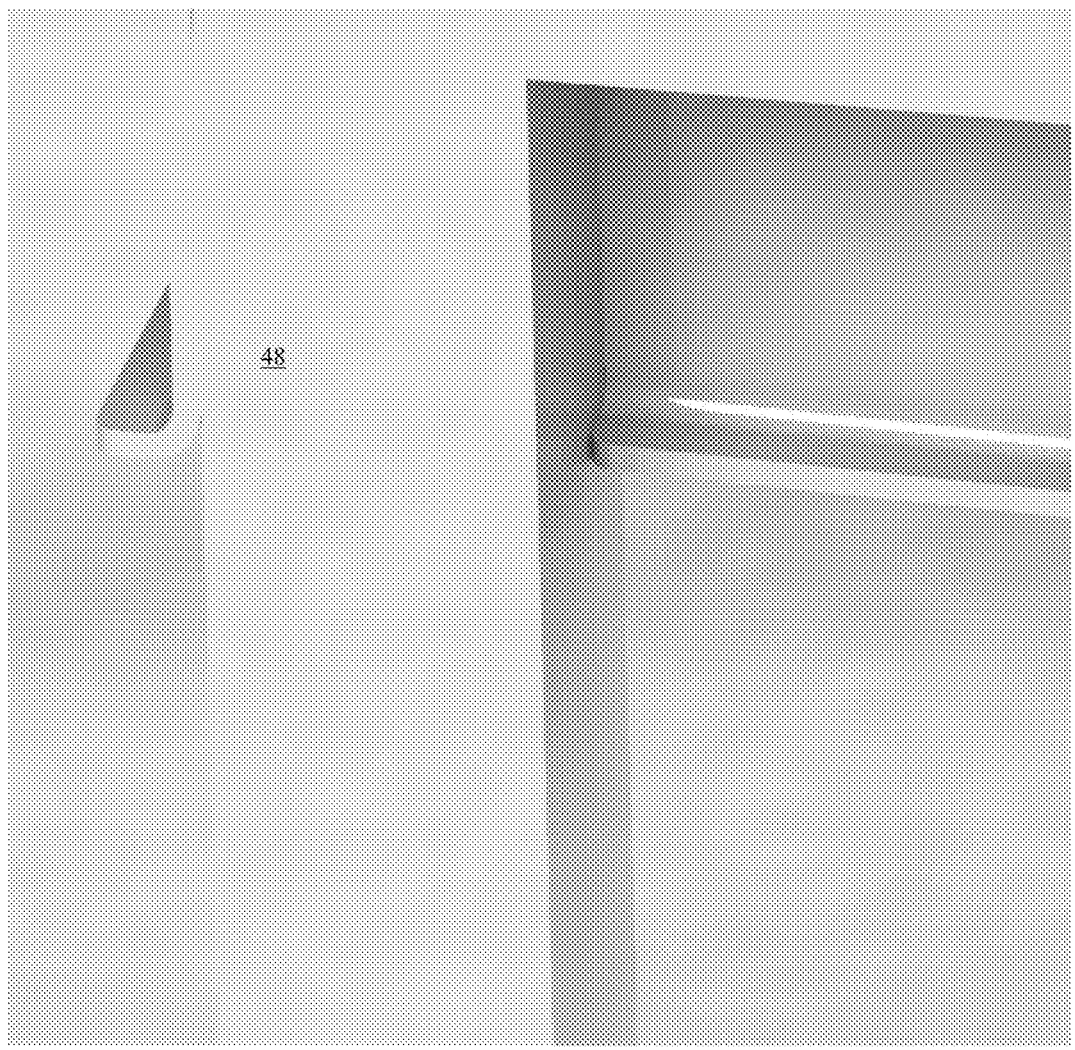
FIG. 28B provides another detailed perspective view of the embodiment of the framework shown in FIG. 25 adjacent an outer post thereof.

FIGS. 28A & 28B provide detailed views of the outer posts 50, 56, 52, 58 of the illustrative embodiment for the framework 12. The end members and/or side members may be formed with outwardly extending flanges. The flanges may be beneficial for capturing nutrient supply in an irrigation system 10 configured with a recycling arrangement as described in more detail below.

Figure 15:
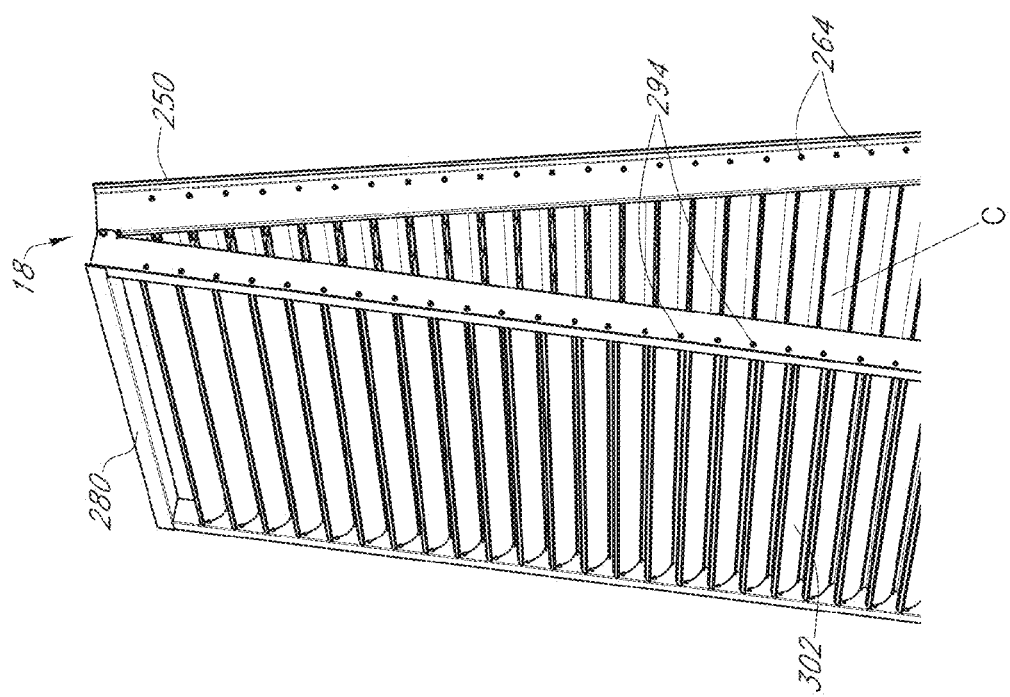
FIG. 15 is a partial, perspective end view of an illustrative embodiment of a plant stand, the view looking into the chamber "C" of the plant stand.

A delivery arrangement 16 may be configured to convey nutrient supply to one or more plants 22 in the form of liquid, and/or mist, and/or vapor, and/or gas, and/or atomized particulate. In the illustrative embodiment, the nutrient supply may be directed toward the roots 26 of a plant 22 or plants 22 as they project through apertures 276, 306 in a holder 272, 302 that may be supported by a plant stand 18 (see, for example, FIGS. 8, and 9A). As described in detail below, the roots 26 of a plant 22 or plants may be positioned within a chamber "C" defined by frames 250, 280 and/or holders of a plant stand 18 (see, for example, FIGS. 13 and 15). The delivery arrangement 16 may be configured and arranged so that it may be operated on a continuous basis and may be operatively engaged with a carriage 14 or carriage assembly 15 so that it may apply nutrient supply to plants as the carriage 14 or carriage assembly 15 moves between first and second positions P1, P2 or P2, P3 along the guide assembly 69. And, because the delivery arrangement 16 may operate at lower pressures than with traditional aeroponic systems, this may allow the use of less expensive materials and reduce overall costs. For example, in one illustrative embodiment the exit ports 219 of a branch 210 (as discussed in further detail below) may be made from plastic or the like.

A delivery arrangement 16 may include an intake portion that may include elements such as a main tank, a reservoir 180, a pump 184, a motive source 186 for the pump 184, and a booster pump 188. The delivery arrangement 16 may also include a discharge portion that may include elements such as, a supply line 190, a fitting, a trunk 200, a branch 210 and an exit port. In an illustrative embodiment, a delivery arrangement 16 may include reservoir 180, which that may be periodically resupplied or replenished from a main supply tank (not shown) using a hose (also not shown). The reservoir 180 may contain the nutrient supply and its volumetric capacity may be sized so that the irrigation system 10 may operate for significant periods of time without needing to be replenished by the main supply tank. The size and capacity of the reservoir 180 is dependent upon at least the size of the irrigation system 10, and may have a capacity that may range from approximately 20 gallons to approximately 1000 gallons.

The nutrient supply in the reservoir 180 may be in fluid communication with an input end of a pump 184 that may be operatively engaged with a motive source 186. Both the pump 184 and the motive source 186 may be engaged with a platform 182 that may be configured to rest on top of the reservoir 180. An output end of the pump 184 may be engaged with one end 191a of a supply line 190 whose other end 191b may be engaged with a carriage assembly 15 (or a single carriage 14, as the case may be). In some embodiments, the supply line 190 may be engaged with a trunk 200 that is in communication with a branch 210, and the branch 210 may be configured with at least one exit port 219 through which nutrient supply may flow. In some embodiments, the exit port 219 may be formed by creating an appropriately shaped and sized hole in the branch 210 (for example, forming a hole in a side wall of a closed-off branch 210). In an illustrative embodiment, an exit port 219 may comprise a nozzle 220 that is removably engaged with the branch 210 (see, for example, FIG. 7B). In other embodiments, the supply line 190 may be engaged with a plurality of trunks 200, 201, wherein each trunk 200, 201 may be in communication with a branch 210, and wherein each branch 210 may include an exit port 219 through which nutrient supply may flow. The supply line 190 may be in the form of a flexible hose or other structure capable of delivering a flow of nutrient supply from one location to another. In one illustrative embodiment, a thick-walled rubber material may be used to construct a supply line 190, but other materials may be used without departing from the spirit and scope of the present disclosure.

Figure 17:
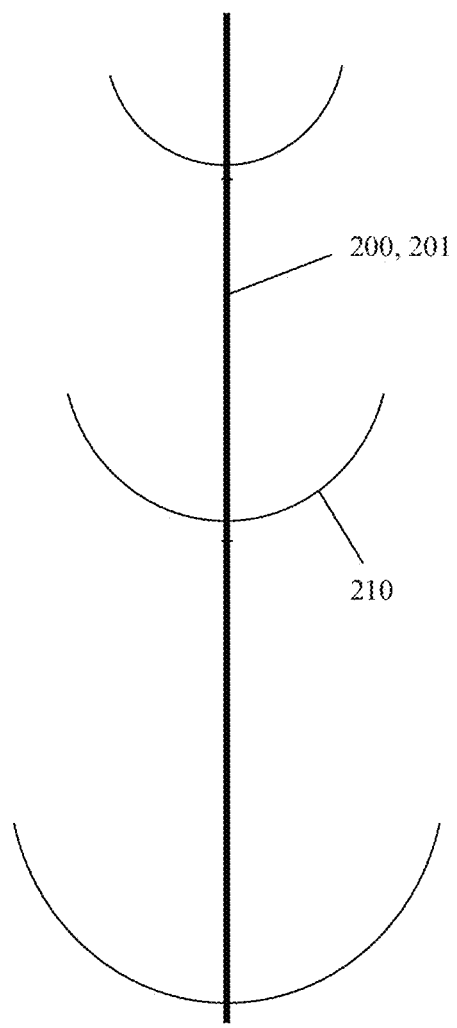
FIG. 17 is a simplified side view of another illustrative embodiment of a portion of a delivery arrangement.

The nozzles 220 may be configured to provide a mist and/or apply nutrient supply in particles with any size suitable for the particular plant/crop grown. In one embodiment the particle size may be in the range of 0.1 to 1000 micrometers, and may have specifications that allow for particles in a smaller range (e.g., a range of 5 micrometers)

to optimize nutrient supply delivery for the particular plant/crop grown. The nozzles 220 may further be configured as air atomizing nozzles 220, which may require compressed air to achieve the desired nutrient supply particle size and/or control. Additionally, it is contemplated that in some embodiments it may be optimal for the nozzles 220 to be configured to provide nutrient supply to the roots 26 at an angle that is as close to parallel with the longitudinal axis of the plant roots 26 as possible. In such an embodiment, the nozzle 220 may effectively positioned under the root 26 and directing nutrient supply upward. A trunk 200, 201 with a plurality of branches 210 engaged therewith is shown in FIG. 17, which configuration may be especially useful in directing nutrient supply upward in a direction parallel to the axis of the roots 26. One or more nozzles 220 may be engaged with each branch 210 and oriented to provide nutrient supply in a generally upward direction.

The nozzles 220 may be configured with a flush pin (not shown), wherein depressing the flush pin causes the flow of nutrient supply to be reversed within a portion of the nozzle 220 during the time the flush pin is depressed. An example of such a nozzle 220 that is commercially available is shown fully in Appendix A at the end of this application. The framework 12 and/or one or more plant stands 18 may be configured with fingers (not shown) configured to activate the flushing of the nozzles 220 on a given cycle (i.e., per number of carriage assembly 15 passes, per time interval, etc.) when the nozzle 220 comes into proximity with the finger. Another embodiment for nozzles 220 that may include a cleaning function uses a pressurized actuator and/or solenoid to activate the flush pins. Accordingly, the specific structure and/or method used to flush the nozzles 220 in no way limits the scope of the present disclosure.

The delivery arrangement 16 of various embodiments of the irrigation system 10 may have different flow rates, depending upon at least the cross-sectional area of an exit port 219 or nozzle 220, and/or the number of exit ports 219 or nozzles 220 per branch 210. For example, a single exit port 219 or nozzle 220 may have a flow rate in the range of approximately 0.001 gallons per minute (gpm) (for an exit port 219 or nozzle 220 comprising a small diameter aperture) to approximately 60 gpm (for a large diameter aperture). However, the specific flow rate of nutrient supply that may pass through any exit port 219 or nozzle 220 at a given set of conditions in no way limits the scope of the present disclosure. In addition, the delivery arrangement 16 may be configured with the capability of providing sufficient pressure to the exit port(s) 219 or nozzles 220 to achieve a specific flow characteristic of nutrient supply to roots 26. For certain embodiments, a working pressure of 40 psi or greater may be optimal. A combination of a pump 184 and motive source 186 that meet these operational requirements, and which has been found to be useful with these embodiments includes a combination pump 184 and motive source 186 available from the FOGCO Company of Chandler, Ariz. 85226 (model no. 5300216). Other suitable combinations of pumps 184 and motive sources 186 that meet the operating conditions for a specific embodiment of the irrigation system 10 may be used without departing from the spirit and scope of the present disclosure.

One or more branches 210 may be configured to oscillate and/or rotate about a generally vertical axis by up to 180 degrees. Such an embodiment may eliminate up to or more than 50% of the nozzles 220 required in a similar irrigation system 10 having branches 210 that do not oscillate and/or rotate. Oscillating and/or rotating branches 210 may provide nutrient supply to both frames 250, 280 of a plant stand 18 via a single set of nozzles 220 as opposed to a non-oscillating branch 210 in which one nozzle 220 typically only provides nutrient supply to a single frame 250, 280 or the single side of similarly oriented frames 250, 280. An illustrative embodiment of a branch 210 configured with nozzles 220 thereon that may oscillate is shown in FIG. 16A. In this embodiment, the overlap of nutrient supply provided by a single nozzle 220 may overlap with the nutrient supply provided by the adjacent nozzle 220 by about 40 to about 50 percent, which may help ensure the desired coverage of nutrient supply. Additionally, FIG. 16A provides an illustrative embodiment of the ratio of nozzle 220 height with respect to nozzle 220 lateral spacing from adjacent nozzles 220. The optimal value for this ratio may vary from one application of the irrigation system 10 to the next, but for some applications it is contemplated that the value may range from about 0.2 to about 6.0. Such a design, when configured to oscillate, may increase the chaos of the flow pattern, particle size, and/or droplet size delivered to the plant 22, which chaos may be desirable for certain applications of the delivery arrangement 16. In other applications, uniformity in particle and/or droplet size may be desired coupled with chaos in respect to delivery angle and/or spray pattern. Accordingly, the scope of the present disclosure is not limited by the angle of nutrient supply delivered to the plant 22.

In some embodiments, it may be desirable to include a booster pump 188 that may be interposed between the reservoir 180 and the main pump 184. As depicted in the illustrative embodiment, the delivery arrangement 16 may be positioned so that one end 191*a* of a supply line 190 is located about midway along the longitudinal length of the framework 12, while the other end 191*b* of the supply line is allowed to move with the carriage assembly 15 (or carriage 14) to which it is engaged. As will be understood, this allows the supply line 190 to be used in an efficient manner as the carriage 14 or carriage assembly 15 moves between the ends of the framework 12. Note that the pump 184 and its associated motive source 186 need not be engaged with the reservoir 180 itself (see, for example, FIG. 1). For example, the pump 184 and motive source 186 could be located midway along the longitudinal length of the framework 12 and the reservoir 180 could be located near an end of the framework 12 and engaged with the pump 184 by a hose. However, the arrangements as depicted in the illustrative embodiment may be preferred for certain applications because they may be moved about with relative ease and result in smaller footprints.

Referring now to FIGS. 7A & 7B, in an illustrative embodiment of an irrigation system 10, the supply line end 191*b* may be operatively engaged with a carriage 14 or a carriage assembly 15. In the illustrative embodiment, this engagement may be at the midpoint of the attachment bar 147 on a single carriage 14 or at the midpoint of one of the beams 156, 158 that engage the carriages 14 with each other in a carriage assembly 15. In the illustrative embodiment, the supply line 190 may be in fluid communication with a fitting or fixture 194 that may serve to engage the supply line 190 with a side wall of the attachment bar 147 or one of the beams 156, 158. In some embodiments, the fitting or fixture 194 may include an element such as a hollow tube that is engageable to a single trunk 200 (for a single carriage 14) or T-connector 196 that is engageable to more than one trunk 200, 201 (for a carriage assembly 15). The T-connector 196 may be oriented such that opposing openings are able to be engaged with trunks 200, 201. Each trunk 200, 201, which may be in fluid communication with the supply line 190, may extend from the T-connector 196 to a platform 134 of one of the carriages 14, where it may be engaged therewith. The end of each trunk 200, 201 may be provided with a connector 202, 203, to which a branch 210 may be engaged so that it is in fluid communication therewith. The connector 202, 203 may be configured to position the branch 210 so that it extends upwardly in a generally vertical orientation above the surface of the platform 134. In an illustrative embodiment, the trunk-branch connector 202, 203 may be configured as a T-connector 196 that has one opening closed off with a removable plug 222. Other connectors 202, 203, 196 may be used without departing from the spirit and scope of the present disclosure.

Referring again to FIG. 2B, in an alternative embodiment, a supply line 190 may be elevated so that it does not drag upon a lower surface, such as a floor. Such elevation may be provided by a mast 204. The mast 204 may be engaged with the main frame 12 at a location midway between the ends 30, 32, with the mast 204 being generally vertically aligned and having a bottom end 205, a transition 206 and a top end 207. The transition 206 may serve to position the top end 207 so that it is more or less directly above a carriage 14 or carriage assembly 15. The elevation of the top end 207 may range from a position that is slightly higher than the carriage 14 (or carriage assembly 15) to a position that is slightly lower than the apex of a plant stand 18. The supply line 190 may then be engaged with the mast 204 so that it is supported thereby and so that the end 191b of the supply line 190 terminates at or near the top end 207 of the mast 204. The end 191b of the supply line 190 may then be engaged with a first end of an intermediate conduit 208. A second end of the intermediate conduit 208 may then be engaged with a single trunk 200 or to a connector 202 (or which may be configured as a rotary connector 195 and/or T-connector 196 (as shown)) that is engaged with multiple trunks 200, 201. The intermediate conduit 208 may be formed from a self-coiling material that is able to extend and retract as the carriage 14 or carriage assembly 15 traverses along its path. It has been discovered that such an arrangement reduces the chances of the supply line 190 becoming snagged on moving parts and also reduces general wear and tear. However, any structure and/or method suitable for the particular application may be used to deliver nutrient material to a branch 210, exit port 219, and/or nozzle 220 without limitation.

Each branch 210 may be hollow and may have an inner diameter configured to allow sufficient nutrient supply flow at specific flow characteristics. For example, it is contemplated that for some embodiments, a diameter in the range of approximately 1/16 inch to approximately 1 inch may be used. Each branch 210 may be built up of sections of tubing 216 (or hollow spacers), connectors 218, and nozzles 220. Each branch 210 may be adjusted, either by moving the entire branch 210 as a unit, or by bending portions of the branch 210. In certain embodiments the ends of each branch 210 may be disabled or otherwise closed off by one or more plugs 222. Each branch 210 may be provided with one or more exit ports 219 or nozzles 220 that may be used to apply nutrient supply to a plant 22. In an illustrative embodiment, each branch 210 may include two exit ports 219 or nozzles 220 that may be oriented so that they point in opposite directions. As will be understood, the particular exit port 219 or nozzle 220 sizes and operational pressure of the delivery arrangement 16 may be used to achieve different results. For example, some plants may grow better using a liquid application, whereas other plants may grow better using a misting application. Still other plants may grow better using a vaporized application, a gaseous application, an atomized liquid application, and/or combinations thereof of nutrient supply. It is contemplated that many crops will have optimal nutrient supply application intervals between approximately 10 seconds and approximately 30 minutes, but the intervals thereof are in no way limiting to the scope of the present disclosure.

As mentioned above, an exit port 219 may be formed by creating an appropriately shaped and sized hole in the respective branch 210. For example, in some embodiments, an exit port 219 shape may be geometric, non-geometric, symmetric or non-symmetric so as to be able to create different discharge patterns. In other embodiments, the size of an exit port 219 may have different cross-sectional areas that have different flow rates. As will be appreciated, different plants/crops may require different growth environments that may be created using different exit ports 219. That is, some plants/crops may benefit by using an exit port 219 having a flow rate of 0.1-3 gallons per minute, while other plants/crops may benefit by using an exit port having a flow rate of 2-3 gallons per hour. In that regard, it is envisioned that a branch 210 and its respective exit port(s) 219 could be pre-fabricated as a unitary structure designed for a particular plant/crop. If a user decides to grow a different plant/crop having a different growth cycle and growth requirements, the branch-exit port unit could be exchanged with another more suitable branch-exit port unit. In some embodiments, it may be desirable for a discharge produced by an exit port 219 to be in the form of a fine mist, vapor, or gas. In such situations, a branch 210 and its respective exit ports 219 may be provided with a removable nozzle(s) 220. Nozzles 220 capable of producing such discharges often have orifice diameters in the range of approximately 0.008 inches to approximately 0.020 inches, and may be obtained through companies such as FOGCO Systems, Inc. Chandler, Ariz. 85226.

The nozzles 220 may be positionable relative to the branch 210 with which they may be engaged using adjustable connectors such as a swivel ball connector. Alternatively, the branches 210 may be adjustably positionable relative to the trunk 200, 201 with which they are engaged, and may be formed from flexible, metallic tubing. It has been discovered that because the irrigation system 10 may be operated in a continuous or relatively continuous manner, the above mentioned exit ports, nozzles 220, fitting and branch 210 components may be formed from materials including but not limited to ABS plastics.

Alternatively, in some implementations as previously mentioned, combination hydro-air atomizing nozzles 220 may be used. Typically, such nozzles 220 include a source of pressurized air that is connectable to the nozzle 220 and which is able to modify and control the nutrient supply droplet size that exits the working end of the nozzle 220. For certain plants 22, a droplet size in approximately the range of 5 to 100 microns may be optimal, but the size of the droplets in no way limits the scope of the present disclosure. Furthermore, the optimal flow rate of nutrient supply per area of roots 26 may vary from one type of plant 22 to the next. For example, Applicant has found that certain plants 26 require a flow rate of 0.0435 gallons per hour at a droplet size between 10 and 50 microns. However, other plants 26 may require different droplet sizes and/or flow rates, which sizes and flow rates also may vary depending on the development stage of the plant 26. Accordingly, the nozzle 220 and nutrient supply flow characteristics at any point in the irrigation system 10 in no way limit the scope of the present disclosure. The nozzle 220 may have a water pressure working range of approximately 0.02 psi to approximately 300 psi, and an air pressure working range of approximately 0.02 psi to approximately 300 psi. An example of a hydro-air atomizing nozzle 220 that has been found to be suitable for certain applications is model no. ¼ inch J series and is obtainable from Spraying Systems Co. at <http://www.spray.com/index.aspx>. Other such nozzles 220 that meet the operating conditions of certain embodiments of the irrigation system 10 are possible without departing from the spirit and scope of the present disclosure. The source of pressurized air may be provided by an air compressor 197 that is operatively connected to a motive source in a single unit. An example of a self-contained, powered air compressor 197 that may be suitable for certain embodiments of the irrigation system 10 is model no. D55151 and is obtainable from the DeWalt Industrial Tool Co. of Baltimore, Md. 21286. Other such compressor 197 and motor arrangements that meet the operating conditions of certain embodiments of the irrigation system 10 are possible without departing from the spirit and scope of the present disclosure. The compressor 197 may be operatively connected to a branch 210 and/or nozzle(s) 220 by a conduit 198 in a manner similar to the connection between the pump 184 and a trunk 200, 201 or a T-connector 196 and trunks 200, 201 discussed above. That is, a first end 199*a* of the conduit 198 may be engaged with the compressor 197 at an output port and a second end 199*b* may be engaged with a branch 210 and/or nozzle(s) 220. It will be appreciated that providing fluid connectivity among the various components of any embodiment of a delivery arrangement 16 may be achieved through an infinite number of combinations of various components. Accordingly, the scope of the present disclosure is in no way limited by the specific structure and/or method used to fluidly connect various elements of the delivery arrangement 16, nor is the scope of the present disclosure limited by the order of connectivity and/or elements that may be in direct fluid connectivity with one another. It is contemplated that in some embodiments, a central compressor 197 (for providing compressed air) may be used in conjunction with a central pump 184 (for providing liquid-form nutrient supply) and multiple selective connectors (e.g., control valves) such that the central compressor 197 and pump 184 may be configured to provide nutrient supply at the desired rate and with the desired characteristics (e.g., droplet size, pressure, etc.) to multiple plant stands 18 on multiple rows 470. Typically, one key metric for optimal nutrient supply may be the flow rate of nutrient supply be unit area, and a central compressor 197 and/or pump 184 may be configured accordingly. It is contemplated that a delivery arrangement 16 configured with a central compressor 197 and/or pump 184 may facilitate treatment and/or conditioning of the nutrient supply with fewer components than a delivery arrangement 16 configured with multiple compressors 197 and/or pumps 184 in a manner that is advantageous for quality assurance and/or quality control.

As mentioned above, one or more plant stands 18 may be used in conjunction with the irrigation system 10. Generally, a plant stand 18 may be configured to retain plants 22 and position their roots 26 so that they are able to receive nutrient supply from the discharge portion of the delivery arrangement 16, while the shoots 24 may extend upwardly in a normal fashion. A plant stand 18 may include elements such as a frame 250, 280, a holder 272, 302, and wheels 258 (or other friction reducing elements to provide an interface between the plant stand 18 and the framework 12 and/or supporting structure). In an illustrative embodiment, a plant stand 18 may include a first frame 250 and a second frame 280. Each frame 250, 280 may include elements such as a top member 252, 282, a middle member 254, 284, a bottom member 256, 286, first and second side members 260 and 266, 290 and 296, one or more crossbars 264, 294, and a holder 272, 302. The frames 250, 280 may be equally sized and configured to be pivotally engaged with each other at their upper ends. The pivot connection 308, 310 allows a plant stand 18 to be easily compacted, moved to another location and be quickly erected for use. When coupled together, the first and second frames 250, 280 can define an angle 314 having a range of approximately 1 degree to approximately 70 degrees, and in the illustrative embodiment a range of approximately 10 degrees to approximately 60 degrees. The frames 250, 280 may be held in a particular angular relation by one or more adjustable straps 312. The side members 260, 266 of frame 250 and side members 290, 296 of frame 280 may include a plurality of apertures 262 and 268, 292 and 298 that receive a plurality of crossbars 264, 294, respectively. The crossbars 264, 294 may extend between, and be engaged with, the side members 260, 266, 290, 296 of a single frame 250, 280, respectively. In some embodiments, ends of each crossbar 264, 294 may be inserted through a respective aperture 262 and 268, 292, 298 and secured there to with a self-locking washer. The crossbars 264, 294 may be pivotally mounted with apertures 262, 268, 292, 298. The apertures 262, 268, 292, 298 may be positioned as far outward on the side members 260, 266, 290, 296 or away from the area between two coupled frames 250, 280 as possible or as allowed by the dimensions and/or configuration of the side members 260, 266, 290, 296.

Figure 9A:
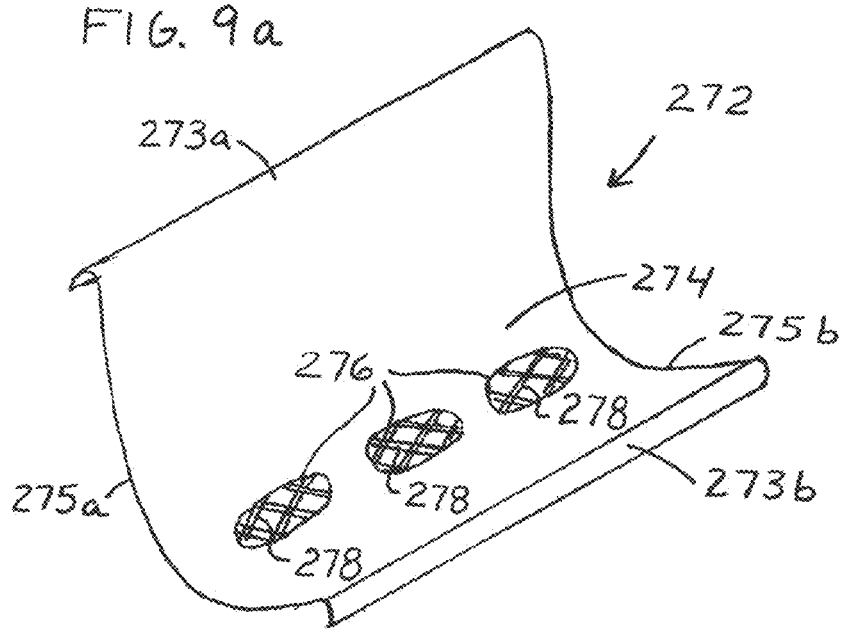
FIG. 9A is a perspective view of an illustrative embodiment of a holder.

In some embodiments, the apertures 262, 268, 292, 298 may be sized to constrainingly receive the ends of crossbars 264, 294. In other embodiments, the apertures 262, 268, 292, 298 may comprise slots and the ends of crossbars 264, 294 may move between ends of the slots with which they are operatively engaged. In an illustrative embodiment, a plurality of crossbars 264, 294 may be oriented parallel to each other and with the top and bottom members 252, 282, 256, 286 of a frame 250, 280. In some embodiments, the crossbars 264, 294 may be evenly spaced from each other along the length of the side members 260, 266, 290, 296 of a frame 250, 280. It is contemplated that the optimal spacing may depend at least upon the crop/plants grown The crossbars 264, 294 of the first and second frames 250, 280 may be configured and arranged to support one or more horizontally oriented, longitudinal holders 272, 302, which in turn may support one or a plurality of plants 22. In certain embodiments, the holders 272, 302 may be pivotally engaged with the crossbars 264, 294, such that they may rotate with respect thereto. Depending upon the particular implementation, a holder 272, 302 may have a length that can range from approximately two inches to approximately twelve feet or longer. In the illustrative embodiment, the holder 272, 302 length may be approximately three feet to approximately eight feet. In FIG. 9A, an illustrative embodiment of a holder 272 may have an upper end 273*a*, a lower end 273*b*, and opposing sides 275*a* and 275*b*, wherein the upper and lower ends 273*a*, 273*b* define a width and wherein the opposing sides 275*a*, 275*b* define a length. The holder 272 may be somewhat flexible and may be allowed to drape between adjacent crossbars 264 so that the upper end 273*a*, the lower end 273*b* and the opposing sides 275*a*, 275*b* form a generally horizontally oriented, longitudinal trough 274.

Depending upon the particular implementation, the trough 274 may have a width that may range from approximately 0.1 inches to approximately 24 inches. In the illustrative embodiment, the trough 274 width may be in the range of approximately 0.1 inches to approximately three inches.

More specifically, it is contemplated that certain embodiments will have an optimal trough 274 width of approximately two inches. As depicted, a trough 274 may include one or more apertures 276 that may be spaced along the length of the holder 272, 302. In an illustrative embodiment, the apertures 276 may be generally oblong in shape and aligned with the longitudinal axis of the holder 272, 302. In the illustrative embodiment, the apertures 276 may have a length of approximately 4.5 inches and a width of approximately one inch. In some embodiments, the apertures 276 are evenly spaced from one another along the length of the holder 272, 302 with approximately 0.1 inches to six inches between the edges of adjacent apertures 276. In the illustrative embodiment, the ends of adjacent apertures 276 may be spaced approximately 0.75 inches from one another. Other apertures 276 having different shapes and sizes may be without limitation. For example, in another embodiment of a holder 272, 340, the apertures 276 may be substantially circular in shape. Apertures 276 so configured may be configured for use with a bedding material 278 configured as a plug and/or plurality of plugs. These plugs may be generally cylindrical in shape and one or more plants may be associated with each plug. Alternatively, each plug may be shaped as a frustrum for ease of insertion and/or removal from the holders 272, 340. Oblong-shaped apertures 276 may have lengths and/or widths greater or less than those disclosed herein without departing from the spirit and scope of the present disclosure. For example, the oblong aperture 276 lengths may range from approximately 0.01 inches to approximately 36 inches and widths may range from approximately 0.01 inches to six inches. Further, the apertures 276 need not be oblong, and they may be circular, oval, square or some other suitable shape.

In some instances, it may be desirable to grow plants 22 from seeds or use seedlings directly in a holder 272, 302, 340, 340', 340", 340''', insert 380 or other structure. When plants 22 are grown directly in holders such structures, it may be necessary to provide bedding material 278 that may be positioned over an aperture 276, which may prevent a plant seed or seedling from falling through the aperture 276. In an illustrative embodiment, bedding material 278 may provide structure to which a plant 22 can anchor itself, while allowing the plant 22 to send out shoots 24 and roots 26 in a normal fashion. Circular apertures 276 in conjunction with plug-type bedding material 278 described above may be used in such a configuration. In an illustrative embodiment, the bedding material 278 also allows air to circulate therethrough. The types of bedding material 278 that may be used in this application may be quite varied and may include but are not limited to, screening, mesh, netting, woven material, matting, synthetic fleece, vermiculite, pebbles, beads, gravel, or the like. Other materials may be used without departing from the spirit and scope of the present disclosure.

As depicted in FIG. 9A, a bedding material 278 of mesh or woven material may be positioned adjacent the apertures 276. In an illustrative embodiment, the mesh or woven bedding material 278 may be sufficiently sized to prevent a seedling from falling through the aperture 276 while providing a structure to which a plant may anchor itself and grow. Alternatively, a holder 272, 302 may include a plurality of generally horizontally arranged pockets in the manner of a single egg-holding row of an egg carton, and the pockets may be provided with apertures 276 and bedding material 278, if desired (not shown). As will be appreciated, the relatively flexible nature of the holder 272, 302 may allow cross-sectional configurations of the trough(s) 274 to take the shape of a catenary. Where the frames 250, 280 are angled with respect to the vertical, as shown in an illustrative embodiment of FIGS. 1, 8 and 9B, the cross-sectional configuration of a trough 274 may be somewhat asymmetrically shaped, such as a "J" shape. When a frame 250 and/or 280 is angled, the holder 272, 302 may be configured to arrange rows of plants so that they are held in a plurality of tiers or steps. This allows the density of the plants per unit area to be greater than the density of plant per unit area that is possible with a horizontal plant arrangement.

The holder 272, 302 may comprise a single piece of material that may be positioned over crossbars 264, 294 of a frame 250, 280. In an illustrative embodiment, the holder 272, 302 may comprise a plurality of smaller sections that may be engaged with each other to form a larger holder 272, 302 (see, for example, FIGS. 9A and 9B). The adjacent holders 272, 302 (and/or sections 272, 272', 272" thereof) may be arranged in an overlapping configuration so that a portion of an upper end 273a' of one holder 272, 302 is coincident with a portion of a lower end 273b of the adjacent holder 272, 302. In some embodiments, the upper and lower ends 273a, 273b of a holder 272, 302 (and/or sections 272, 272', 272" thereof) may be shaped so as to enable the upper and lower ends 273a, 273b of adjacent sections 272, 272', 272" to partially nest together and form an engagement therebetween (see, for example, FIG. 9B). In the illustrative embodiment, the engagement between the upper and lower ends 273a, 273b of such adjacent holders 272, 302 (and/or sections 272, 272', 272" thereof) may be supported by a crossbar 264. It may be desirable to further enhance the engagement between adjacent sections' 272, 272', 272" upper and lower ends 273a, 273b and a crossbar 264 by providing fastening elements 277, such as clips, that serve to prevent accidental disengagement of the components. In other embodiments, adjacent sections may be engaged edge-to-edge in the manner of a tambour door (not shown). In some embodiments, a holder 272, 302 may be partially or substantially formed with a desired cross-sectional configuration prior to installation on a frame 250, 280. In an illustrative embodiment, a holder 272, 302 comprises opaque material so as to prevent light from impinging on the roots of a plant. When in an operational configuration, the holders 272, 302 may form a chamber "C" or partial enclosure (see, for example, FIGS. 10 and 12) into which roots of a plant or plants may extend.

In another illustrative embodiment depicted in FIGS. 10A-10C, a holder 340 may include elements such as a body 340, a tray 346, a downwardly depending leg 360, a foot 366, a channel 354, and opposing ends 345a, 345b. In an illustrative embodiment, the upper end 342 of the body 340 may include a rearwardly extending tray 346 that, when in use, may be generally horizontally oriented and able to receive plants 22. The tray 346 may include a bottom 348 and upwardly extending opposing sides 350, 352. The opposing sides 350, 352 and bottom 348 may define an upwardly opening channel 354 with opposing ends 345a, 345b that may be configured to receive plants 22. The bottom 348 may include a downwardly extending bowed portion and may include one or more apertures 276, 306 as discussed in detail above regarding holders 272, 302. As with the previously described embodiments, and depending upon the particular implementation, the bottom 348 of a holder 340 may have a width that may range from approximately 0.01 inches to approximately 18 inches. In the illustrative embodiment, the bottom 348 may have a width in the range of about approximately 0.1 inches to approximately 6 inches. More specifically, it is contemplated that one application of the bottom 348 may have a width of approximately two inches.

Although the bottom 348 of the holder 340 may be essentially flat, in an illustrative embodiment, the bottom 348 may include a bowed portion 349. The bowed portion 349 may have a radius R1 that ranges from approximately no radius (flat) to any suitable curvature for the particular application. The bottom 348 may also be v-shaped (not shown), if desired. However, in the illustrative embodiment the bowed portion 349 of the bottom 348 has a radius in the range of approximately 0.01 inches to approximately 12 inches. More specifically, it is contemplated that for certain applications it will be optimal for the bowed portion 349 of the bottom 348 to have a radius of approximately 1.25 inches. The opposing sides 350, 352 may be angled relative to each other such that they converge at a point A1 above the tray 346. In an illustrative embodiment, the opposing sides have a height of approximately between 0.01 inches and three inches. In one embodiment the opposing sides 350, 352 have a height of approximately 0.25 inches. The opposing sides 350, 352 need not have the same height, but may have the same height in certain embodiments.

In some embodiments, each opposing side 350, 352 may be provided with an inwardly extending ledge 356, 358 that may reduce the opening of the channel 354. In an illustrative embodiment, the inwardly extending ledges 356, 358 define the opening of the channel 354, which opening may be approximately in the range of 0.1 inches to four inches. A leg 360 may be engaged with the upper end 342 to a forwardly facing edge of the tray 346 and extend downwardly therefrom. In an illustrative embodiment, the leg 360 may include a front surface 361, a rear surface 363, and a forwardly facing arc 362. In an illustrative embodiment, the arc 362 may have a radius R2 that ranges from approximately no radius (flat) to approximately 18 inches. At the end of the arc 362, the leg 360 may include a transition point 364 that may begin to form a downwardly depending, rearwardly curving foot 366. The foot 366 may include a front surface 367 and may terminate with a downwardly depending and forwardly facing edge 368. In an illustrative embodiment, the curve of the foot 366 and its front surface 367 may have a radius that ranges from approximately no radius (flat) to approximately six inches. Together, the leg 360 and foot 366 in an illustrative embodiment may have a vertical height of approximately three inches. As will be understood, other vertical heights may be utilized without departing from the spirit and scope of the present disclosure. For example, the height may be as little as 0.5 inches or greater than 12 inches without limitation.

Figure 9B:
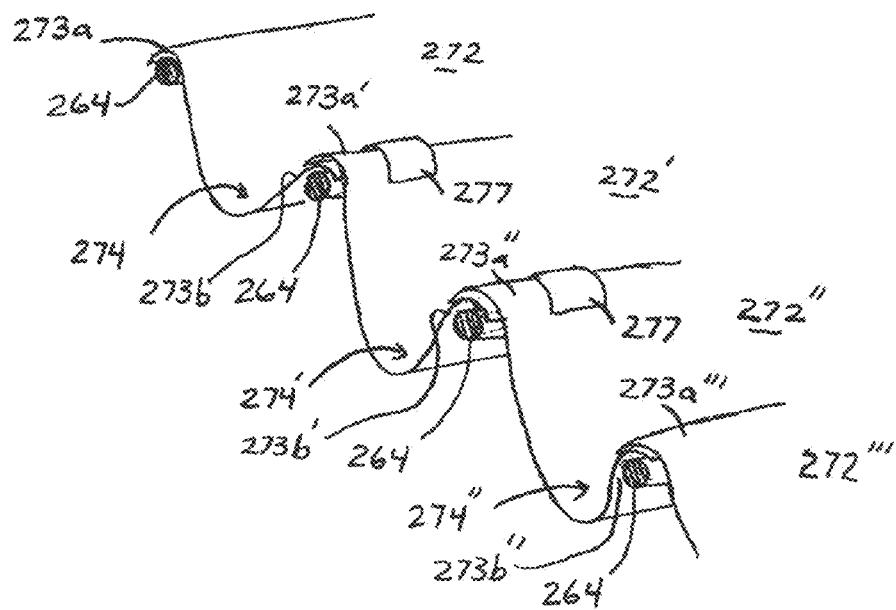
FIG. 9B is a partial, perspective end view of a plurality of holders from FIG. 9A as they may be arranged on crossbars of an illustrative embodiment of a plant stand frame.

At the upper end of the leg 360, and adjacent to the forward facing edge of the tray 346, there may be a partially circular section 370 that defines a downwardly opening slot 372. The slot 372 may be configured and arranged to receive and partially encircle a crossbar 264, 294 of a frame 250, 280 such as depicted in FIG. 9B. In an illustrative embodiment, the circular section 370 may include a radially arranged, outwardly extending flange 374 that may facilitate engagement with and removal of the holder 340 to a crossbar 264, 294. In such an embodiment, the holder 340 may be constructed of any material that is sufficiently resilient so that the holder 340 may be snapped into place over a crossbar 264, 294 and removed by manipulating the flange 372 so as to temporarily enlarge the slot 372 to facilitate removing the holder 340 from the crossbar 264, 294. Such materials include but are not limited to metals and their alloys, metalloids, synthetic materials, and/or combinations thereof. Such a configuration may allow the holder 340 to rotate relative to the crossbar 264, 294 even though it is connected thereto. The optimal configuration, dimensions, orientations, etc. of the various features of a holder 340 (components thereof, and/or sections thereof), a tray 272, 302, and/or an insert 380 (described in detail below) will vary from one embodiment to the next without limitation.

Figure 10D:
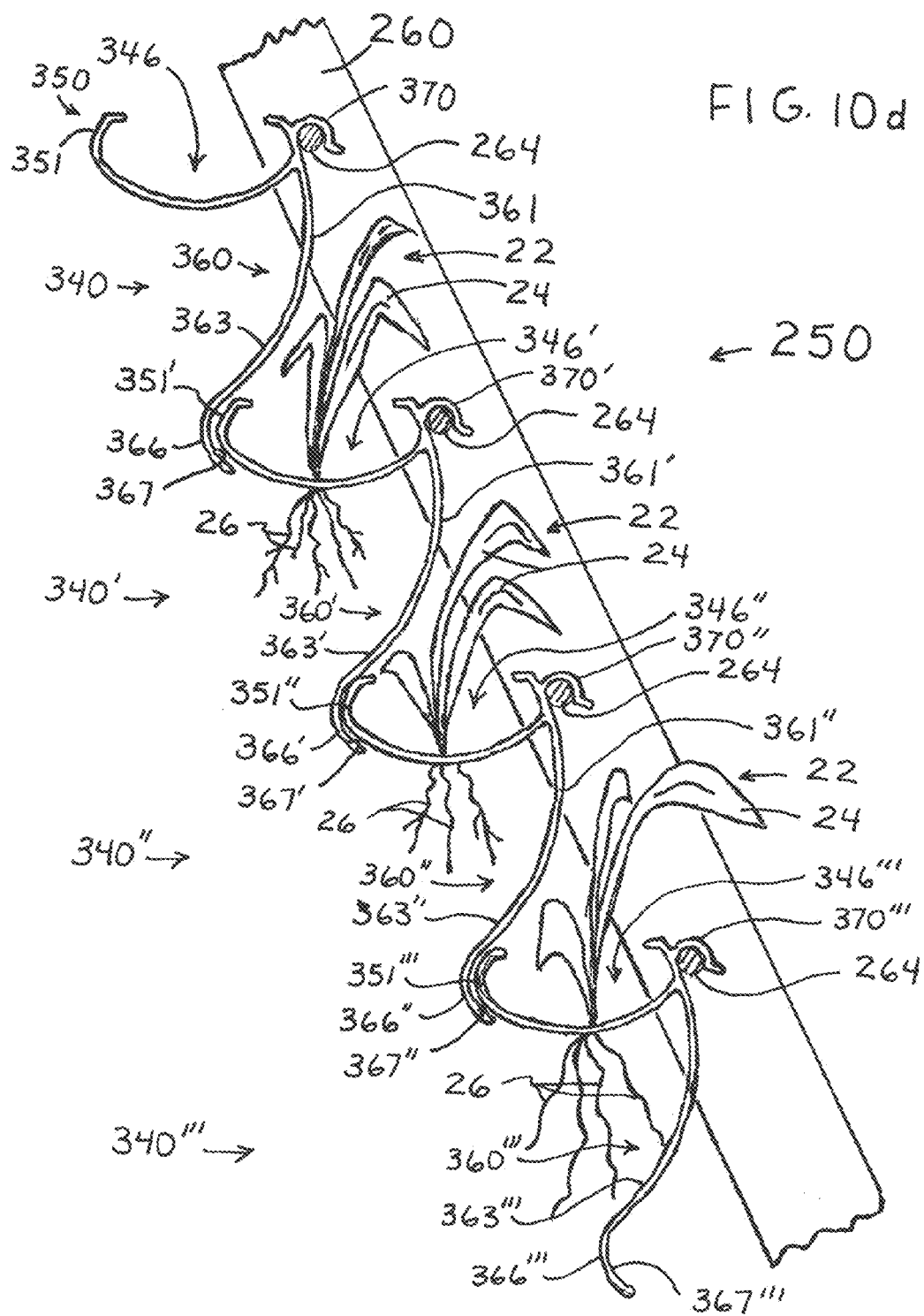
FIG. 10D is a partial, side elevational view of a plurality of holders shown in FIGS. 10A-10C as they may be arranged on crossbars of an illustrative embodiment of a plant stand frame.

Turning now to FIG. 10D, a partial, side elevational view depicts a plurality of holders 340, 340', 340", 340''' as they may be arranged on a frame 250, 280 of a plant stand 18. As depicted, the front surface 361 of the leg 360 of the topmost holder 340 may be oriented to face a plant 22 that is growing in a holder 340' that is situated below the topmost holder 340. As the plant 22 grows larger, the front surface 361 of the leg 360 may serve as a support by allowing the plant to lean against it. A front surface 367 of the curved foot 366 may engage a rear surface of the rearmost side 351' of the tray 346' of the holder 340' that is situated therebelow. As can be seen, the tray 346' of the lower holder 340' may prevent the leg 360 of the upper holder 340 from swinging forwardly. The second holder 340', which may include a plant 22, illustrates an important feature of this embodiment of a holder 340. Note that the roots 26 of the plant 22 are not impinged by the leg 360' situated below. This is because of the arc 362' that is present in the leg 360'. By providing the leg 360' with an arc 362', the rear surface 363' of the arced leg 360' is positioned to minimize contact with the roots 26. This feature also serves to maximize air contact with the roots 26 by created a free-fall zone for the roots 26. In that regard, the configuration of the arc 362' of the leg 360' may be important. If the arc 362' projects outwardly too much, the front surface 361' of the leg 360' may interfere a plant 22 (or plants 22) of a lower holder 340" and impinge and/or prohibit normal growth. And, if the arc 362' projects inwardly too much, the rear surface 363' of the leg 360' may contact the plant 22 (or roots 26) of the holder 340' and may lessen air contact at the roots 26. This may be important because if the roots 26 contact the rear surface 363' of a leg 360', direct contact with the surrounding air is prevented and inhibited, and when this occurs normal aspiration of the roots 26 may be inhibited. Further, if the roots 26 contact the rear surface 363' of a leg 360', the surface area of the roots 26 may be greatly reduced and the roots 26 may not be able to absorb nutrient supply at the desired rate, which may stunt plant growth. While a leg 360 having an arc 362 with a radius of approximately two inches may be used in certain embodiments, it is possible that the arc 362 could have a radius that is approximately on the order of a 0.1 inches to 18 inches, or the leg 360 could be substantially linear without departing from the spirit and scope of the present disclosure.

The holders 340, 340', 340", 340''' shown in FIGS. 10A-10D may be used with an insert 380. In an illustrative embodiment shown in FIGS. 11A & 11B, an insert 380 may include features such as a base 382, opposing side walls 384, 386, opposing ends 390a, 390b, and a plurality of apertures 276. As with the above-described tray 346, the insert 380 may be configured such that when it is in use it may be generally horizontally oriented and able to receive one or more plants 22. In one embodiment, the side walls 384, 386 may be engaged with the base 382 and extend upwardly therefrom. The opposing side walls 384, 386 and base 382 may serve to define an upwardly opening channel 388 that may be configured to receive one or more plants 22. However, the insert 380 may be inverted so as to define a downwardly opening channel 388.

Figure 32:
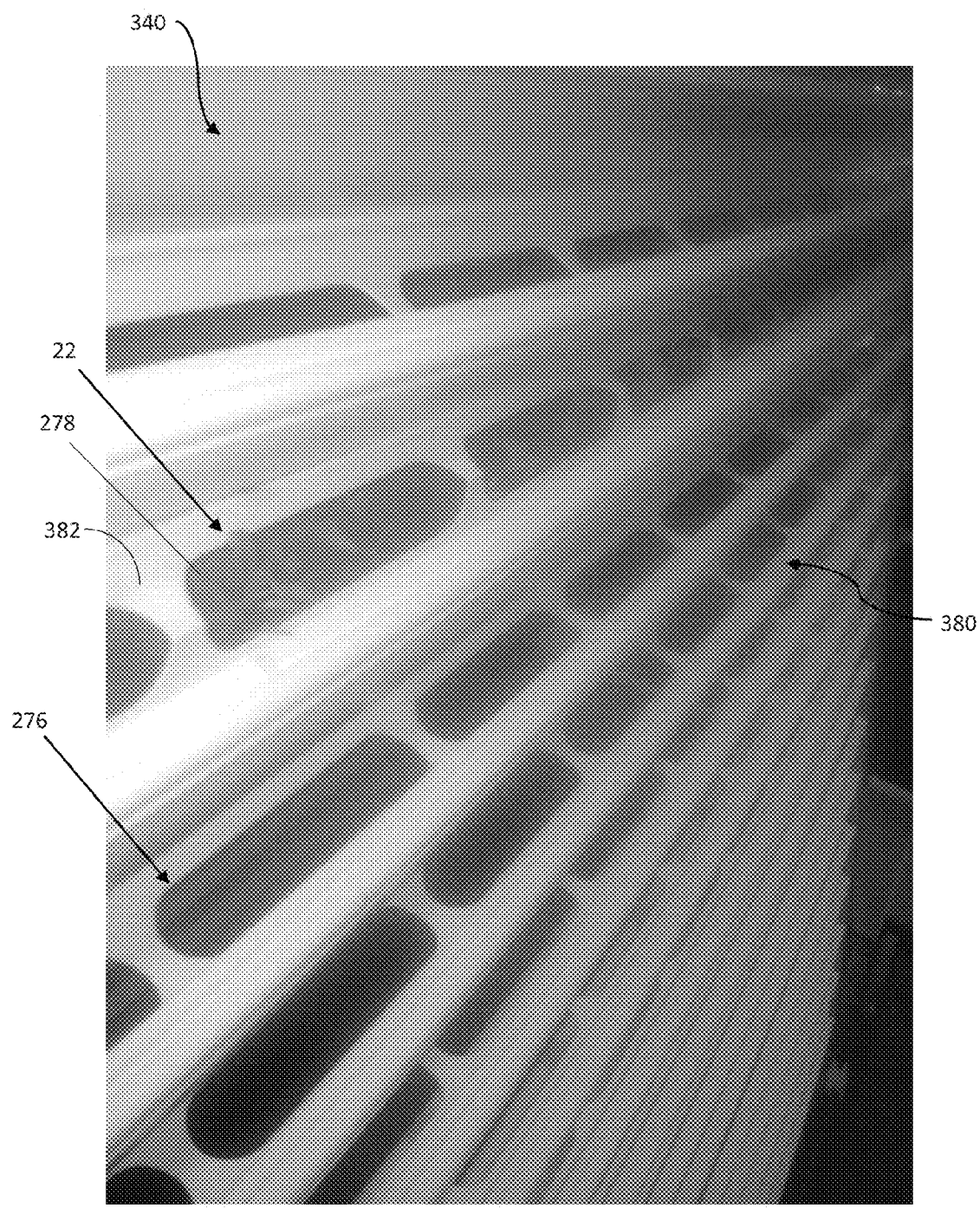
FIG. 32 provides a perspective view of a plurality an illustrative embodiment of inserts engaged with an illustrative embodiment of respective holders.
Figure 32A:
FIG. 32A provides a detailed view of a portion of FIG. 32.

One illustrative embodiment of how an insert 380 may be inverted is shown in FIGS. 32 & 32A. Inserts 380 used in an inverted configuration may be identical to those shown in FIGS. 11A & 11B, or they may be differently designed depending on the specific application thereof. A plurality of inserts 380 in an inverted configuration, wherein the inserts 380 are engaged with a plurality of respective holders 340, is shown in FIG. 32. Generally, such an arrangement is similar to that depicted in FIG. 12 (where the inserts 380 are not inverted). However, with the arrangement shown in FIGS. 32 & 32A, the bedding material 278 may be positioned below the insert 380, such that a portion of the insert 380 provides a barrier between the plant 22 and the bedding material 278. Such a barrier may be useful in preventing nutrient burn on the lower leaves of the plant 22 that might otherwise contact the bedding material 278 if the insert 380 did not provide a barrier therebetween due to the relatively high concentration of nutrient supply within the bedding material 278. Other structures and/or methods may be used to mitigate and/or prevent contact between the plants 22 and the bedding material 278 without limitation.

The base 382 may include one or more apertures 276 as discussed in detail above for various embodiments of holders 272, 302, 340. The insert 380 may be configured and arrange to reside within the confines of the tray 346 of a holder 340 in a selectively engageable manner. Accordingly, the dimensions of the insert 380 may vary within the range of dimensions of the tray 346 and/or holder 340 as discussed above. For example, in an illustrative embodiment, the base 382 may have a width of approximately 1.75 inches. The opposing side walls 384, 386 may be angled relative to each other such that they converge at a point A2 above the insert 380. In an illustrative embodiment, each opposing side wall 384, 386 may include an outwardly extending portion 390, 392 and an inwardly extending portion 394, 396. In an illustrative embodiment, the inwardly extending portions 394, 396 may define the opening of the channel 388 of the insert 380. In use, the insert 380 may be positioned in a tray 346 of a holder 340 so that the side walls 384, 386 of the insert 380 are located adjacent the opposing sides 350, 352 of the tray 346. In an illustrative embodiment, the apertures 276 of the insert 380 may be aligned with the apertures 276 of a tray 346 in which it is positioned.

Figure 12:
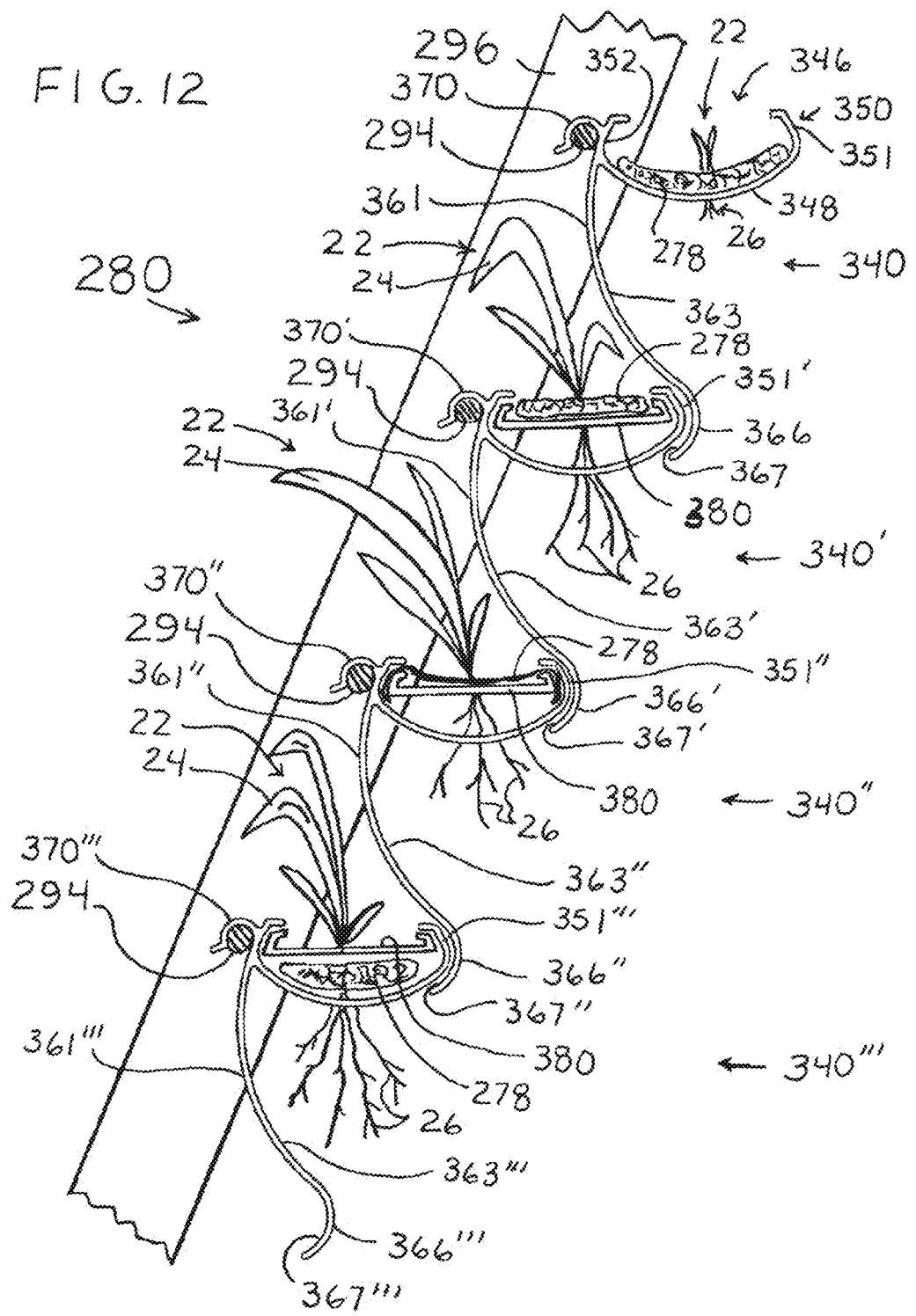
FIG. 12 is a partial, side elevational view of the embodiment of a holder shown in FIG. 10A and the embodiment of an insert shown in FIG. 11A, wherein a plurality of holders are shown engaged with an embodiment of a plant stand frame.

Turning now also to FIG. 12, a partial, side elevational view depicts a plurality of holders 340, 340', 340", 340''', some with inserts 380, as they may be arranged on crossbars 294 of a frame 280 of a plant stand 18. As depicted, holders 340, 340', 340", 340''' may interact with each other in the manner described above. The top tier holder 340 depicts the addition of a bedding material 278 and a young plant 22 or seedling sprouting therefrom. The second tier holder 340' depicts an insert 380 with bedding material 278 positioned in the insert 380' and held by the side walls 384', 386' of the insert 380'. Note that roots 26 may extend through the apertures 276 in both the insert 380' and the tray 346' of the holder 340'. In the third tier, an insert 380" and bedding material 278 are shown with the bedding material 278 held in position by the side walls 384", 386" of the insert 380" and the sides 350", 352" of the tray 346". In the fourth tier, bedding material 278 is positioned between an insert 380''' and a tray 340'''. Other combinations of bedding material 278, inserts 380, and/or trays 346 are possible without departing from the spirit and scope of the present disclosure.

Figure 13:
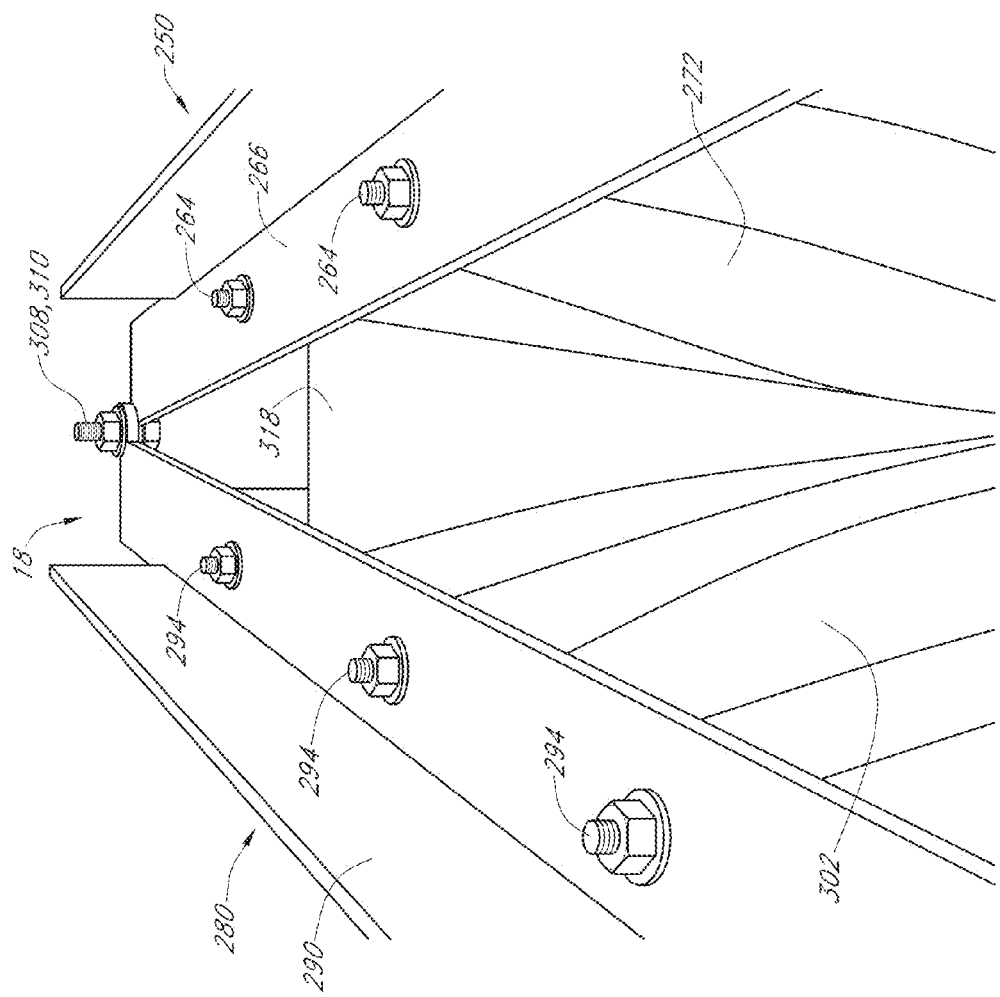
FIG. 13 is a partial, perspective side view of a portion of an illustrative embodiment of a plant stand that may include a cap that covers the top of the stand, the view looking up toward the top of the stand and into the chamber "C" of the plant stand.
Figure 14:
FIG. 14 is a partial, perspective view of one illustrative embodiment of a frame of a plant stand with the frame supporting a plurality of plants in a tiered manner, the view looking down toward the bottom of the frame.

The top of the plant stand 18 may be provided with a hood or cap 318 that protects plant roots by effectively reducing light and contaminants from entering the chamber from a gap that may exist between top members 252, 282 of two frames 250, 280 that have been engaged with one another (FIG. 13). The hood or cap 318 may also effectively reduce the amount of nutrient supply that may escape from the gap. A plant stand 18 may be provided with one or more side panels that extend between a side member 260 of a first frame 250 and a side member 290 of a second frame 280. Accordingly, a side panel configured for use with the embodiment of a plant stand 18 show in FIG. 15 would be generally triangularly shaped. The side panels may protect roots 26 by effectively reducing light and contaminants from entering the chamber from a lateral direction and may be configured to overlap with one another such that nutrient supply delivered to the plants 22 from inside the plant stand 18 does not exit the plant stand 18 be instead remains between the two frames 250, 280. In some embodiments, the side panels may extend from the top to the bottom of a plant stand 18, and may serve to retain nutrient supply in the area between engaged frames 250, 280. In some embodiments, a plurality of plant stands 18 may be arranged so that side members of adjacent frames 250, 280 are adjacent to each other and so that the plant stands 18 may be moved together. In such instances, side panels may be provided at the ends of the chamber formed by the holders of the adjacent plant stands 18. In some embodiments, it may be desirable for a plant stand 18 to be stationary and a carriage assembly 15 move relative thereto. In such instances a side panel may be provided with a cutout to allow movement of a branch 210 of a delivery arrangement 16 therepast as a carriage assembly 15 moves along the framework 12. As with the holders 272, 302, the cap and side panels may be formed from opaque material plants so as to prevent light from reaching the roots of a plant. The cap and side panels may be engaged with the plant stand 18 using any suitable fastening elements including but not limited to hook-and-loop fasteners, nuts and bolts, hooks, clips or the like.

Figure 5:
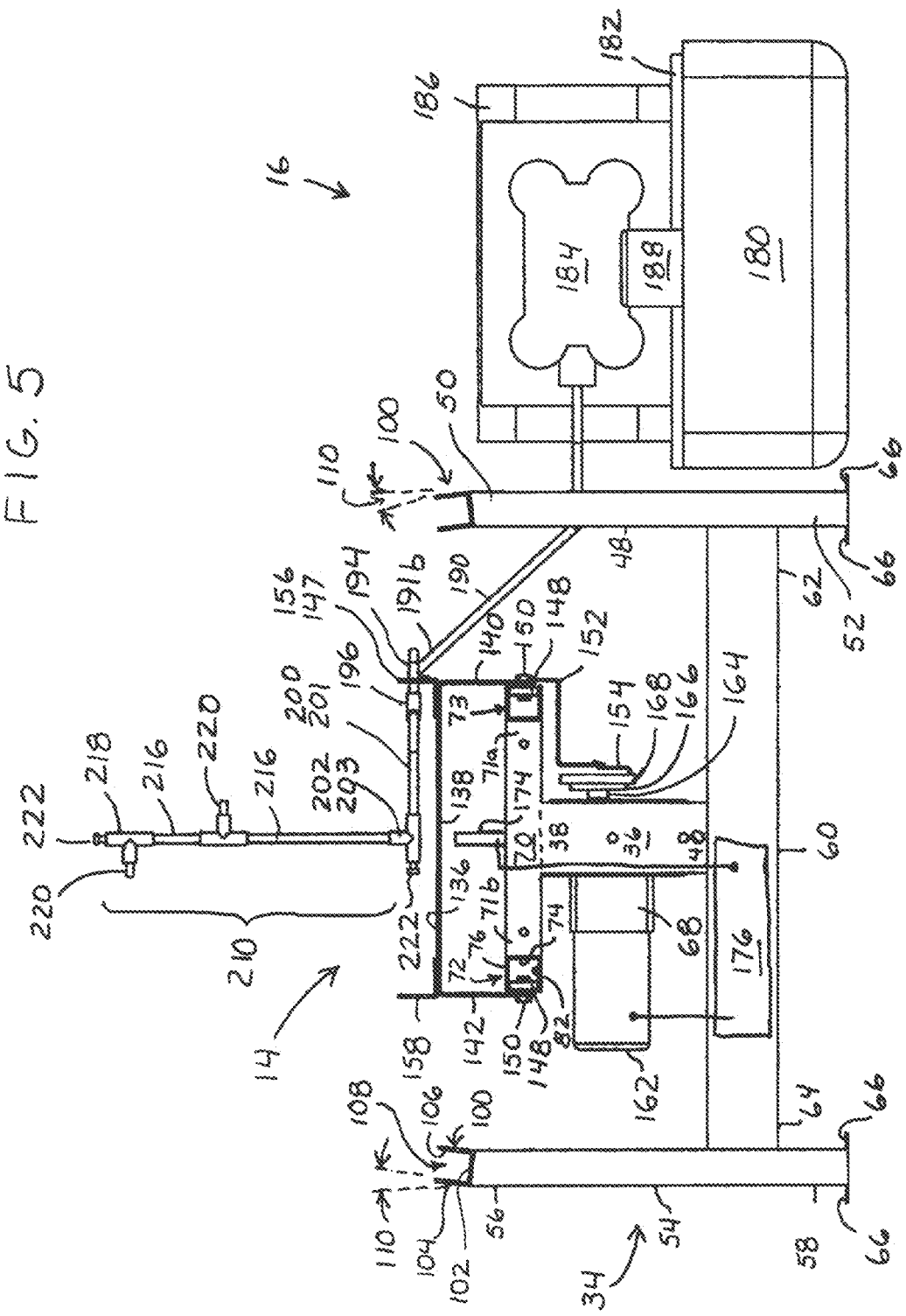
FIG. 5 is an end elevational view of the embodiment of FIG. 3.

As mentioned above, movement of one or more plant stands 18 may be supportably constrained by one or more rails 100 of a framework 12. In embodiments where the rails are U-shaped and a frame 250, 280 is received in a slot in the rail (as depicted in FIG. 5, for example), the bottom member 256, 286 of the frame 250, 280 may be provided with a friction reducing element (or elements) so that a plant stand 18 may be moved relative to the framework 12, while maintaining contact with the rails 100 of the framework 12. In some embodiments, a friction reducing element may be a wheel 258 that is rotatably mounted to the bottom member 256, 286 of a frame 250, 280. In some embodiments, a bottom member 256, 286 may include a plurality of rotatably mounted wheels 258. In other embodiments the friction reducing elements may include strips of material such as polytetrafluorethylene or high molecular density plastic. Other embodiments may include friction reducing wheels and friction reducing strips. Alternatively, a rail or rails may be provided with friction reducing elements (not shown) so that a plant stand 18 may be slidingly supported thereby. Any suitable structure and/or method may be used to allow the plant stand(s) 18 to move with respect to the framework 12, and accordingly the specific implementation thereof in no way limits the scope of the present disclosure.

Figure 30A:
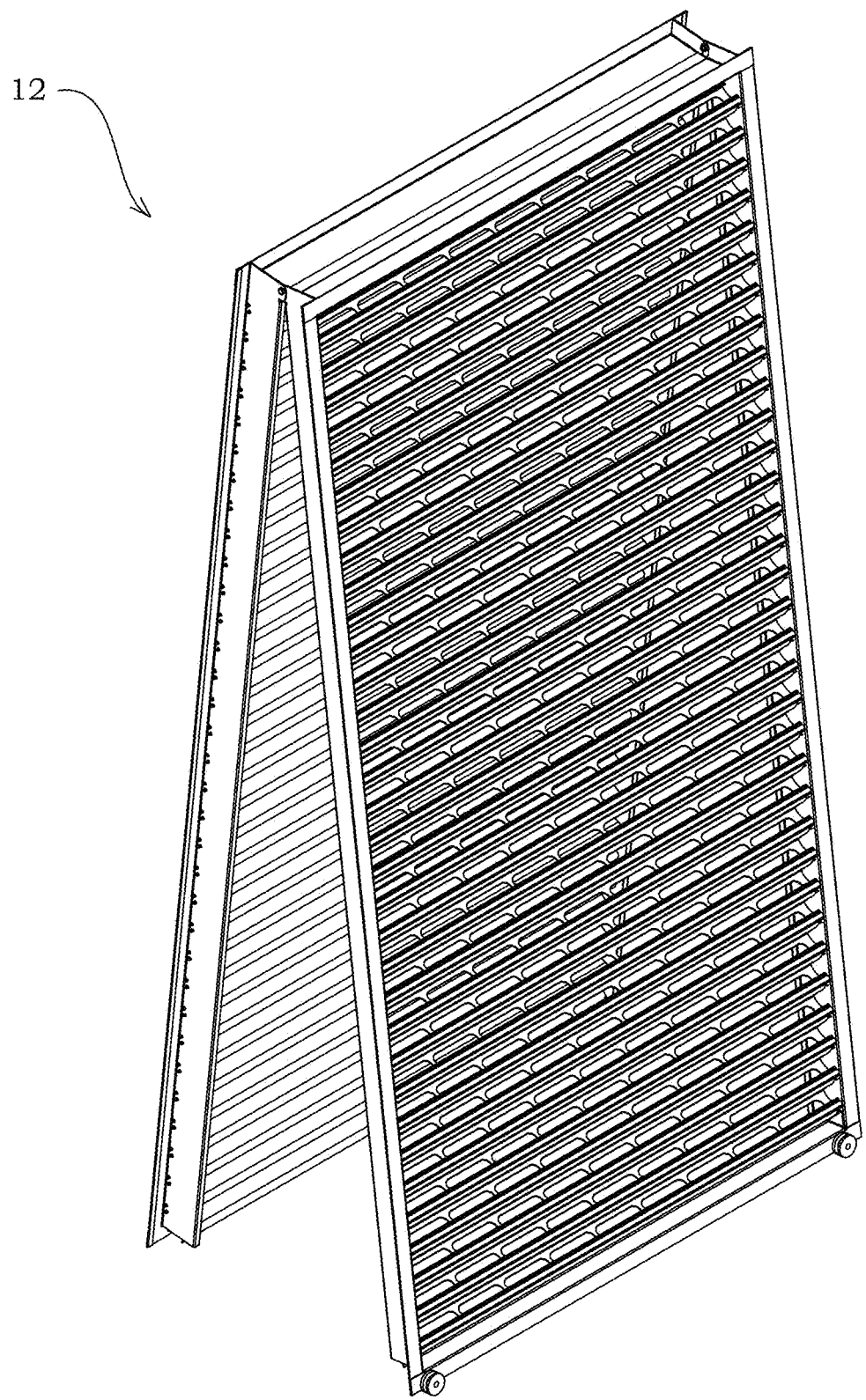
FIG. 30A provides an elevated perspective view of an illustrative embodiment of a plant stand configured from two frames engaged with one another adjacent their top members.
Figure 30B:
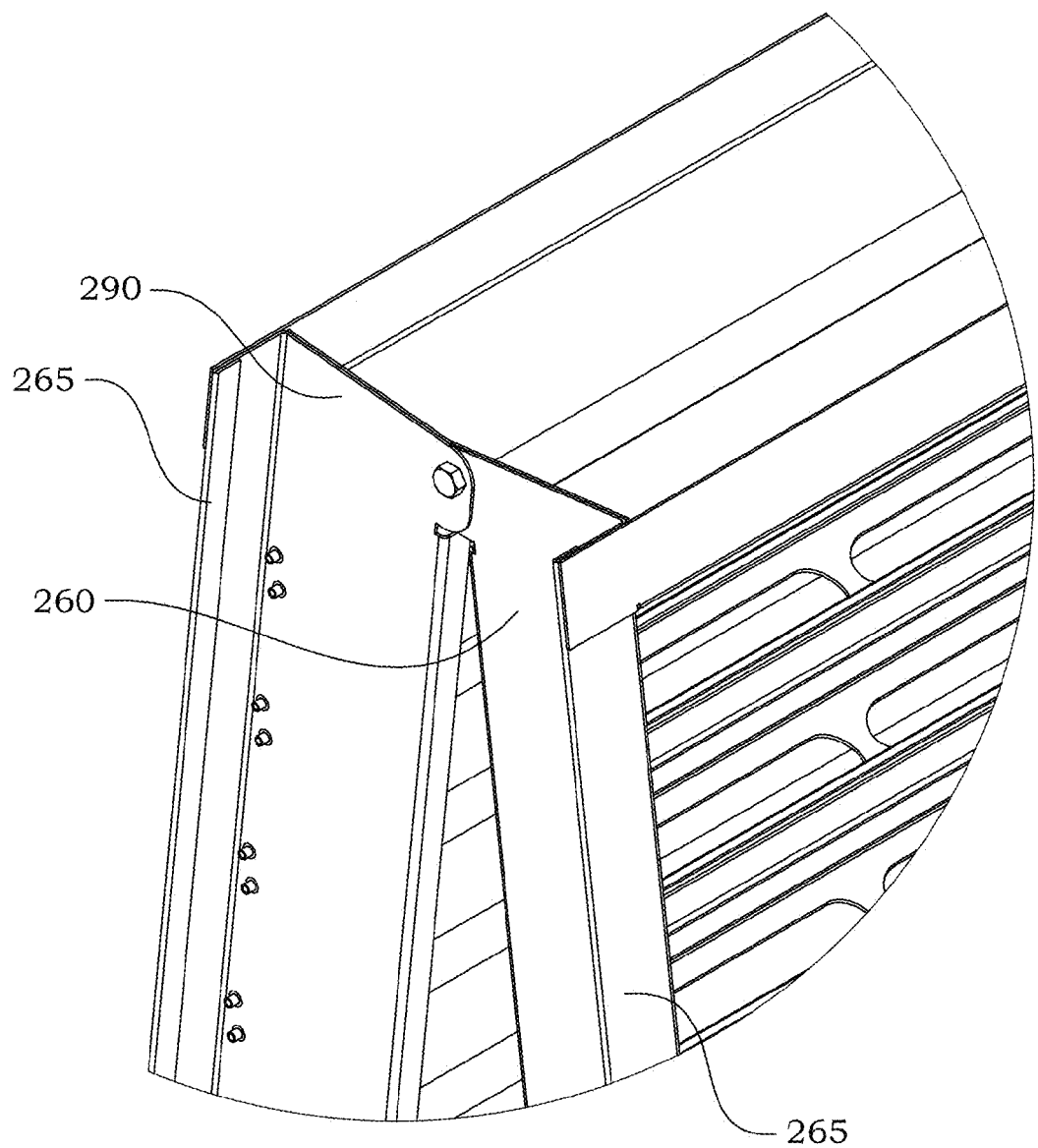
FIG. 30B provides a detailed view of the engagement portion of the embodiment shown in FIG. 30A.
Figure 30C:
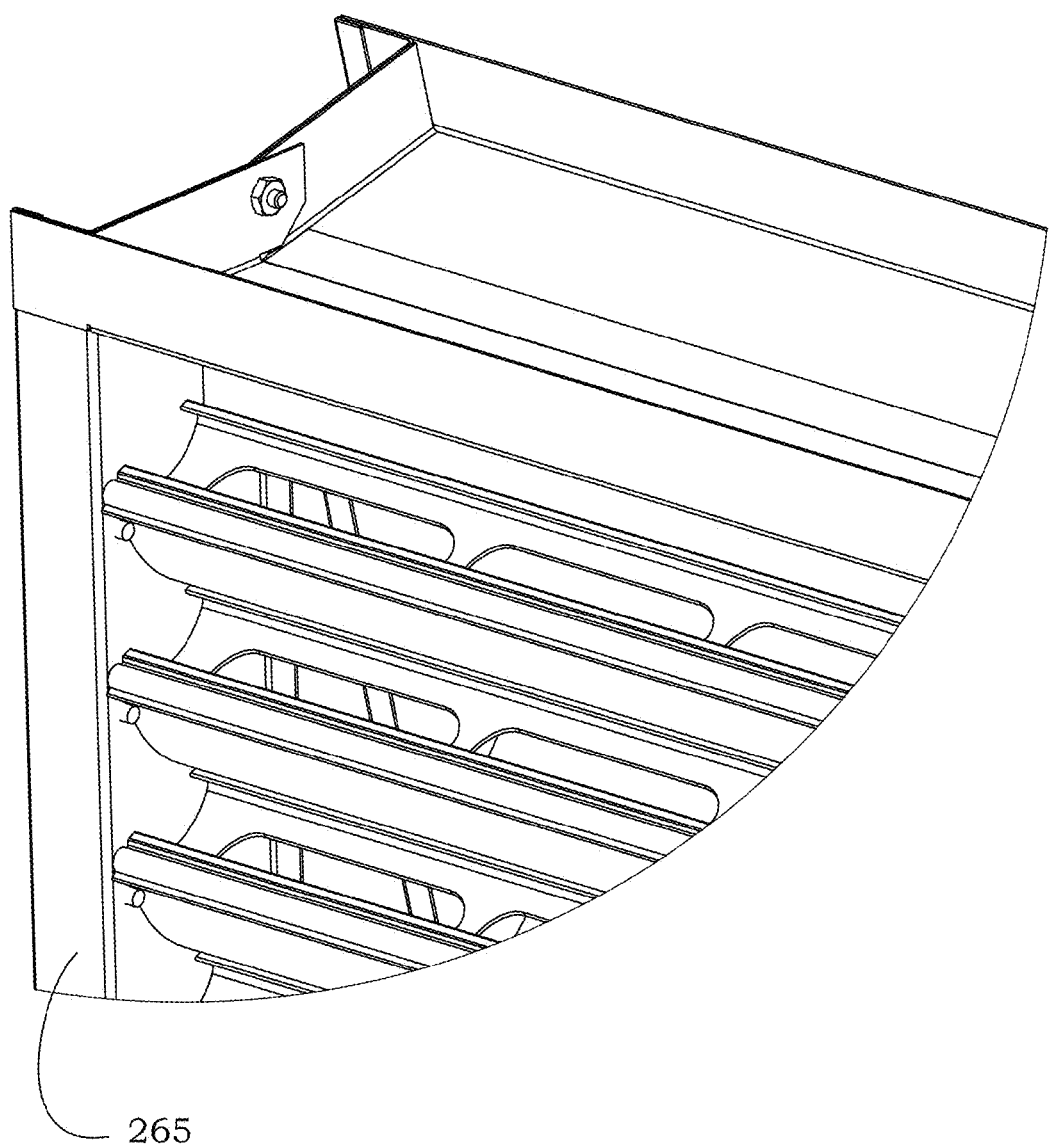
FIG. 30C provides another detailed view of the engagement portion of the embodiment shown in FIGS. 30A & 30B.
Figure 30D:
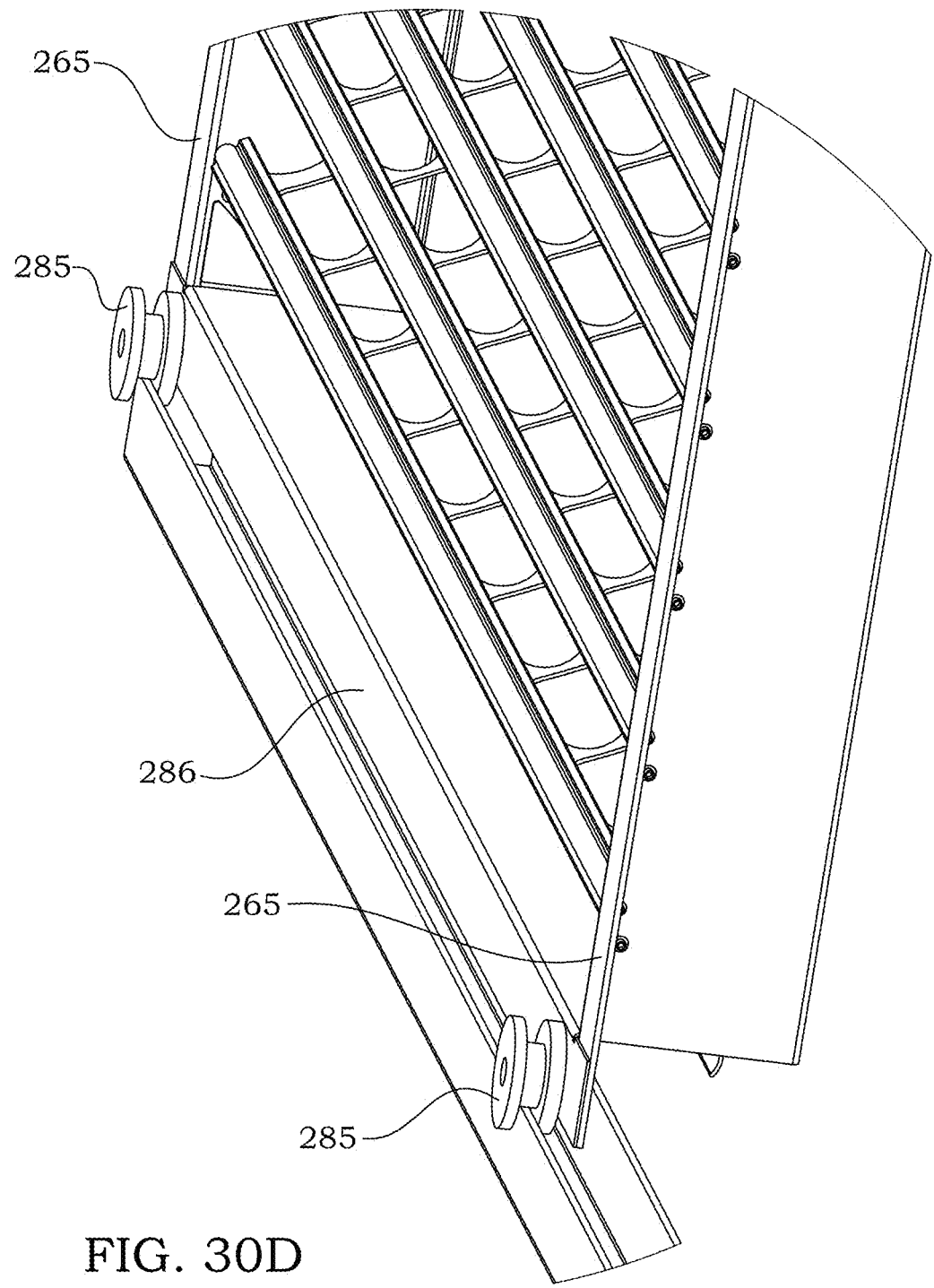
FIG. 30D provides a detailed perspective view of the bottom member from one of the frames in the embodiment shown in FIG. 30A.
Figure 30E:
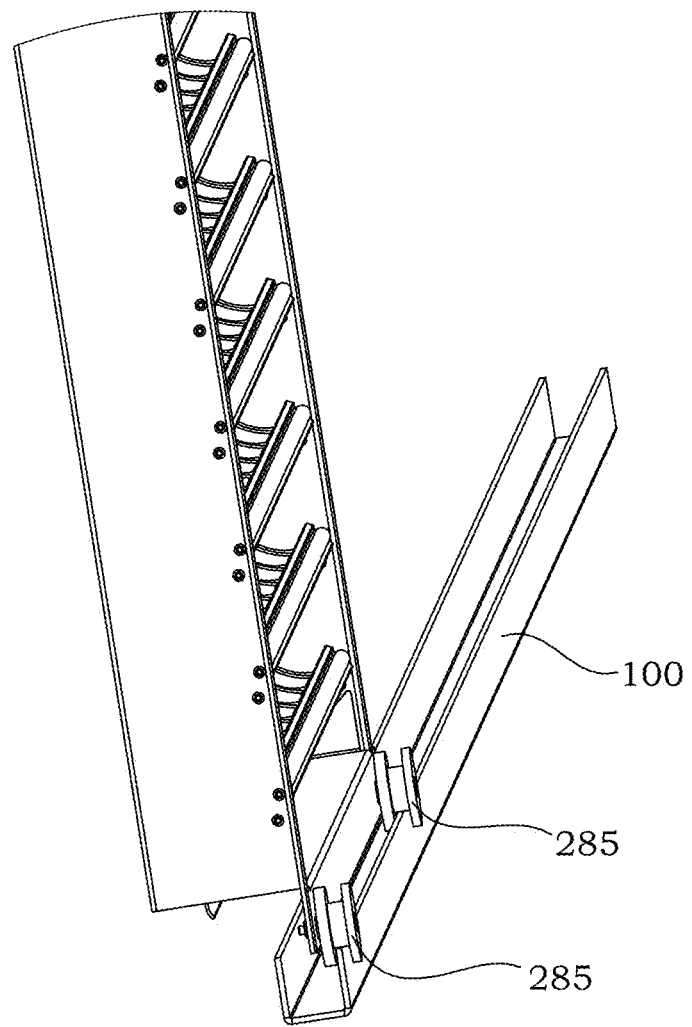
FIG. 30E provides a detailed end view of the bottom member from one of the frames in the embodiment shown in FIG. 30A engaged with an illustrative embodiment of a rail of a framework.
Figure 30F:
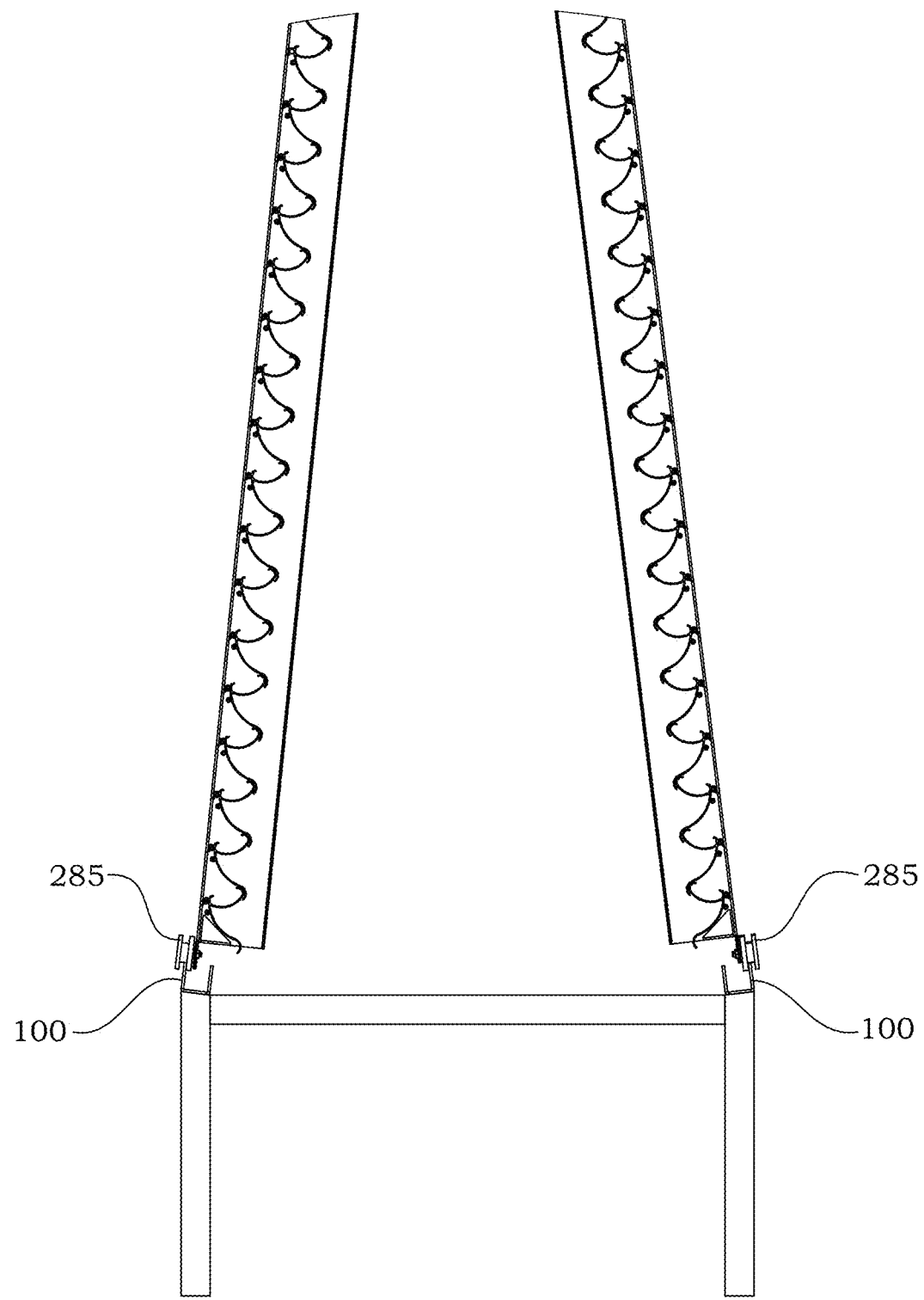
FIG. 30F provides a detailed end view of two bottom members from two frames in the embodiment shown in FIG. 30A engaged with an illustrative embodiment of two rails of a framework.

Another illustrative embodiment of a plant stand 18 that may be used alone or in combination with various features of the present disclosure is shown in FIGS. 30A-30F. As shown in FIG. 30B, each side member 260, 290 may be formed with an extending flange 265, which may be oriented such that it extends in a direction generally parallel to the top member 252, 282. The flange 265 may extend along the entire length of any side member 260, 266, 290, 296 all the way to a wheel 258 positioned adjacent a bottom member 286 as shown in FIG. 30D. In this embodiment, the wheels 258 may be formed with a reduced diameter portion having flanges positioned on either side thereof. This configuration may allow for unrestricted flow of nutrient supply through the slot 108 of the rails 100 for use in a recycling arrangement, as the wheels 258 may interface with the top surface of wall of the slot 108. A side panel (not shown) may also be used with this embodiment of a plant stand 18 as described in greater detail above.

One embodiment of a pivot connection 308 between two frames 250, 280 is shown in detail in FIG. 30C. The pivot connection 308 may be formed through simple engagement of adjacent top members 252, 282, as shown in FIG. 30C, using a nut and bolt passing through corresponding apertures, or it may be differently configured without limitation. The top members 252, 282 may be configured to prevent nutrient supply from exiting the plant stand 18 upward. It is contemplated that in some embodiments, a pivot connection 308 between two frames 250, 280 of a plant stand 18 will not be required, and instead, the frames 250, 280 may lean inward to rest on a single rail, cable, or other structure capable of supporting the angled frame 250, 280. It is contemplated that low-friction plastic or other low-friction material may be used at the various contact points (e.g., between frames 250, 280 and rails 100). It is also contemplated that in certain embodiments it may be advantageous to have adjacent plant stands 18 engaged with one another such that lateral movement of one plant stand 18 causes lateral movement in an adjacent plant stand 18.

Figure 31A:
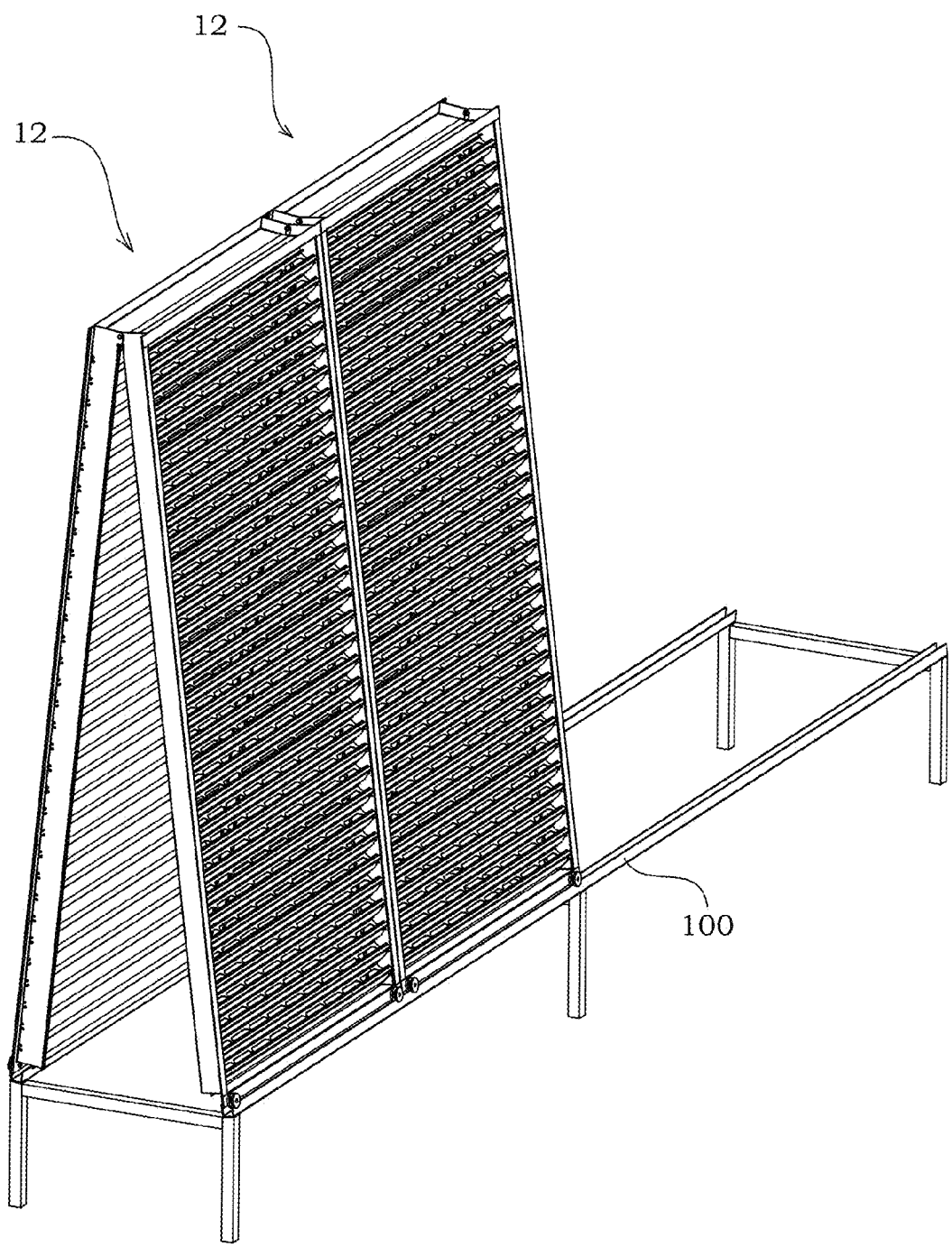
FIG. 31A provides an elevated perspective view of an illustrative embodiment of two plant stands engaged with one another, wherein the two plant stands are also engaged with an illustrative embodiment of two rails in a framework.
Figure 31B:
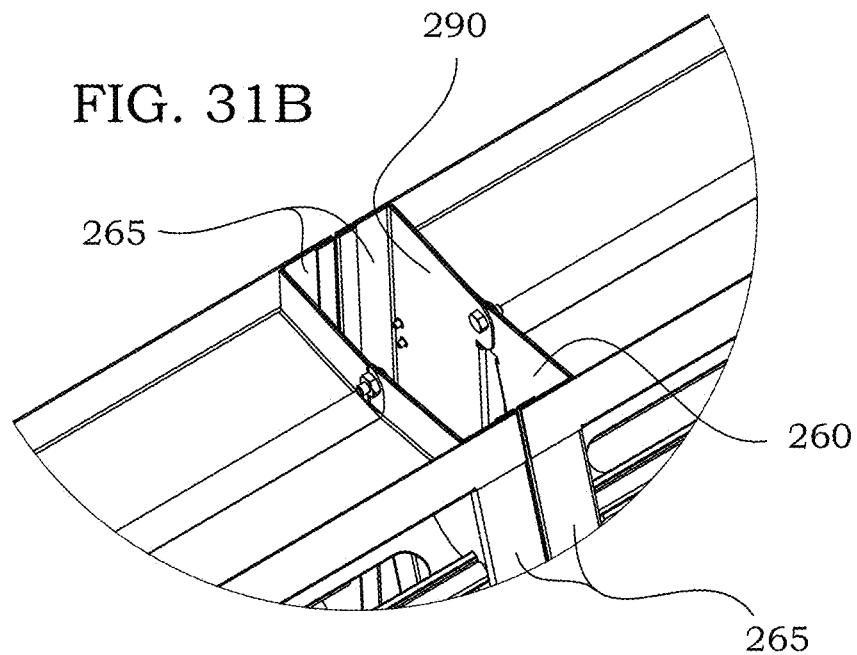
FIG. 31B provides a detailed view of the engagement portion adjacent the respective top members of the plant stands from FIG. 31A.
Figure 31C:
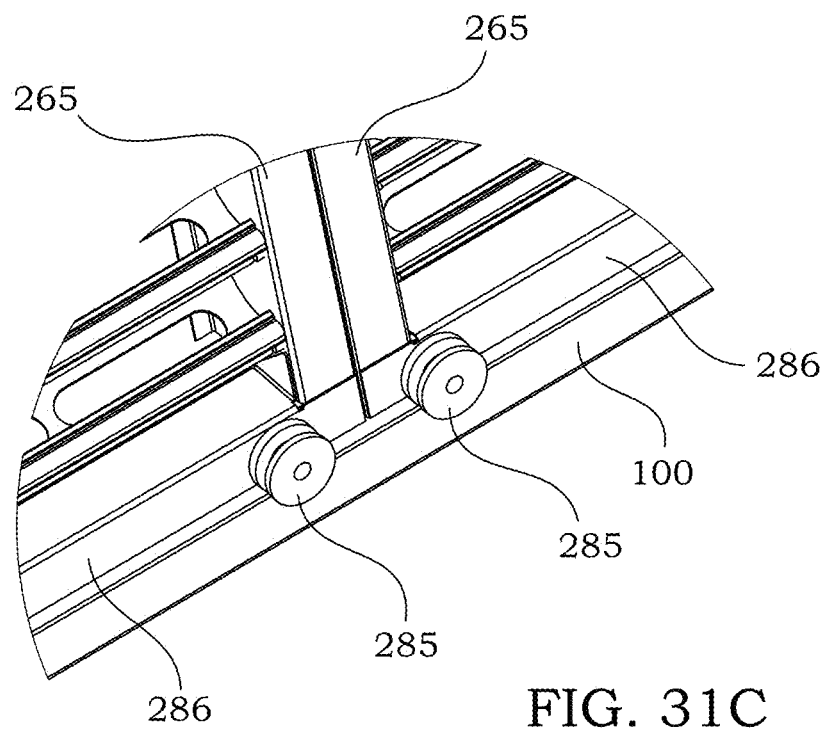
FIG. 31C provides a detailed view of the engagement portion adjacent the respective bottom members of the plant stands from FIG. 31A.

FIGS. 31A-31C provide various views of two of the plant stands 18 shown in FIGS. 30A-30F positioned directly adjacent one another. FIGS. 31B & 31C show how the corresponding flanges 265 on the adjacent plant stands 18 may abut one another to prevent nutrient supply from exiting the chamber C on the interior of the plant stand 18 via the interface of two corresponding side members 260 of adjacent plant stands 18. In other embodiments, the flanges 265 may be configured to overlap one another. Other structures and/or methods may be used to prevent nutrient supply from exiting the chamber on the interior of the plant stand 18 via the interface of two corresponding side members 260 of adjacent plant stands 18 in conjunction with or separate from the flange 265 as shown herein, including but not limited to adhesive sealing material, flexible sealing material, etc. without departing from the spirit and scope of the present disclosure.

Figure 31D:
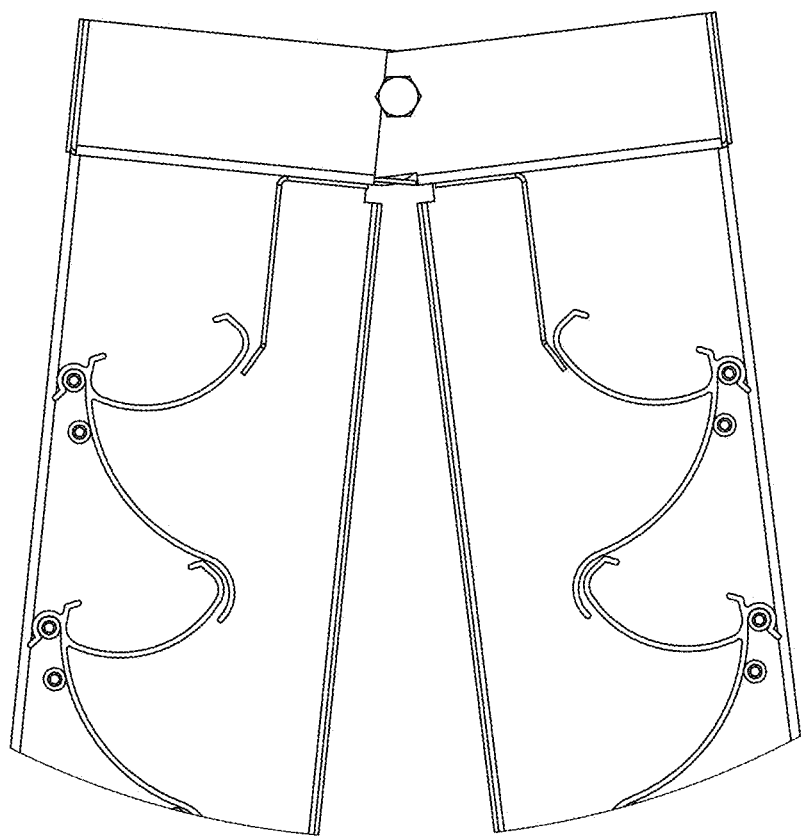
FIG. 31D provides a detailed side view of a top portion of the plant stands from FIG. 31A wherein certain elements have been removed for clarity.

A side view of the embodiment of a plant stand 18 shown in FIG. 30A is shown in FIG. 31D with the side members 260, 290 removed to better show how a holder 340 may interface with this embodiment of a plant stand 18. In addition to crossbars 264 as described for other embodiments of a plant stand 18, the embodiment shown in FIG. 31D may include one or more stop pins 267 on either side member 260, 290. In the illustrative embodiment, the stop pins 267 may be positioned below and slighting inwardly with respect to the corresponding crossbar 264. In practice, the stop pins 267 may serve to prevent unwanted rotation of the holder 340 about the crossbar 264 by engaging the holder 340 at the front surface 361 of the leg 360. Accordingly, the stop pins 267 on the frame 250 as shown in FIG. 31D may prevent the holders 340 engaged with that frame 250 from rotating counterclockwise with respect to the frame 250. The stop pins 267 on the frame 280 may prevent the holders 340 engaged with that frame 280 from rotating clockwise with respect to the frame 280. However, holders 340 on either frame 250, 280 may rotate in the opposite respective directions, which may ease harvest by more readily exposing the tray 346. The topmost holder 340 may engage a plate 253, 283 adjacent the top member 252, 282 at the side 351 of the holder 340. This engagement may help to secure the position of the holders 340 with respect to the frames 250, 280 through gravity while simultaneously allowing rotation of the holders 340 with respect to the frames 250, 280 in certain directions under certain conditions.

Figure 33A:
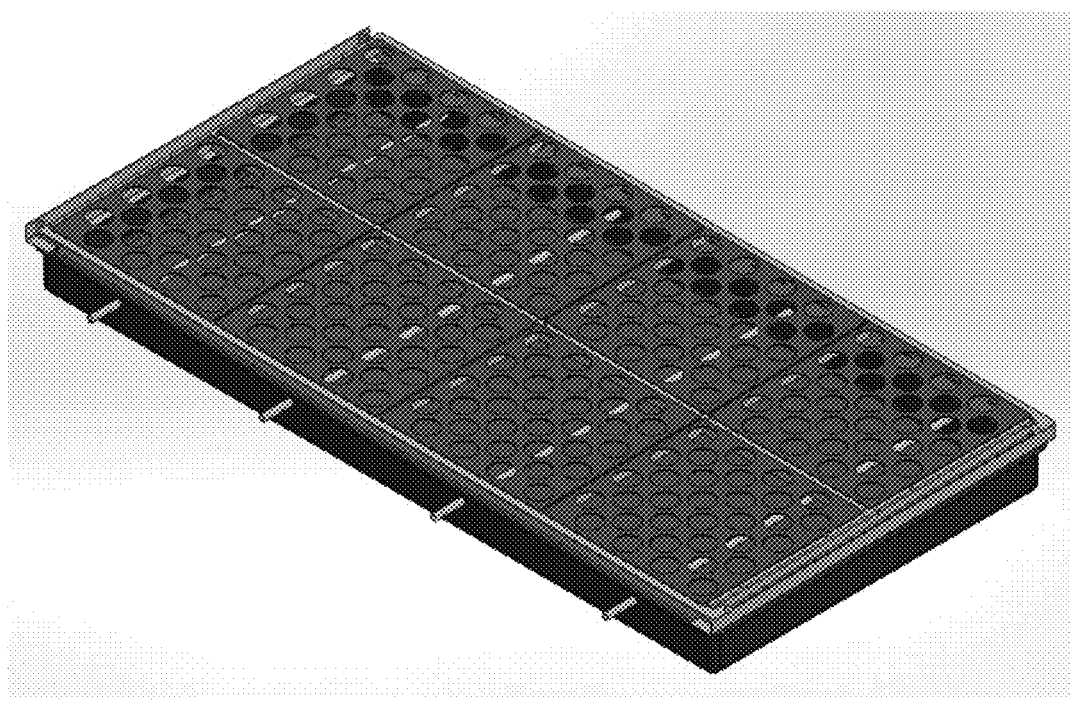
FIG. 33A provides an elevated perspective view of an illustrative embodiment of a growing tray.
Figure 33B:
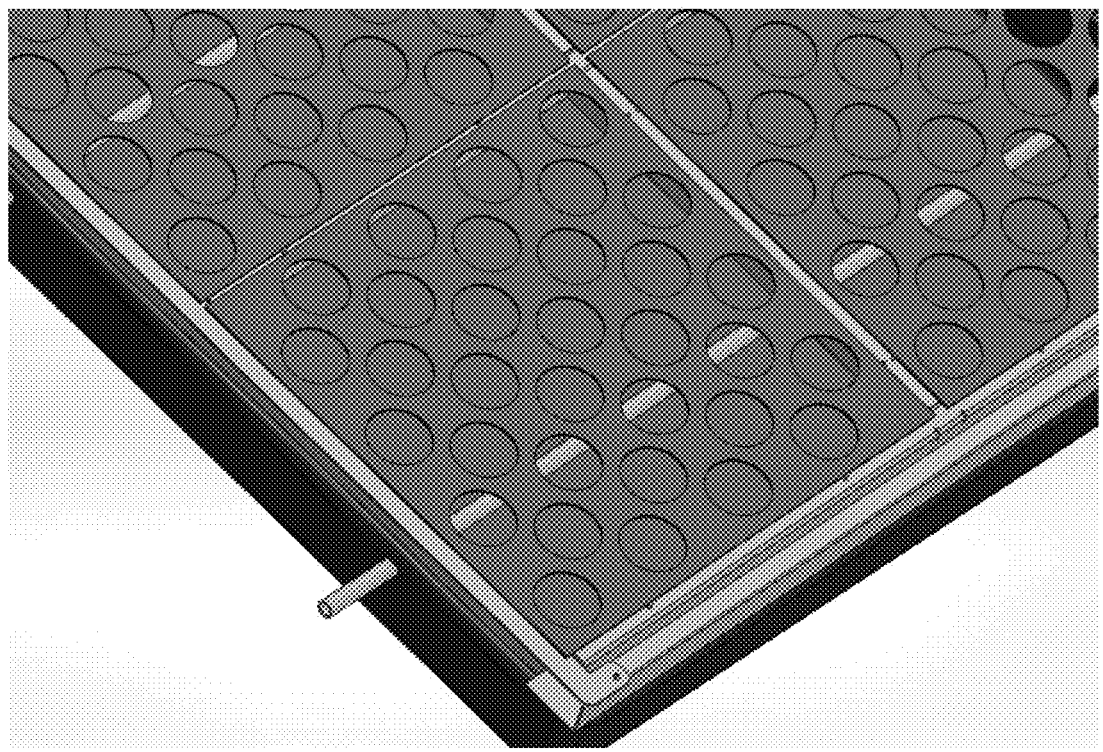
FIG. 33B provides a detailed view of one corner of the embodiment shown in FIG. 20A.
Figure 33C:
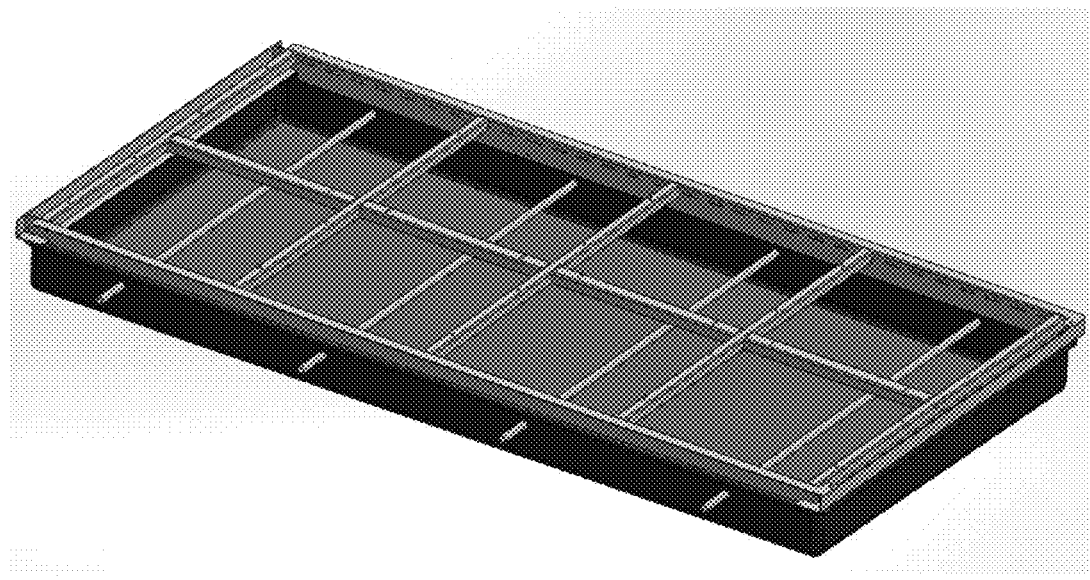
FIG. 33C provides a detailed view of the illustrative embodiment of a growing tray with the spacing member removed for clarity.

FIGS. 33A-33C provide various view of another illustrative embodiment for a growing tray, wherein the growing tray may be configured for use in a generally horizontal arrangement. An insert having a plurality of circular apertures may be supported by a base, which base is shown in FIG. 33C. In such an embodiment of a growing tray, nozzles 220 may be positioned along feed tubes positioned within the base, as shown in FIG. 33C, such that the nozzles 220 may be below the insert having circular apertures. The feed tube may be configured to oscillate as previously described for other embodiments of a delivery arrangement such that one nozzle 220 may provide nutrient supply to a plurality of plants 22. Any delivery arrangement 16 suitable for the particular application of the growing tray may be used without limitation, including but not limited to the atomizing air/liquid delivery arrangements 16 disclosed herein.

The irrigation system 10 of the according to the present disclosure may be provided with a recycling arrangement (as mentioned above in regards to various illustrative embodiments of a framework 12 or support frame 500) that captures nutrient supply that has not been used by a plant and which might otherwise be discarded or wasted. The recycling arrangement may include elements such as a collector 320, a gutter, a sloped floor and a sump. Additionally, the recycling arrangement may include various purification steps. For example, in an illustrative embodiment, the recycling arrangement may include various particulate filters of various sizes through which collected nutrient supply may be circulated. Additionally, a UV light or other pathogen mitigation device may be included in the recycling arrangement to ensure pathogens are not present within the irrigation system 10. The recycling arrangement may also include a heat exchanger through which nutrient supply may pass. The heat exchanger may either extract heat from or add heat to the nutrient supply for optimal plant growth, which will depend at least upon the type of crop/plant. In some embodiments, one or more collectors 320 may be positioned below rails 100 of a framework 12. In an illustrative embodiment, a collector 320 may have opposing sides that define a width, which width may be greater than a width defined by rails 100 of a framework 12, and a length that may be approximately equal to a length defined by adjacent sub-frames 34. The collector 320, which may be formed from waterproof material, may be may engaged with the rails 100 of a framework 12 so that it is able to capture nutrient supply that may fall down from within chamber C and from the delivery arrangement 16.

One end of the collector 320 may be positioned so that it is higher than the other end of the collector (i.e., angled with respect to the horizontal) so that captured nutrient supply may be directed toward a desired location. In an illustrative embodiment, captured material is directed towards the reservoir 180 of the delivery arrangement 16. A collector 320 may be removably engaged with rails 100 of a framework 12 by any suitable fastener including but not limited to resilient clip 321, hook-and-loop fasteners, clips, wire, string, cable ties, etc. (see FIG. 8). The rails 100 of a framework 12 may also form part of a recycling arrangement. As previously mentioned, the rails 100 of a framework 12 may include upwardly opening slots 108 that may receive bottom members 256, 286 of one or more frames 250, 280. The slots 108 may act as gutters that may receive and capture nutrient supply that may trickle down from the holders 272, 302 of the plant stand 18 and plant 22 themselves. Once the nutrient supply makes its way to a slot 108, it may be directed to a desired location by providing the slot 108 with a slight incline. In some embodiments, a slot 108 may be provided with two inclines so as to form a low point that may be generally centrally located along a rail 100.

The optimal recycling arrangement will depend on several factors, including but not limited to the configuration of the framework 12 and/or support frame 500. In one embodiment of a recycling arrangement that is contemplated may be especially useful with the configuration shown in FIG. 23 may use a central reservoir 180 for nutrient supply. Excess nutrient supply may simply drain via gravity to this central reservoir 180 from which it may be treated and/or recycled for further use.

The irrigation system 10 may be used to cultivate plants 22 according to any associated method. Initially, a plant 22 may germinated from a seed. After a period of initial growth, it may be transferred to a holder 272, 302, 340 which may already be engaged with a frame 250, 280 or which may be engaged with the frame 250, 280 after the plant 22 has been transferred. These steps may be repeated until a frame 250, 280 has been filled with plants 22. The steps may be repeated again until a second frame 250, 280 is also filled with plants 22. The two frames 250, 280 may then be engaged with each other at their top ends to form an A-frame plant stand 18. The plant stand 18 may then be moved to a framework 12 and oriented so that the bottom sides of the plant stand 18 are engaged by rails 100 of the framework 12. The sides and top of the plant stand 18 may be provided with panels and a cap to effectively close off a chamber C formed by the frames 250, 280. Alternatively, only the outer plant stands 18 may be provided with a panel on their respective exterior side. The delivery arrangement may 16 then be activated. If there is only one plant stand 18, the carriage 14 or carriage assembly 15 may remain stationary. Alternatively, the carriage 14 or carriage assembly 15 may be energized via a drive assembly 160.

Figure 16:
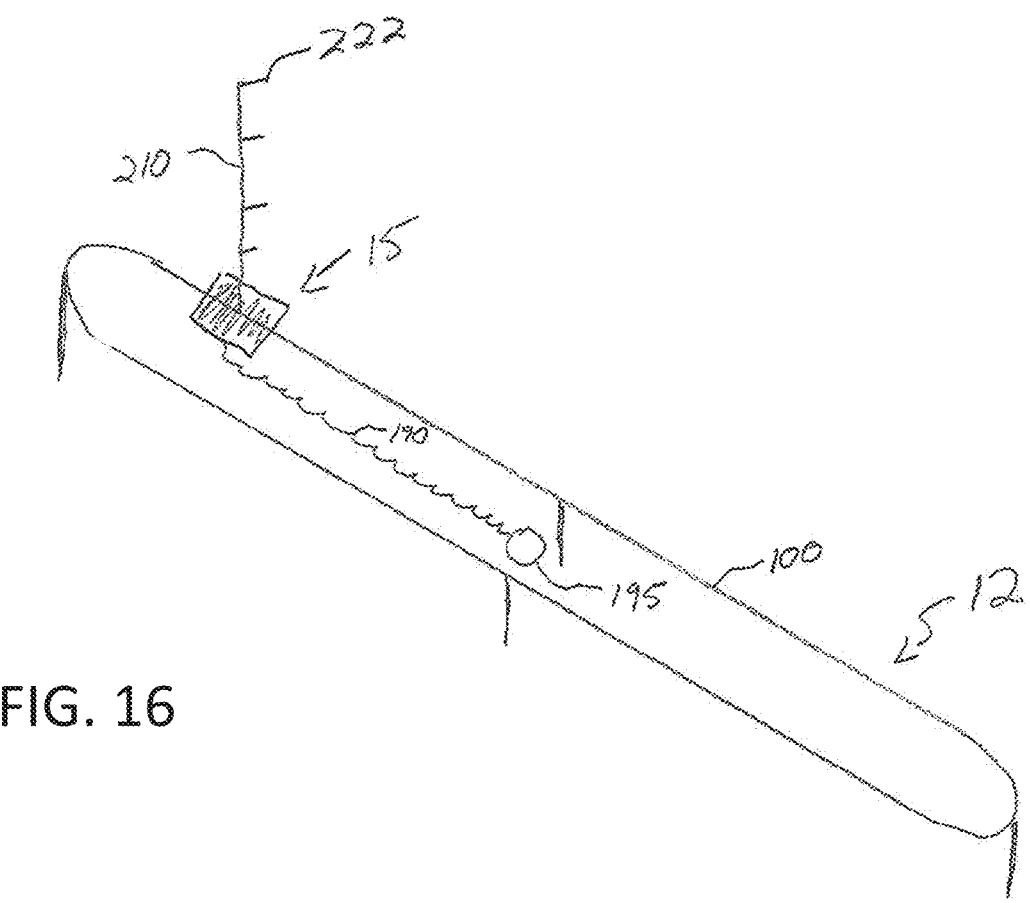
FIG. 16 is a schematic view of another illustrative embodiment of a carriage assembly and framework.
Figure 16A:
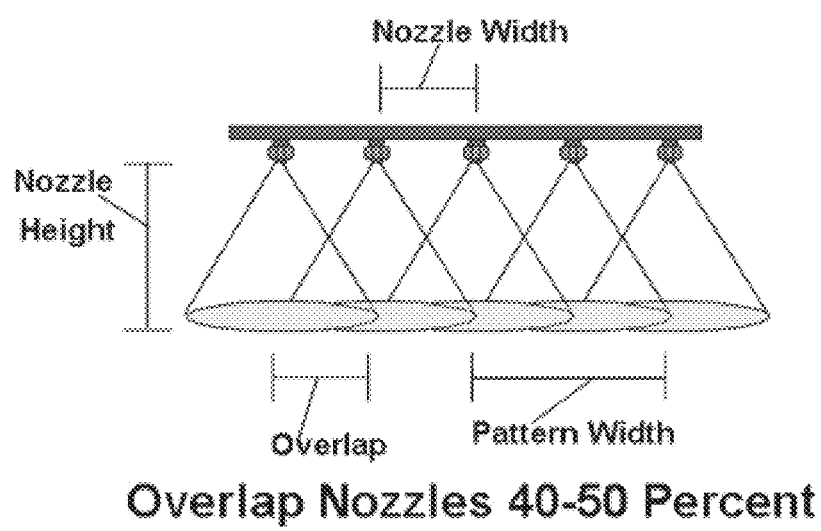
FIG. 16A is a schematic view of an illustrative embodiment of how one embodiment of a nozzle could be arranged for a specific amount of overlap.

Another illustrative embodiment of an irrigation system 10 is shown in FIG. 16. The framework 12 for this embodiment may include a single rail 100 around which a carriage assembly 15 may travel. The carriage assembly 15 may be equipped with a motive source to provide energy to motive members positioned on the carriage assembly (e.g., powered sprockets, wheels, etc.) to allow the carriage assembly 15 to selectively move along the rail 100. Alternatively, a chain, belt, or other flexible member may be positioned along the rail 100 and engaged with a motive source such that the flexible member may move along the rail 100. The carriage assembly 15 may be engaged with that flexible member such that movement of the flexible member causes movement of the carriage assembly 15.

In the embodiment shown in FIG. 16, it is contemplated that one or more branches 210 may be engaged with the carriage assembly 15 to be moveable therewith. Coiled or otherwise self-retracting supply line 190 may be in fluid communication with the branch 210 and a rotary connector 195. The rotary connector 195 may be configured to provide a water-tight and/or air-tight seal between the supply line 190 and the rotary connector 195 even as the supply line 190 rotates 360 degrees around the rotary connector 195. The rotary connector 195 may be in fluid communication with a pump 184 and/or booster pump 188 as described for previous embodiments of the irrigation system 10. It is contemplated that in such a configuration, the flow of nutrient supply through the nozzles 220 may be continuous, as may be the movement of the carriage assembly 15. Accordingly, the embodiment shown in FIG. 16 may be configured such that nutrient supply always flows through the nozzles 220 and the proper delivery to roots 26 is ensured via the nutrient supply flow rate through the nozzles 220 and the speed at which the carriage assembly 15 traverses the rail 100.

The irrigation system 10 as disclosed and claimed herein may extend to any irrigation system 10 having moveable nutrient supply ports. The optimal number, dimensions, geometries, relative placement, shapes, and/or configuration of the various elements of the framework 12, carriage 14, carriage assembly 15, delivery arrangement 16, plant stand 18, and/or holder 272, 302 will vary from one embodiment of the irrigation system 10 to the next, and are therefore in no way limiting to the scope thereof. The various elements of an apparatus using at least one feature of the present disclosure may be formed of any material that is suitable for the application for which the apparatus is used. Such materials include but are not limited to metals and their metal alloys, polymeric materials, and/or combinations thereof.

Illustrative Embodiment of a Lighting Fixture

Figure 18A:
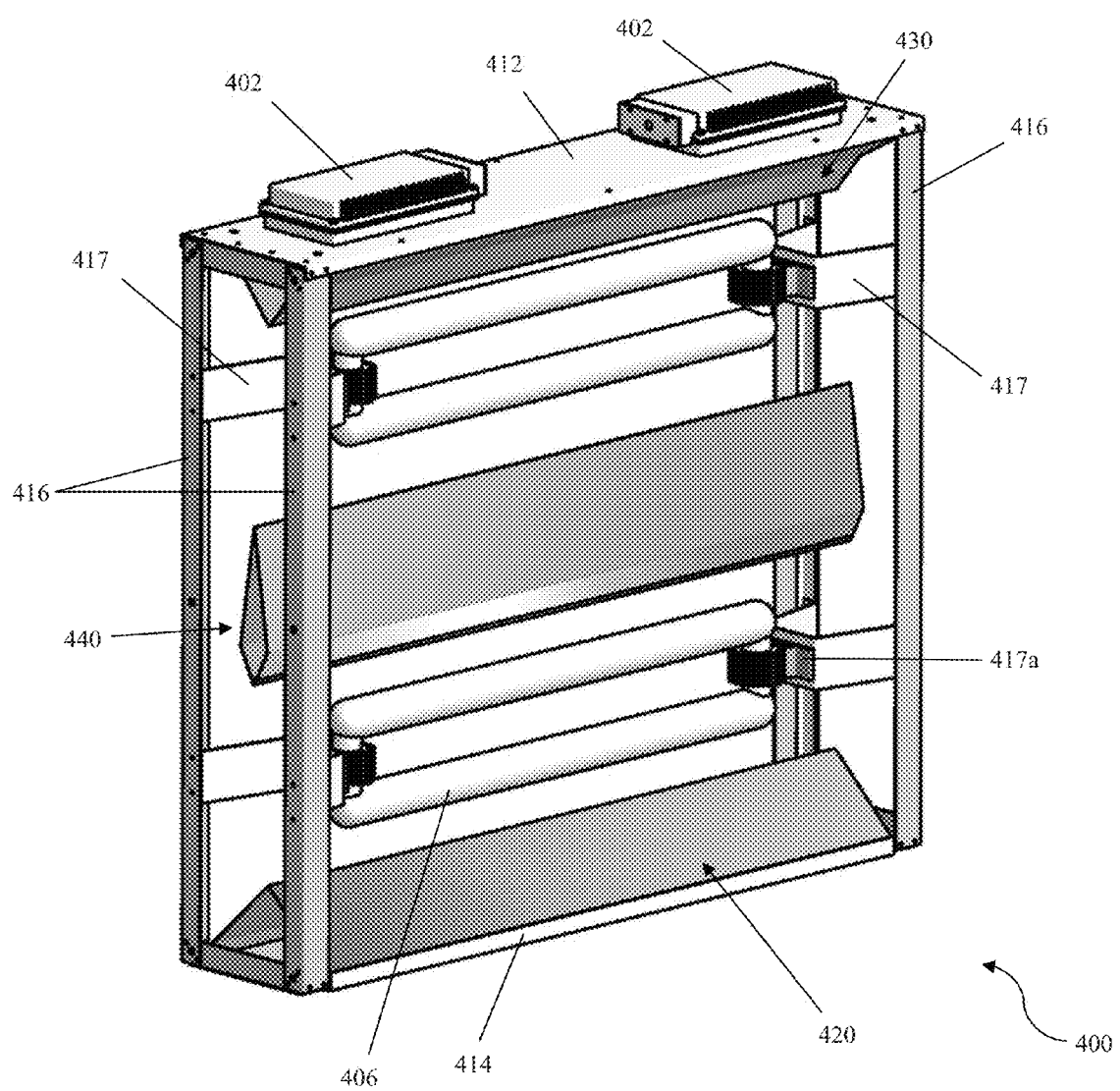
FIG. 18A is a perspective view of an illustrative embodiment of a lighting fixture that may be used with certain features of the present disclosure.

A perspective view of an illustrative embodiment of a lighting fixture 400 is shown in FIG. 18A. The illustrative embodiment may include a case 410 having a case top 412 and a case bottom 414 spaced apart from one another by a plurality of case posts 416. The illustrative embodiment may include four case posts 416, but the number thereof is in no way limiting to the scope of the present disclosure. One or more supports 417 may be engaged with adjacent posts at opposite ends. The illustrative embodiment may include four supports 417, but the number thereof is in no way limiting to the scope of the present disclosure. Each support 417 may be formed with a receiver 417a thereon to engage a light source 406. The light source 406 may be any type of light source suitable for the particular application of the lighting fixture 400, including but not limited to LEDs, organic LEDs, incandescent lights, fluorescent lights, inductance lights, UV lights, and/or combinations thereof. One or more power sources 402, which may include circuitry to control the electricity flow to the light source 406, may be positioned on the case 410. In the illustrative embodiment pictured herein, the light source 406 is comprised of four generally horizontally oriented tubes, but the configuration, number, orientation, etc. of the slight source will vary from one embodiment to the next, and is therefore in no way limiting to the scope of the present disclosure.

A bottom reflector 420, a top reflector 430, and a center reflector 440 may be positioned in and mounted to the case 410 at various positions. Typically, the center reflector 440 may be mounted to the case side panels, which are not shown for purposes of clarity. The bottom reflector 420 may be mounted to the case bottom 414 adjacent the bottom reflector base 422 and the top reflector 430 may be mounted to the case top 412 adjacent the top reflector base 432. Transparent windows may be positioned over each side of the case 410 that may be oriented to face a plant stand as shown in FIG. 18C. The window may serve to prevent contaminants or other material from ingress or egress to the case 410

Figure 18B:
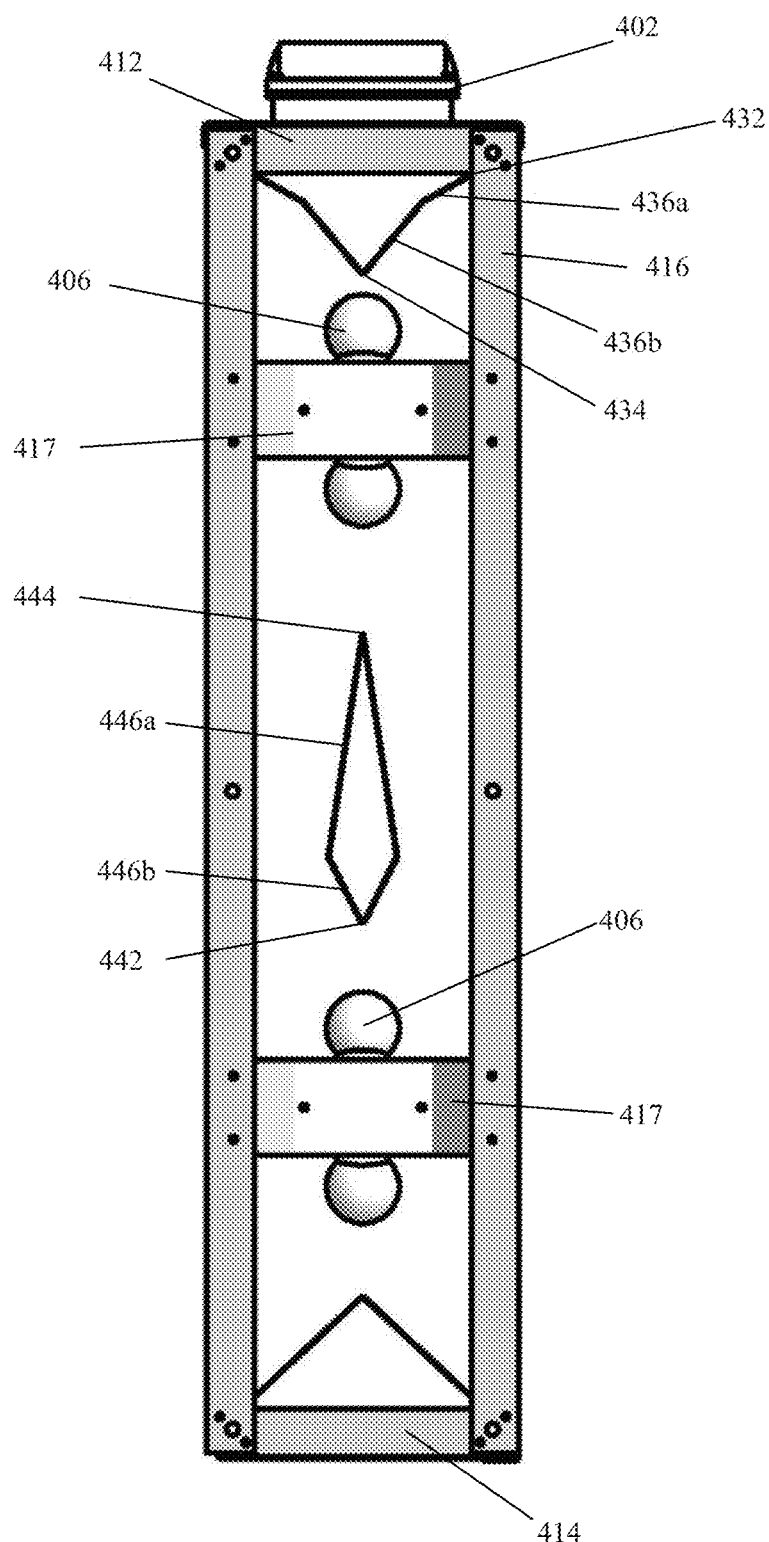
FIG. 18B is a side view of the embodiment of a lighting fixture shown in FIG. 18A.
Figure 18C:
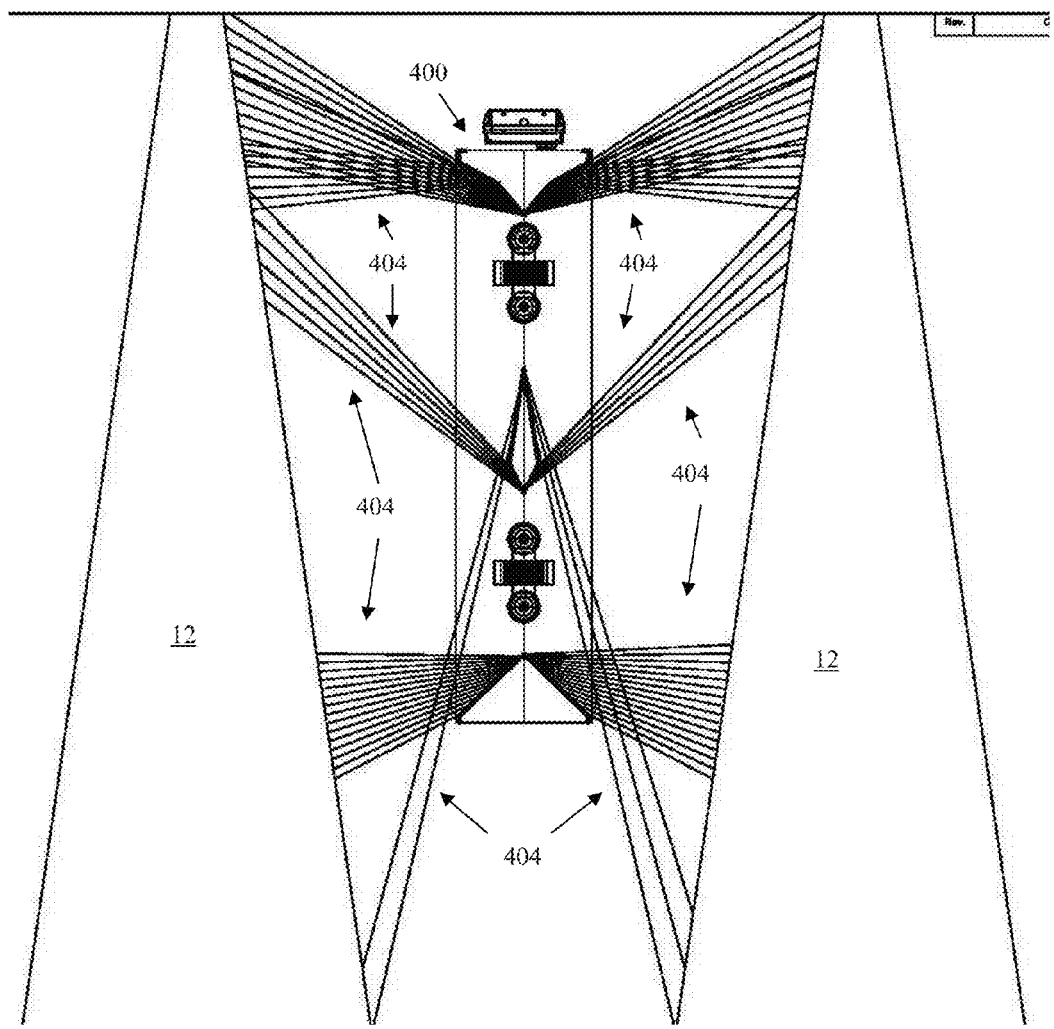
FIG. 18C is a side view of the embodiment of a lighting fixture shown in FIGS. 18A & 18B positioned between two adjacent plant stands.

Each reflector 420, 430, 440 may be symmetrical along the height of the lighting fixture 400 as shown in FIG. 18B. The bottom reflector 420 may include a bottom reflector peak 424 about which two bottom reflector surfaces 426 may be symmetrically opposed. The top reflector may include a top reflector peak 434 about which two top reflector first and second surfaces 436a, 436b may be symmetrically opposed. The angle of the bottom and top reflector peaks 424, 434 formed by the bottom reflector surfaces 426 and top reflector first and second surfaces 436a, 436b may be configured so that the bottom reflector surface 426 and the top reflector first and second surfaces 436a, 436b reflect energy from the light source toward a plant stand 18 along a predetermined light path 404, as shown in FIG. 18C.

The center reflector 440 may include a center lower intersection 442 and a center reflector peak 444 about which center reflector first and second surfaces 446a, 446b may be symmetrically opposed. The angle of the center reflector peak 444 and center lower intersection 442 formed by the first and second surfaces 446a, 446b may be configured so that the center reflector first and second surfaces 446a, 446b reflect energy from the light source toward a plant stand 18 along a predetermined light path 404, as shown in FIG. 18C.

The illustrative embodiment of a lighting fixture 400 is shown positioned between two adjacent plant stands 18 in FIG. 18C. From FIG. 18C, it will be apparent that the distance between the lighting fixture 400 and the exterior surface of the plant stand 18 may vary along the height of the plant stand 18 due to the angle of the frames 250, 280. Accordingly, it may be desirable to adjust the lighting fixture 400 to deliver different amounts of energy to the plant stand 18 at different heights thereon. For example, because the lighting fixture 400 is in closer proximity to the bottom portion of the plant stand 18, it may be desirable for the lighting fixture 400 to delivery less energy to that portion of the plant stand 18. The light paths 404 created by the bottom reflector surface 426, top reflector first and second surface 436a, 436, and center reflector first and second surfaces 446a, 446b are clearly shown in FIG. 18C for the illustrative embodiment of the lighting fixture 400. In other embodiments, different angles for the bottom reflector surface 426, top reflector first and second surfaces 436a, 436b, and/or center reflector first and second surfaces 446a, 446b may be used without limiting the scope of the present disclosure. The reflective surfaces of the bottom, top, and center reflectors 420, 430, 400 may be formed of any material suitable for the particular application of the light fixture 400, including but not limited to glass mirrors, foil mirrors, myro, and/or combinations thereof without limitation. Oftentimes it may be desirable to adjust the various surfaces of the reflectors 420, 430, 440 to such that the light emanating from the light fixture 400 is uniform for a predetermined area at a predetermined distance from the lighting fixture 400.

The case 410 may be formed with fittings on the side panels (not shown) to allow the interior of the case 410 to be in fluid communication with an HVAC 408, associated ductwork, or other fluid handling members. In on illustrative embodiment, the light source 406 creates a large amount of excess heat energy, such that providing cooled air to the interior of the case 410 increases the efficacy of the lighting fixture 40 for the particular application thereof. In another illustrative embodiment, providing heated air achieves similar results.

Figure 19:
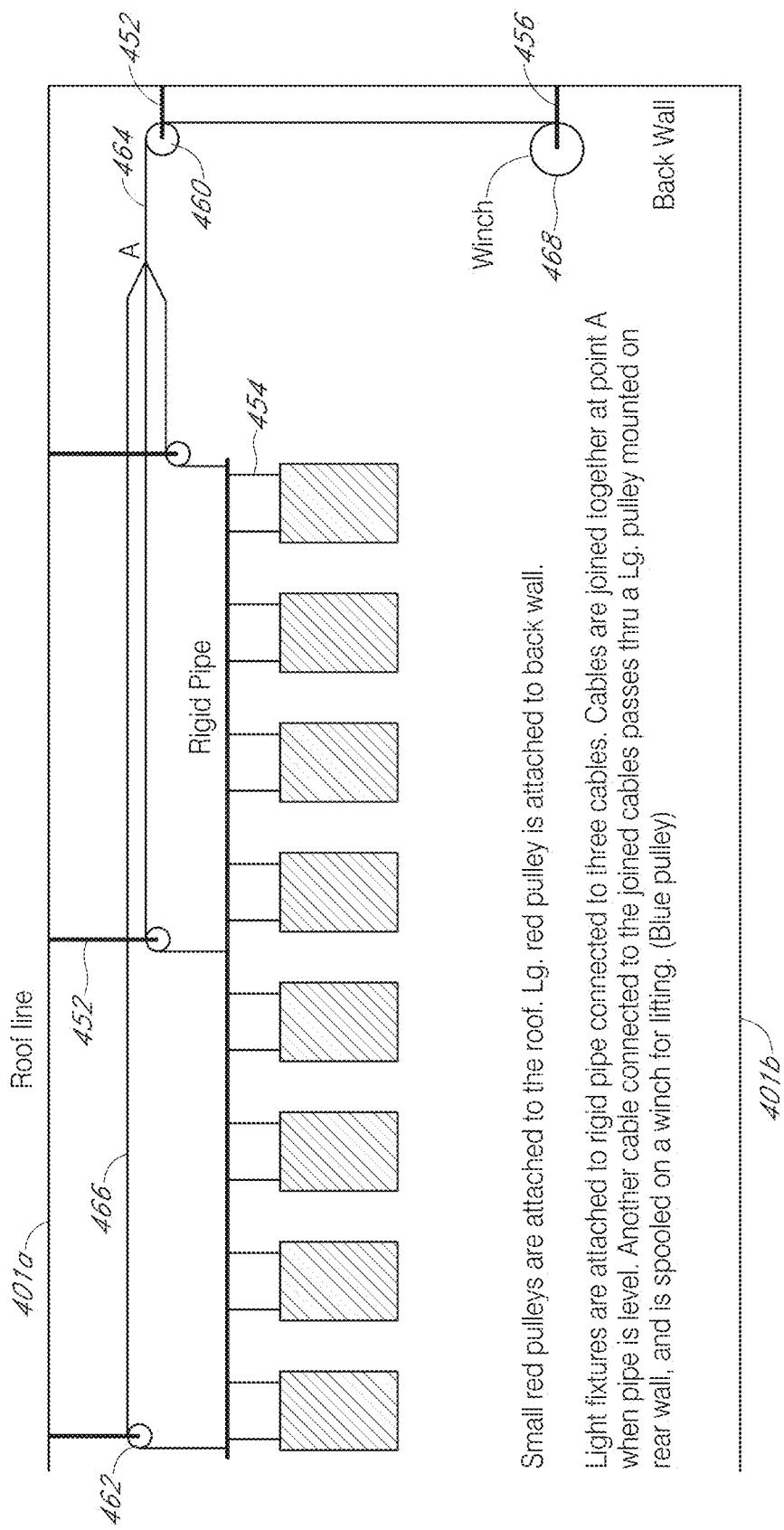
FIG. 19 is a schematic view of an illustrative embodiment of how a plurality of lighting fixtures may be employed in a controlled environment in accordance with certain features of the present disclosure.

An illustrative embodiment of how a plurality of lighting fixtures 400 may be employed in a controlled environment is show schematically in FIG. 19. Such an arrangement may be employed with other lighting fixtures 400, including but not limited to that shown in FIG. 29, so as to also affect at least some aspects of the position of an air system 550. One or more lighting fixtures 400 may be engaged with a lateral support 450 via one or more fixture connectors 454. The lateral support may be engaged with one or more ancillary cables 466 at various positions along the length thereof. One or more ancillary pulleys 462 may be engaged with one or more pulley supports 452, which may be mounted on the roof surface 401a. The ancillary pulleys 462 may serve to translate the direction of the ancillary cable 466 from a generally vertical direction to a generally horizontal direction. The ancillary cables 466 may interface with the ancillary pulleys 462, and be engaged with a main cable 464. The main cable 464 may interface with a main pulley 460 engaged with a pulley support 452 mounted on the back wall. The main pulley 460 may serve to translate the direction of the main cable 464 from a generally horizontal direction to a generally vertical direction.

One terminal end of the main cable 464 may be engaged with a winch 468, which may be engaged with a winch support 456, which may be mounted to the floor surface 401b or a back wall. The winch 468 may be sized and otherwise configured to operatively wind and unwind the main cable 464, thereby lowering or raising the lighting fixtures 400 with respect to the floor surface 401b.

Figure 34A:
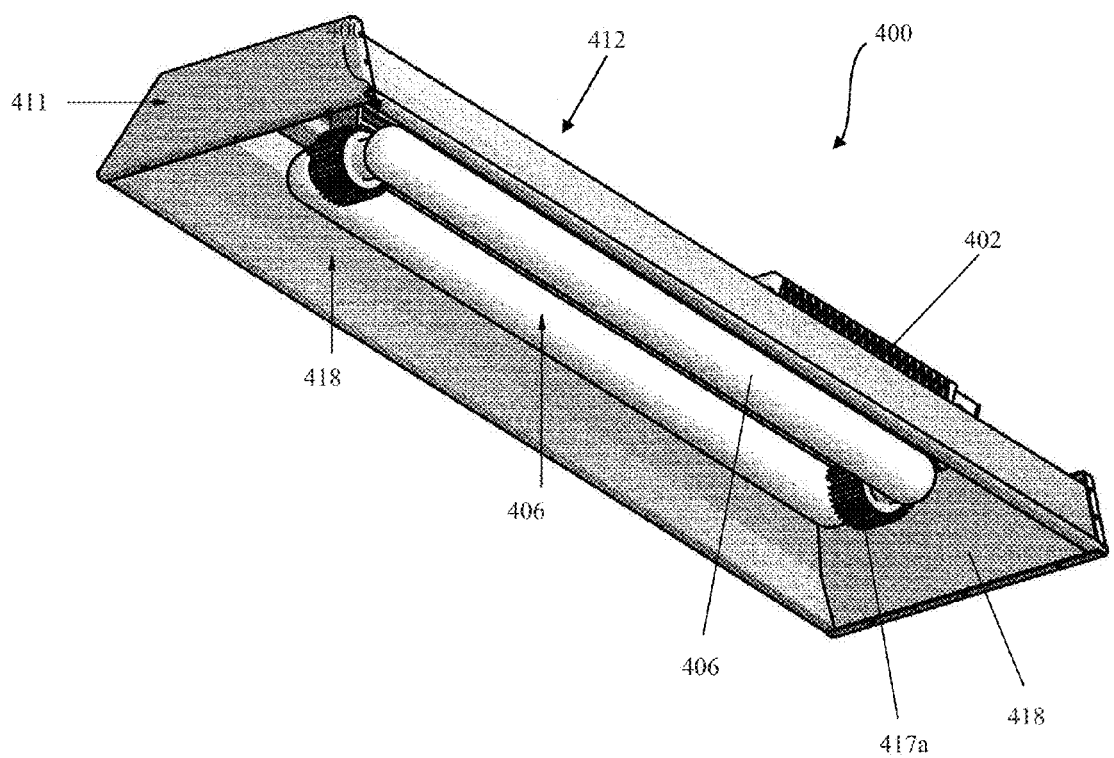
FIG. 34A provides a perspective view of another embodiment of a lighting fixture.
Figure 34B:
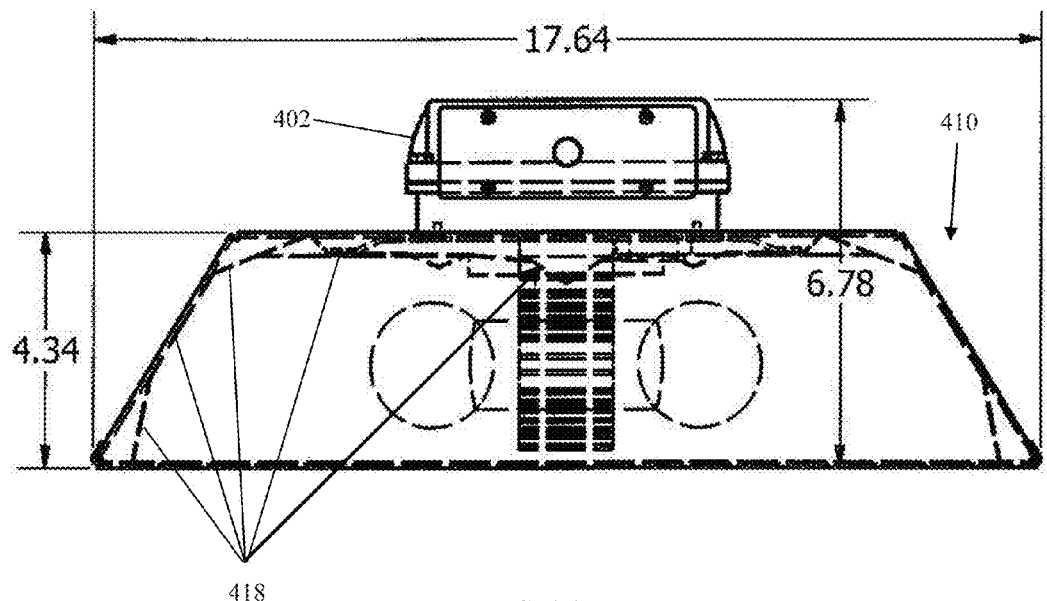
FIG. 34B provides a cross-sectional side view of the embodiment of a lighting fixture shown in FIG. 34A along the width thereof.
Figure 34C:
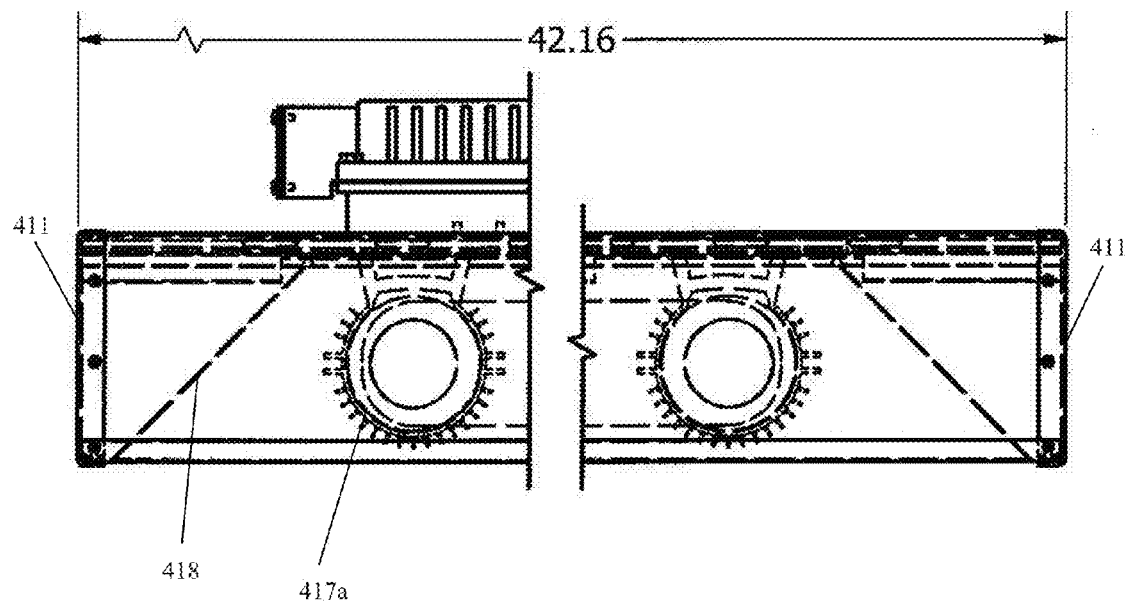
FIG. 34C provides a cross-sectional side view of the embodiment of a lighting fixture shown in FIG. 34A along the length thereof.

Another illustrative embodiment of a lighting fixture 400 is shown in FIGS. 34A-34C. In this embodiment, two light sources 406 may be used, which light sources 406 may be energized by a single power source 402 or by separate power sources 402. The embodiment shown in FIG. 34A may have a case 410 that is configured with one or more case reflective surfaces 418 on the interior portion thereof. The interior portions of the end panels 411 may be configured as a case reflective surface 418. Additionally, the interior portions of the case top 412 may extend downward over a portion of the light source(s) 406 and be configured as a case reflective surface 418. Although not shown, this embodiment of a lighting fixture 400 may be configured with a center reflector generally positioned between the two longitudinal lights sources 406. All case reflective surfaces 418 and any center reflectors 440 may be configured so that the maximum amount of light is reflected directly outward from the lighting fixture 400 about a specific area adjacent to the lighting fixture 400.

A cross-sectional view of the embodiment of a lighting fixture 400 about the width thereof is shown in FIG. 34B. As shown in FIG. 34B, this embodiment of a lighting fixture 400 may be configured with five discrete case reflective surfaces 418 on either side of the longitudinal centerline of the lighting fixture 400 (for a total of ten across the width of the lighting fixture 400), wherein each case reflective surface 418 may be angled with respect to adjacent case reflective surfaces 418. The various case reflective surfaces 418 formed across the width of the lighting fixture 400 may be integrated into the case top 412, or they may be constructed of a separate material and joined to the case top 412, without limitation. It is contemplated that the optimal configuration (e.g., number, angle, etc.) of the case reflective surfaces 418 will vary from one application of the lighting fixture 400 to the next, and accordingly, the scope of the present disclosure is not limited by the specific configuration thereof. However, it is contemplated that most applications will benefit from a configuration of case reflective surfaces 418 that directs as much photon energy as possible downward and away from the lighting fixture 400.

A cross-sectional view of the embodiment of a lighting fixture 400 about the length thereof is shown in FIG. 34C. As shown in FIG. 34C, this embodiment of a lighting fixture 400 may be configured with a case reflective surface 418 adjacent either end panel 411 of the lighting fixture 400. Again, the that the optimal configuration (e.g., number, angle, etc.) of the case reflective surfaces 418 will vary from one application of the lighting fixture 400 to the next, and accordingly, the scope of the present disclosure is not limited by the specific configuration thereof. However, it is contemplated that most applications will benefit from a configuration of case reflective surfaces 418 that directs as much photon energy as possible downward and away from the lighting fixture 400. Furthermore, although illustrative dimensions are shown in FIGS. 34B & 34C, those dimensions are for illustrative purposes only and not limiting to the scope of the present disclosure in any way.

Illustrative Embodiment of a Controlled Environment and Method

Figure 35A:
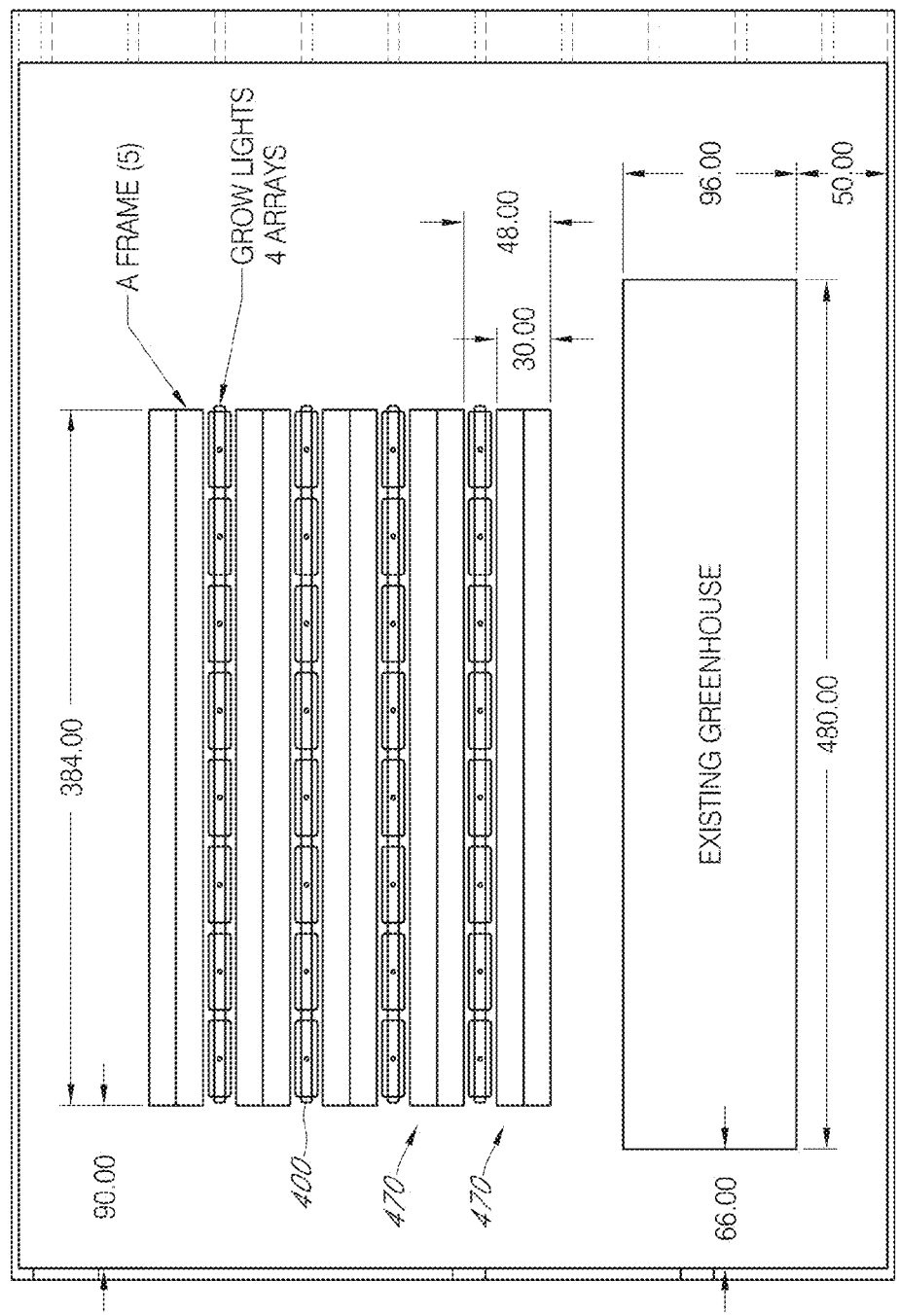
FIG. 35A provides a schematic view of an illustrative embodiment of a floor plan that may be used with an illustrative embodiment of a controlled environment.
Figure 35B:
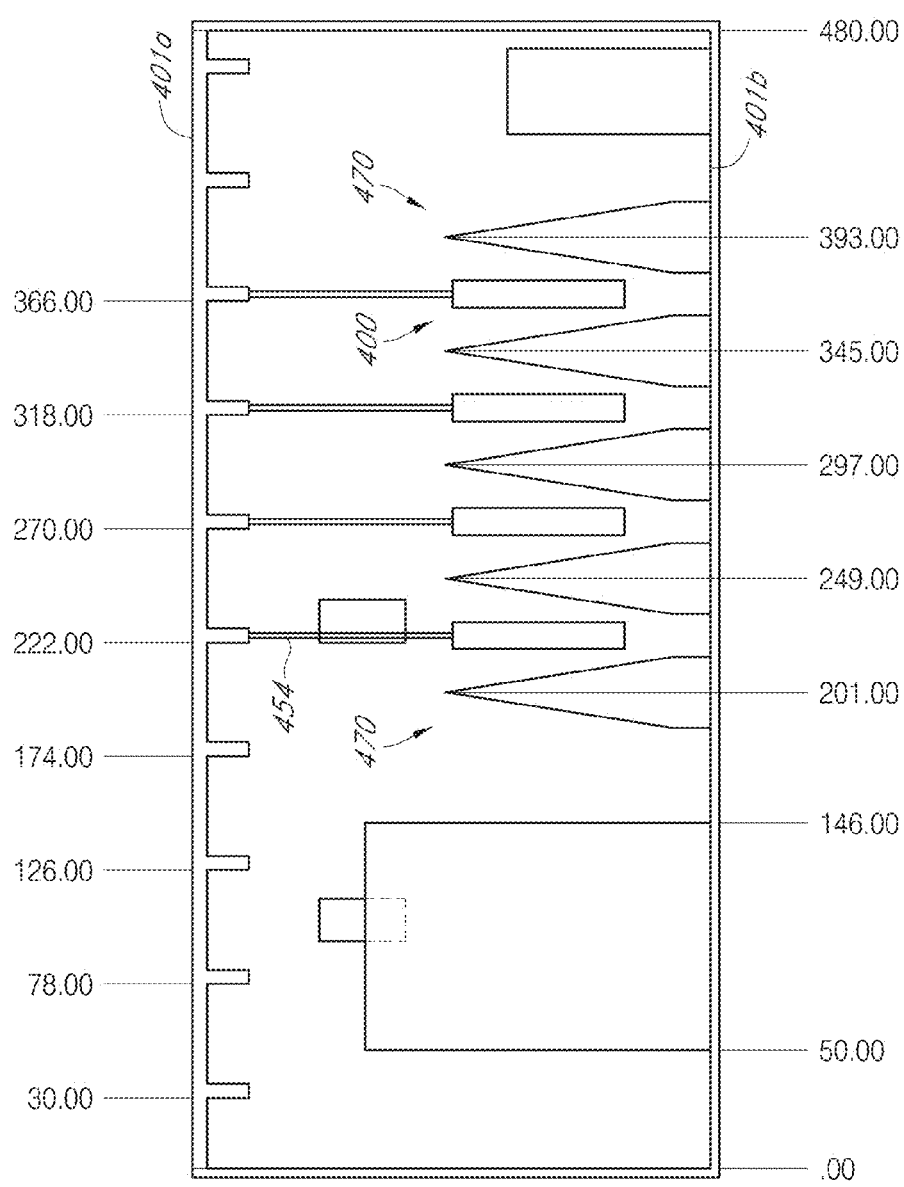
FIG. 35B provides a schematic view of the embodiment shown in FIG. 26A as viewed from the side.
Figure 35C:
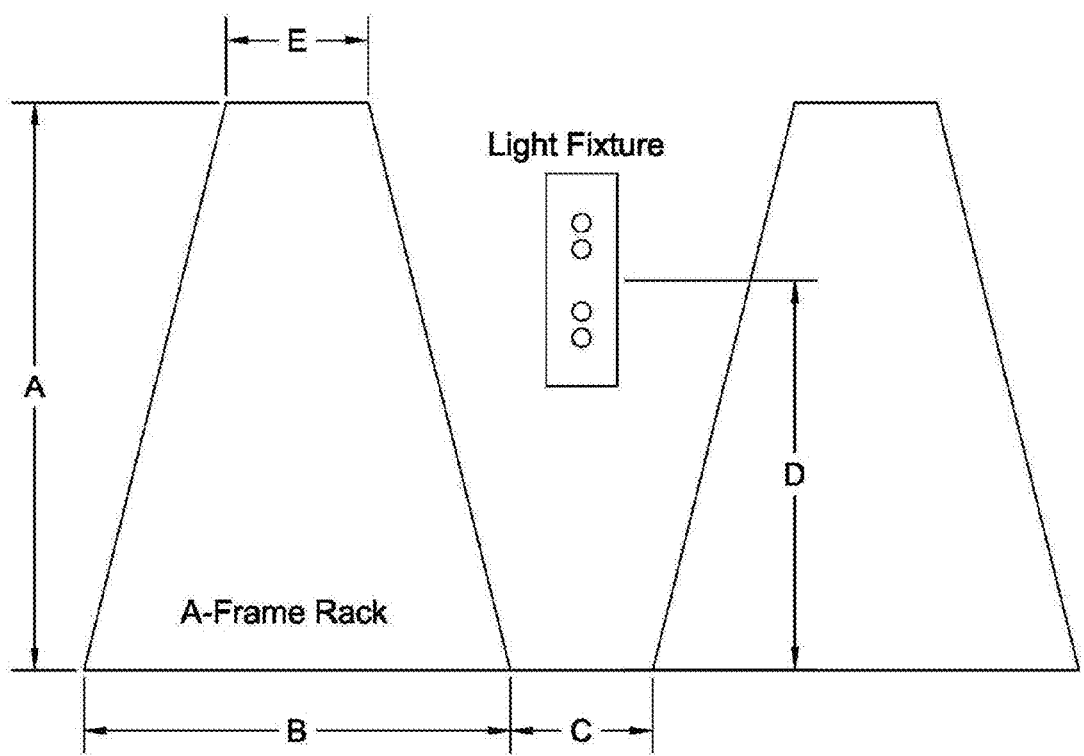
FIG. 35C provides a schematic view of another embodiment of a row and lighting fixture arrangement.

Having described several illustrative embodiments of various apparatuses that are preferred in certain applications, an overall controlled environment and method for implementing certain illustrative embodiments of those apparatuses. A schematic of an illustrative embodiment of a floor plan for use with the illustrative embodiment of a controlled environment is shown in FIG. 35A, and a side view is shown in FIG. 35B. FIGS. 35A & 35B provide illustrative dimensions, which are shown in inches, which are not limiting to the scope of the present disclosure in any manner. It is contemplated that any suitable location for a building providing a controlled environment may be used in accordance with the present disclosure without limitation. In one embodiment it may be especially advantageous and/or efficient to locate a building housing the controlled environment adjacent an ethanol refinery, power plant, or other operation that may have unused waste energy, nutrients, and/or water.

The illustrative embodiment of the controlled environment and method may include a plurality of rows 470, which may be arranged in a parallel fashion as shown in FIGS. 35A & 35B. It is contemplated that the rows 470 may be oriented in a north-south fashion. Such an orientation may be especially desirable if a portion of the roof of the structure in which the controlled environment is positioned is transparent. The rows 470 may be comprised of a plurality of plant stands 18 positioned on a framework 12 as disclosed herein previously, or they may be comprised of some other partially vertically oriented plant support structure. Lighting fixtures 400 may be arranged between adjacent rows 470, which lighting fixtures 400 may be configured as any of the embodiments disclosed herein, or which may be other types of lighting fixtures. The lighting fixtures may be suspended from above the floor surface 401b, and the height of the lighting fixtures may be adjustable as described in detail above.

A green house may be positioned adjacent one of the end rows 470. The green house may be used to germinate seeds and/or otherwise prepare plants for growth in the rows 470. As described in detail above, this germination and/or preparation may involve several steps, which may include some sort of media (e.g., synthetic fibers, etc.). In an alternative embodiment, seed strings may be used in accordance with the present disclosure, wherein seeds may be embedded in a string medium, which medium may provide the required support of an insert as described in detail above, and which medium may also act as a suitable bedding material for desired plant/crop growth, also as described in detail above. It is contemplated that most applications would require a string medium (e.g., organic twine, coco twine, jute twine, etc.) that retains a specific amount of moisture per volume of material, provides aeration, and which could be treated with germination hormones and/or other materials desirable for the particular application. In such an embodiment, it is contemplated that seeds may be embedded in the string medium between fibers thereof. In a similar embodiment, the seeds may be embedded or engaged with a length of tape (such as Burpe brand seed tape) that may acts as a bedding material for certain plants/crops.

The environment of the greenhouse may be controlled independent of the environment of the controlled environment in which the rows 470 and/or lighting fixtures 400 are positioned. Additionally, the environment within the controlled environment may be adjusted for optimal growing conditions for a given plant/crop. For example, the air temperature may be adjusted using an HVAC 408 system, the humidity may also be adjusted, and the level of carbon dioxide within the atmosphere in the controlled environment may be adjusted. Windows (not shown) may be fitted in the roof (as previously mentioned for a north-south orientation of rows 470) to increase the amount of light energy entering the controlled environment at certain times of day with certain weather conditions. The windows may be outfitted with shutters and/or reflectors to ensure that light from the lighting fixtures 400 does not escape the controlled environment through the windows.

Once the plants/crop is ready for harvest, the plant stands 18 may be rolled off the rails 100. The plant stands 18 may be disassembled so that each plant stand 18 represents two frames 250, 280, or they may simply be folded out flat so that the bottom members 256, 286 are positioned opposite one another. At this point, the plant stand 18 and/or frames 250, 280 may be moved to a harvest table (not shown). The harvest table may have various bars strategically spaced to engage the underside of the tray and/or the downwardly extending leg so that when the plant stand 18 and/or frames 250, 280 are laid flat on the harvest table, the plants are oriented upright to facilitate harvest. After the plants/crop has been harvested, the inserts may be removed from the tray and the growing process again initiated.

Although the descriptions of the illustrative embodiments have been quite specific, it is contemplated that various modifications could be made without deviating from the spirit and scope of the present disclosure. Accordingly, the scope of the present disclosure is not limited by the description of the illustrative embodiments.

The number, configuration, dimensions, geometries, and/or relative locations of the various elements of the framework 12, carriage 14, carriage assembly 15, delivery arrangement 16, plant stand 18, holder 272, 302, trays 340, and/or inserts 380 will vary from one embodiment of the irrigation system 10 to the next, as will the optimal configuration thereof. Accordingly, the irrigation system 10 as disclosed and claimed herein is in no way limited by the specific constraints of those elements. Additionally, the number, placement, configuration, relative positions, geometries, and/or orientations of rows 470, lights, and/or the various operating conditions of a controlled environment will vary from one embodiment thereof to the next, and are therefore in no way limiting to the scope thereof.

In the foregoing detailed description, various features are grouped together in a single embodiment for purposes of streamlining the disclosure. This method of disclosure is not to be interpreted as reflecting an intention that the present disclosure requires more features than are expressly recited in each claim. Rather, as the following claims reflect, inventive aspects lie in less than all features of a single foregoing disclosed embodiment. Thus, the following claims are hereby incorporated into this detailed description, with each claim standing on its own as a separate embodiment of the invention.

Having described the preferred embodiments, other features, advantages, and/or efficiencies of the present disclosure will undoubtedly occur to those versed in the art, as will numerous modifications and alterations of the disclosed embodiments and methods, all of which may be achieved without departing from the spirit and scope of the present disclosure as disclosed and claimed herein. It should be noted that the present disclosure is not limited to the specific embodiments pictured and described herein, but are intended to apply to all similar apparatuses for applying nutrient supply to a relatively high number of plants with a relatively low number of nozzles. Modifications and alterations from the described embodiments will occur to those skilled in the art without departure from the spirit and scope of the present disclosure.

The invention claimed is:

1. A support frame for use in a controlled environment comprising:
   a. a first base member extending upward from a floor, wherein said floor engages and supports said first base member;
   b. a second base member extending upward from said floor, wherein said floor engages and supports said second base member;
   c. a first rail having a first end and a second end separated by a length of said first rail, wherein said first end of said first rail engages a first end of said first base member, and wherein said second end of said first rail engages a first end of said second base member, and wherein said first and second base members elevate said first rail above said floor;
   d. a second rail having a first end and a second end separated by a length of said second rail, wherein said first end of said second rail engages a second end of said first base member, and wherein said second end of said second rail engages a second end of said second base member, wherein said first and second base members elevate said second rail above said floor, and wherein said first and second rails are parallel with respect to one another;
   e. a secondary frame positioned between and engaged with said first and second rails, wherein said secondary frame is moveable with respect to said rails along the length of said first and second rails;
   f. a pan engaged with said first and second rails, wherein said pan is positioned between said first and second rails and extends from said first rail to said second rail, wherein said pan extends along the entire length of said first and second rails, wherein said pan is positioned below said secondary frame, and wherein said pan is positioned above said floor;
   g. a branch engaged with said secondary frame and extending upward therefrom;
   h. a plurality of nozzles positioned on said branch; and
   i. a plant stand for supporting a plant positioned over said first and second rails, wherein a bottom portion of said plant stand engages the first and second rails, wherein said first and second rails elevate said plant stand above said floor.

2. The support frame according to claim 1 wherein said plant stand is configured and arranged to support a plurality of plants in a vertically angled manner, and wherein said first and second base members support said plant stand.

3. The support frame according to claim 2 wherein said plant stand defines a chamber into which plant root extends, and wherein said secondary frame is positioned in said chamber.

4. The support frame according to claim 3 further comprising a drive assembly, wherein said drive assembly is configured and arranged to move said secondary frame between a first position at a first terminal end of said first and second rails and a second position at a second terminal end of said first and second rails.

5. A support frame for use in a controlled environment comprising:
   a. a first base member extending upward from a floor, wherein said floor engages and supports said first base member;
   b. a second base member extending upward from said floor, wherein said floor engages and supports said second base member;
   c. a first rail having a first end and a second end separated by a length of said first rail, wherein said first end of said first rail engages said first base member, and wherein said second end of said first rail engages said second base member, and wherein said first and second base members elevate said first rail above said floor;
   d. a second rail having a first end and a second end separated by a length of said second rail, wherein said first end of said second rail engages said first base member, and wherein said second end of said second rail engages said second base member, and wherein said first and second base members elevate said second rail above said floor, and wherein said first and second rails are parallel with respect to one another;
   e. a secondary frame positioned between and engaged with said first and second rails, wherein said secondary frame is moveable with respect to said rails along the length of said first and second rails;
   f. a pan engaged with said first and second rails, wherein said pan is positioned between said first and second rails and extends from said first rail to said second rail, wherein said pan extends along the entire length of said first and second rails, wherein said pan is positioned below said secondary frame, and wherein said pan is positioned above said floor;
   g. a branch engaged with said secondary frame and extending upward therefrom;
   h. a delivery arrangement comprising an intake portion and a discharge portion, wherein said discharge portion is operatively engaged with said secondary frame, and wherein said delivery arrangement is configured and arranged to provide a nutrient supply from said intake portion to said discharge portion;
   i. a plant stand for supporting a plant positioned over said first and second rails, wherein a bottom portion of said plant stand engages the first and second rails, wherein said first and second rails elevate said plant stand above said floor.

6. The support frame according to claim 5 wherein said plant stand is configured and arranged to support a plurality of plants in a vertically angled manner, and wherein said first and second base member supports said plant stand.

7. The support frame according to claim 6 wherein said plant stand defines a chamber into which plant root extends, and wherein said secondary frame is positioned in said chamber.

8. The support frame according to claim 7 further comprising a drive assembly, wherein said drive assembly is configured and arranged to move said secondary frame between a first position at a first terminal end of said first and second rails and a second position at a second terminal end of said first and second rails.

* * * * *